United States Patent
Lee et al.

(10) Patent No.: US 10,548,068 B2
(45) Date of Patent: Jan. 28, 2020

(54) METHOD AND APPARATUS FOR CONTROLLING ELECTRONIC DEVICE IN WIRELESS COMMUNICATION SYSTEM SUPPORTING BLUETOOTH COMMUNICATION

(71) Applicant: LG ELECTRONICS INC., Seoul (KR)

(72) Inventors: Jaeho Lee, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 15/500,677

(22) PCT Filed: May 11, 2015

(86) PCT No.: PCT/KR2015/004675
§ 371 (c)(1),
(2) Date: Jan. 31, 2017

(87) PCT Pub. No.: WO2016/017909
PCT Pub. Date: Feb. 4, 2016

(65) Prior Publication Data
US 2017/0223615 A1    Aug. 3, 2017

Related U.S. Application Data

(60) Provisional application No. 62/031,167, filed on Jul. 31, 2014, provisional application No. 62/067,406, (Continued)

(51) Int. Cl.
*H04W 48/14* (2009.01)
*H04W 76/10* (2018.01)
(Continued)

(52) U.S. Cl.
CPC ............ *H04W 48/14* (2013.01); *H04W 4/80* (2018.02); *H04W 8/005* (2013.01);
(Continued)

(58) Field of Classification Search
CPC ..................................................... H04W 48/14
(Continued)

(56) References Cited

U.S. PATENT DOCUMENTS 8,935,411 B2 *  1/2015  Palin ...................... H04W 76/14
                                                               709/227
9,215,075 B1 * 12/2015  Poltorak ................. H04L 63/04
(Continued)

OTHER PUBLICATIONS

Decuir, "Bluetooth 4.0: Low Energy", 2011 (Year: 2011).*
(Continued)

*Primary Examiner* — Ondrej C Vostal
(74) *Attorney, Agent, or Firm* — Birch, Stewart, Kolasch & Birch, LLP

(57) ABSTRACT

The present invention relates to a method and an apparatus for connecting Bluetooth BR/EDR by using Bluetooth low energy (LE) technology. According to the present invention, provided are a method including: receiving an advertising message from a second device; transmitting a request message for requesting detailed information associated with the Bluetooth BR/EDR connection to the second device based on the advertising message; receiving a response message including the detailed information from the second device in response to the request message; transmitting a connection request message to the second device based on the detailed information; and establishing the Bluetooth BR/EDR LE connection with the second device, wherein the advertising message includes at least one of location information of the detailed information or available information of the Bluetooth BR/EDR.

11 Claims, 61 Drawing Sheets

Related U.S. Application Data filed on Oct. 22, 2014, provisional application No. 62/068,749, filed on Oct. 26, 2014, provisional application No. 62/080,383, filed on Nov. 16, 2014, provisional application No. 62/103,025, filed on Jan. 13, 2015.

(51) Int. Cl.

| | | |
|---|---|---|
| *H04W 48/16* | (2009.01) | |
| *H04W 52/02* | (2009.01) | |
| *H04W 76/18* | (2018.01) | |
| *H04W 76/14* | (2018.01) | |
| *H04W 4/80* | (2018.01) | |
| *H04W 8/00* | (2009.01) | |
| *H04W 36/00* | (2009.01) | |
| H04W 92/18 | (2009.01) | |

(52) U.S. Cl.
CPC ....... *H04W 36/0022* (2013.01); *H04W 48/16* (2013.01); *H04W 52/02* (2013.01); *H04W 76/10* (2018.02); *H04W 76/14* (2018.02); *H04W 76/18* (2018.02); *H04W 92/18* (2013.01); *Y02D 70/00* (2018.01)

(58) Field of Classification Search
USPC ........................................................ 709/228
See application file for complete search history.

(56) References Cited

U.S. PATENT DOCUMENTS

| | | | | |
|---|---|---|---|---|
| 2004/0014422 A1* | 1/2004 | Kallio | ...................... | H04L 63/08 455/41.1 |
| 2011/0021142 A1* | 1/2011 | Desai | .................... | H04W 8/005 455/41.2 |
| 2012/0052802 A1* | 3/2012 | Kasslin | ................. | H04W 48/12 455/41.2 |
| 2012/0195387 A1* | 8/2012 | Masuda | .............. | H04M 1/7253 375/259 |
| 2012/0196534 A1* | 8/2012 | Kasslin | ................. | H04W 76/40 455/41.2 |
| 2013/0109315 A1* | 5/2013 | Polo | .................. | H04W 52/0274 455/41.2 |
| 2013/0128022 A1* | 5/2013 | Bose | ........................ | H04N 7/18 348/77 |
| 2013/0182798 A1* | 7/2013 | Lozano | ............... | H04L 65/4084 375/340 |
| 2013/0188538 A1* | 7/2013 | Kainulainen | ............. | G01S 3/48 370/310 |
| 2013/0194968 A1* | 8/2013 | Masuda | ................ | H04W 48/18 370/254 |
| 2013/0288600 A1* | 10/2013 | Kuusilinna | ........... | H02J 7/0004 455/41.2 |
| 2014/0057567 A1 | 2/2014 | Desai et al. | | |
| 2014/0059235 A1* | 2/2014 | Palin | ..................... | H04W 76/14 709/227 |
| 2014/0141714 A1* | 5/2014 | Ghosh | .................... | H04L 29/08 455/39 |
| 2014/0157135 A1* | 6/2014 | Lee | ........................ | H04W 76/14 715/738 |
| 2014/0188348 A1* | 7/2014 | Gautama | ............... | B60W 10/30 701/48 |
| 2014/0206346 A1* | 7/2014 | Kiukkonen | ....... | H04W 52/0229 455/426.1 |
| 2014/0244747 A1* | 8/2014 | Aggarwal | ............... | H04L 67/22 709/204 |
| 2014/0273858 A1* | 9/2014 | Panther | ................. | A61B 5/0002 455/41.2 |
| 2014/0275850 A1* | 9/2014 | Venkatraman | ....... | A61B 5/0002 600/301 |
| 2014/0302849 A1* | 10/2014 | Palin | ..................... | H04W 8/005 455/436 |
| 2014/0304381 A1* | 10/2014 | Savolainen | ......... | H04L 41/0806 709/222 |
| 2014/0307600 A1* | 10/2014 | Dumitrescu | ...... | H04W 52/0245 370/311 |
| 2014/0315491 A1* | 10/2014 | Preiszler | ........... | H04W 52/0235 455/41.2 |
| 2014/0355517 A1* | 12/2014 | Reunamaki | ........... | H04W 8/005 370/328 |
| 2015/0134743 A1* | 5/2015 | Heo | ........................ | H04L 69/24 709/204 |
| 2015/0163748 A1* | 6/2015 | Hrabak | .............. | H04W 52/0245 455/41.2 |
| 2015/0172901 A1* | 6/2015 | Kasslin | ................. | H04W 8/005 370/328 |
| 2015/0373749 A1* | 12/2015 | Palin | ..................... | H04W 76/10 455/41.2 |
| 2016/0014545 A1* | 1/2016 | Tian | ....................... | H04W 76/10 455/41.2 |
| 2016/0171486 A1* | 6/2016 | Wagner | .................. | G06Q 20/12 705/39 |

OTHER PUBLICATIONS

Microsoft Computer Dictionary, "Bluetooth", "Handoff", 5th edition, 2002 (Year: 2002).*
Al Kalaa et al., "Bluetooth Standard v4.1: Simulating the Bluetooth Low Energy Data Channel Selection Algorithm", 2014 (Year: 2014).*
Bluetooth SIG, "Specification of the Bluetooth System", version 4.0, Jun. 2010 (Year: 2010).*
Yu et al., "Bluetooth Low Energy (BLE) Based Mobile Electrocardiogram Monitoring System", 2012 (Year: 2012).*
Wikipedia, "Bluetooth", 2019 (Year: 2019).*
Zhang et al., "Bluetooth Low Energy Based Motion Sensing System", 2014 (Year: 2014).*
Zolfaghari et al., "A Multi-Mode WPAN (Bluetooth, BLE, IEEE 802.15.4) SoC for Low-Power and IoT Applications", 2017 (Year: 2017).*
Cavallari et al., "A Survey on Wireless Body Area Networks: Technologies and Design Challenges", 2014 (Year: 2014).*
Decuir, "Bluetooth 4.0: Low Energy", IEEE, 2011 (Year: 2011).*
George et al., "Bluetooth Handover Control for Roaming System Applications", 2002 (Year: 2002).*
Subhan et al., "Handover in Bluetooth Networks using Signal Parameters", 2011 (Year: 2011).*
Wikipedia, "Bluetooth Low Energy", 2018 (Year: 2018).*

\* cited by examiner

[FIG. 1]
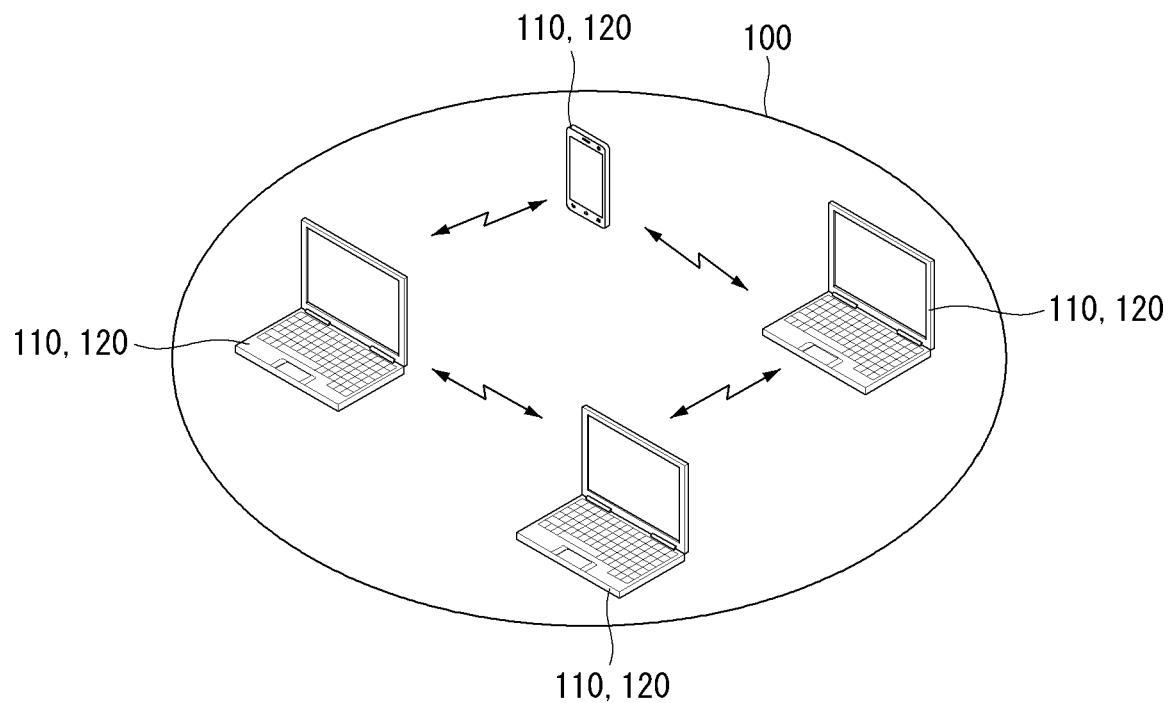

[FIG. 2]
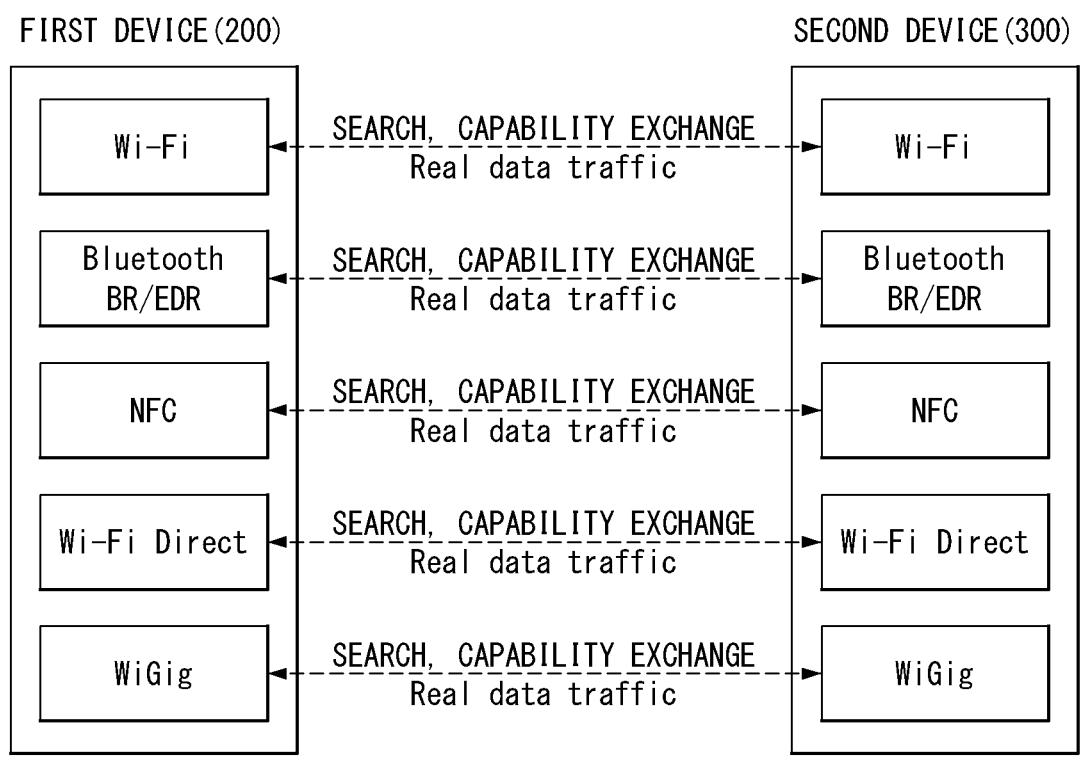

[FIG. 3]
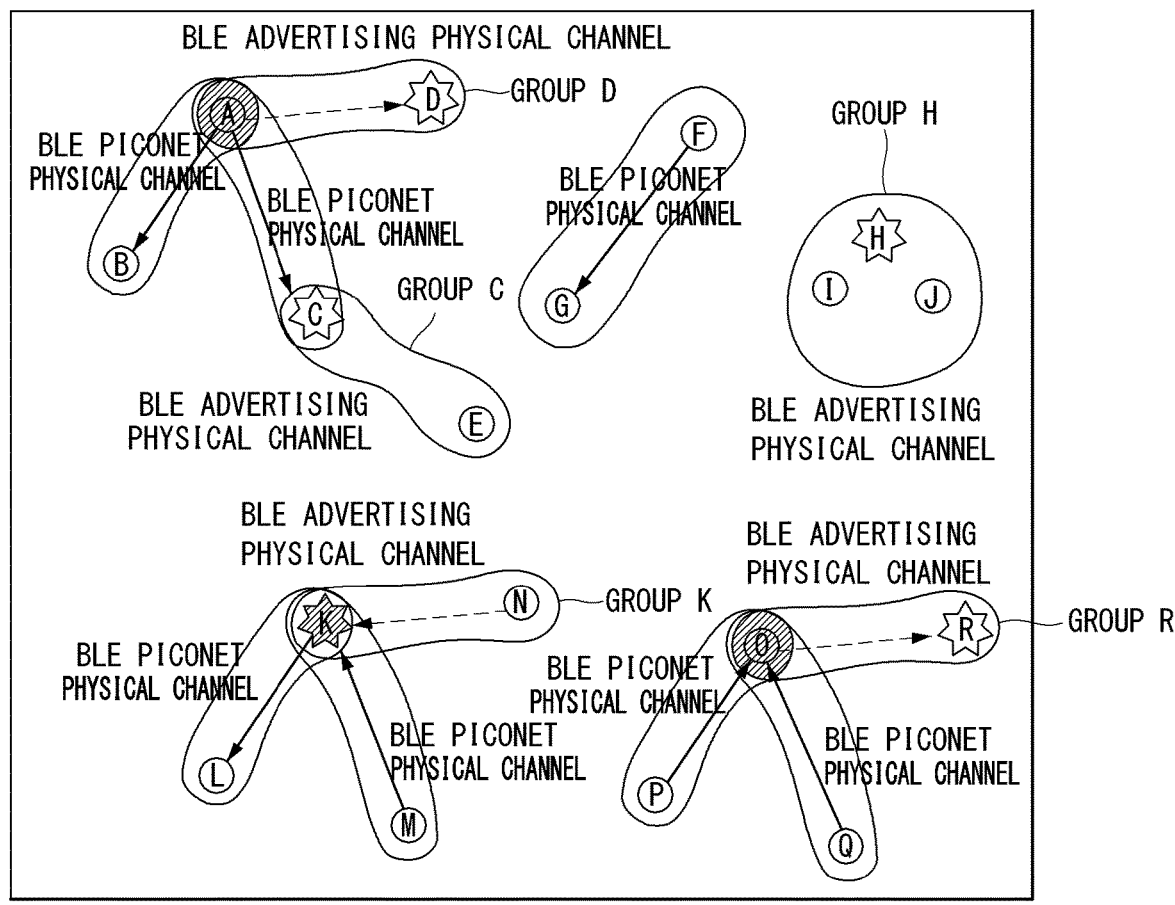

[FIG. 4]
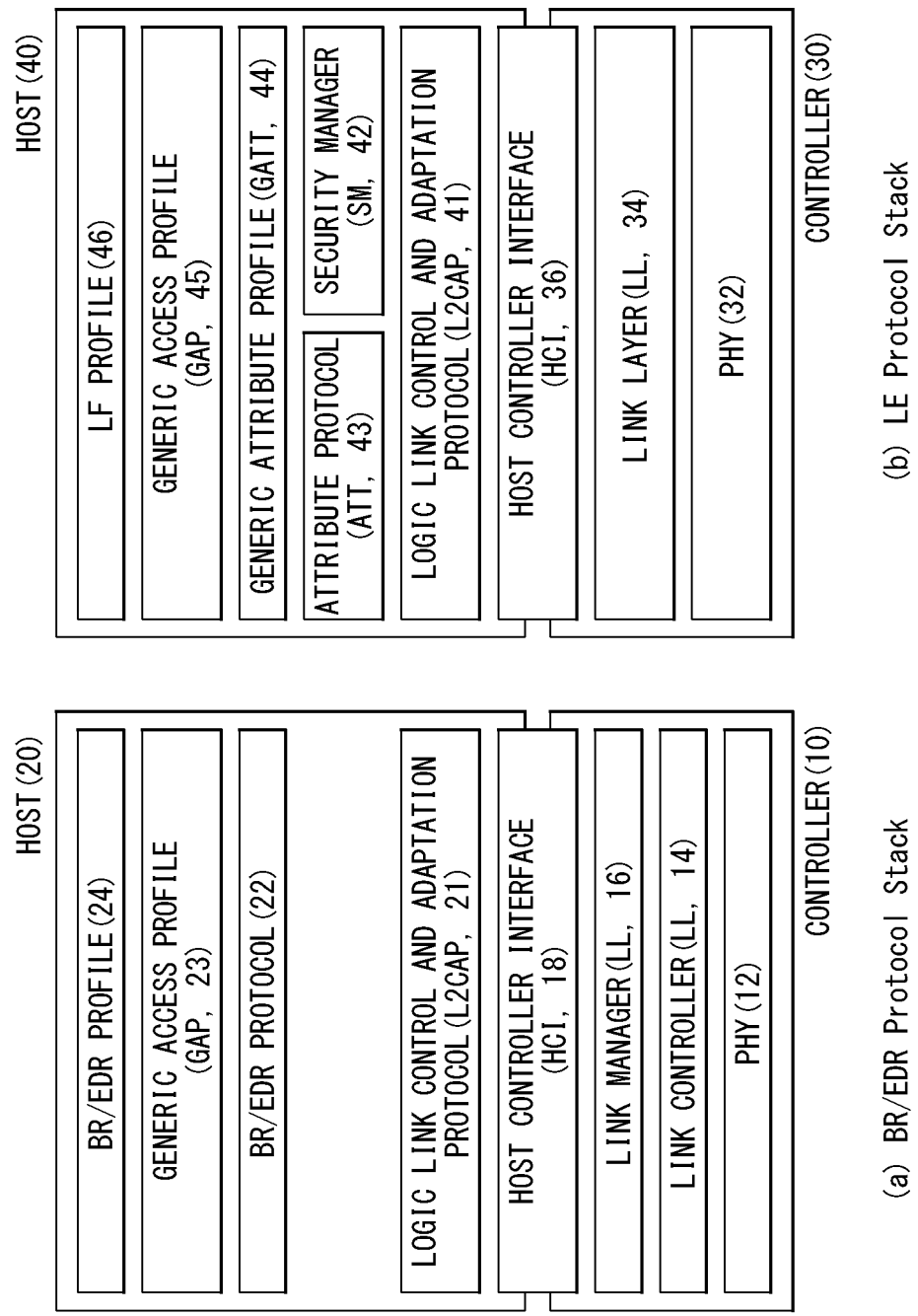

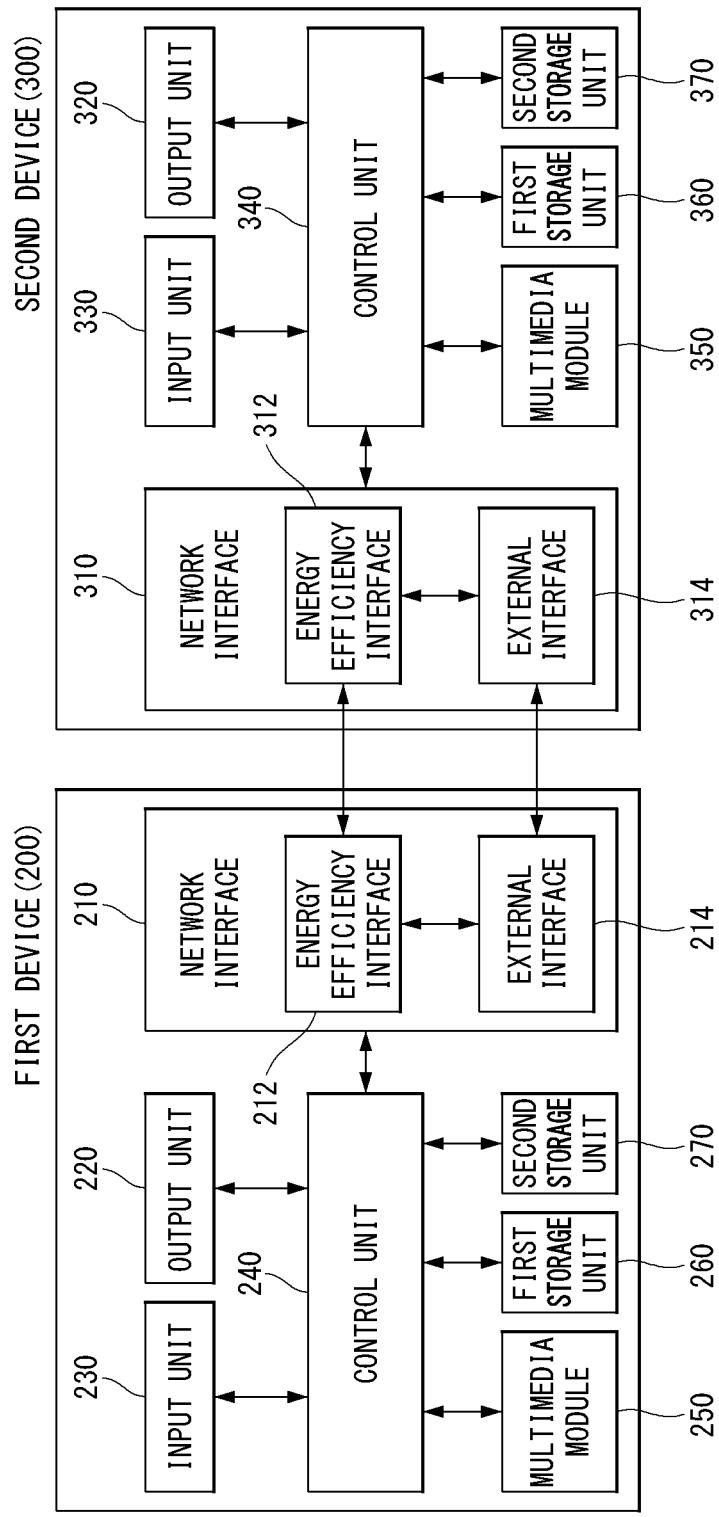
[FIG. 5]

[FIG. 6]
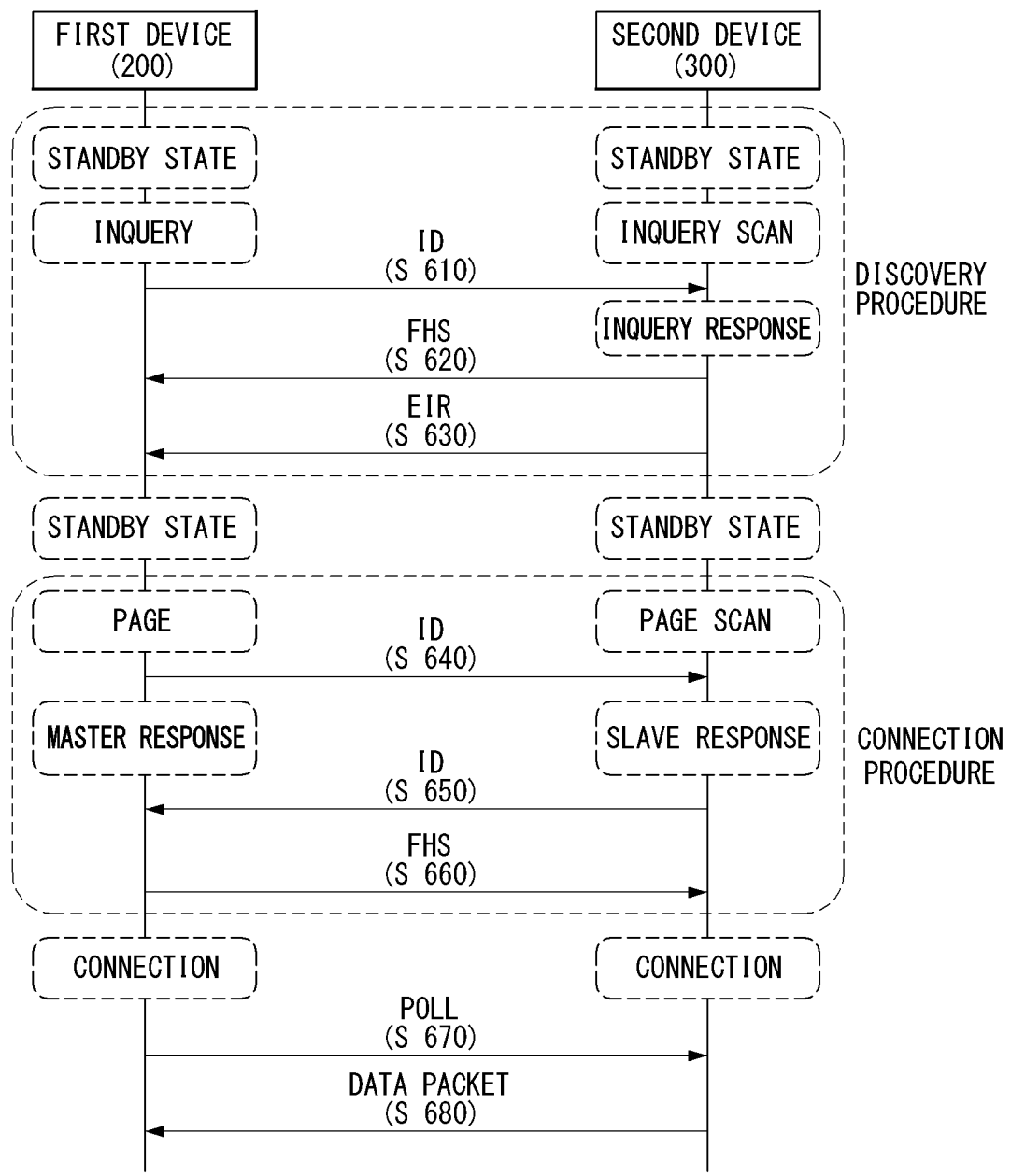

[FIG. 7]
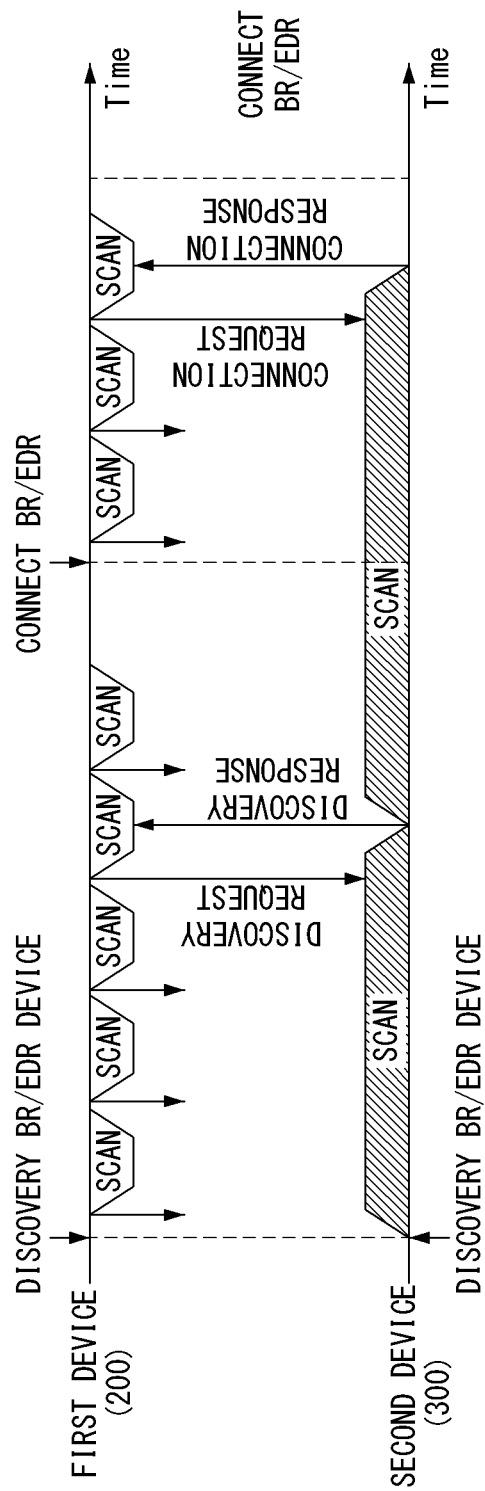

[FIG. 8]
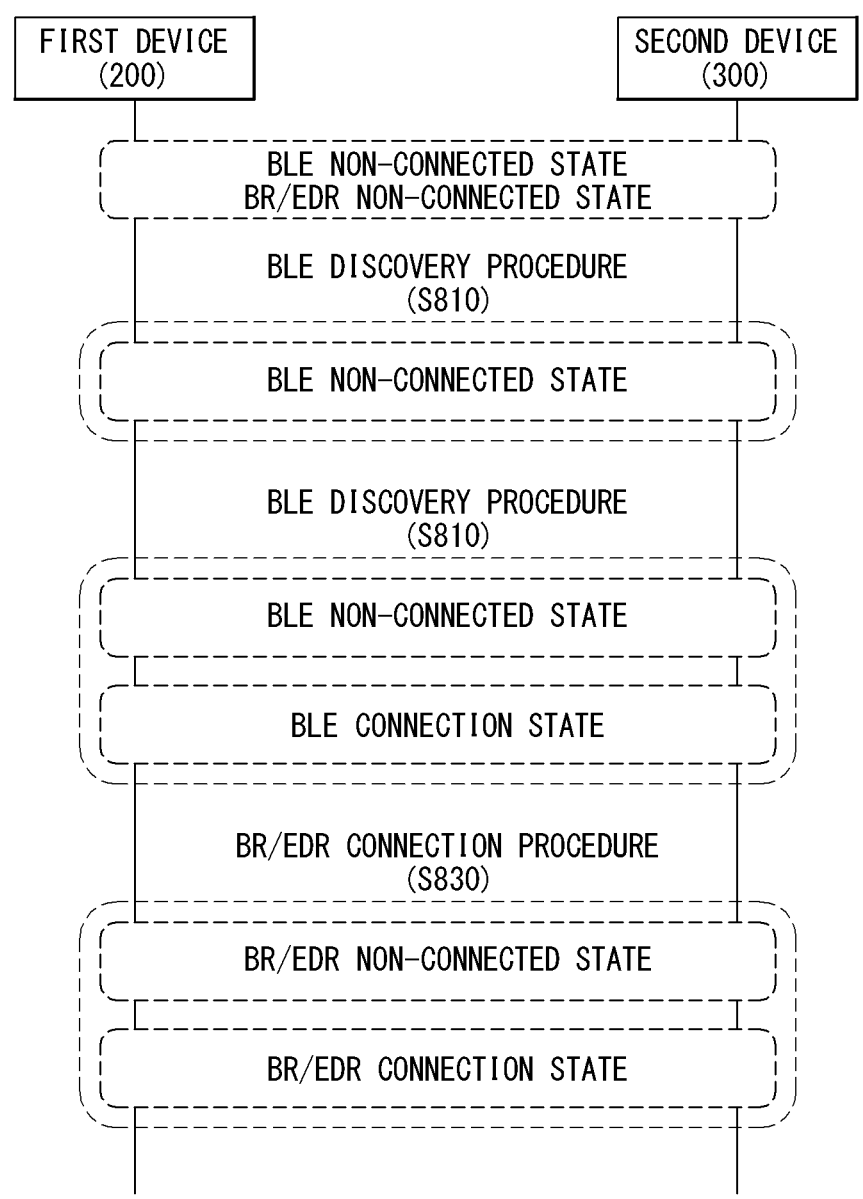

[FIG. 9]
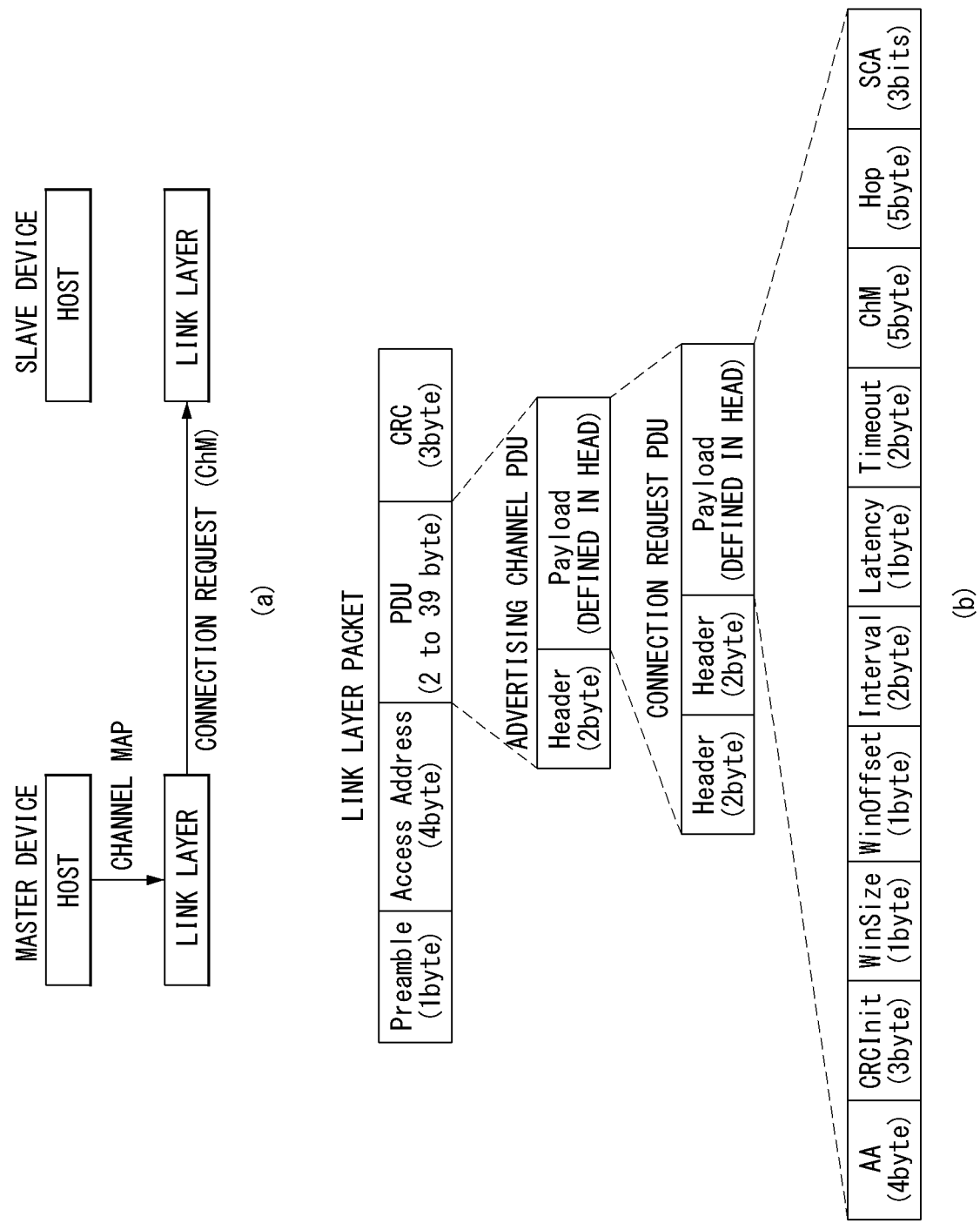

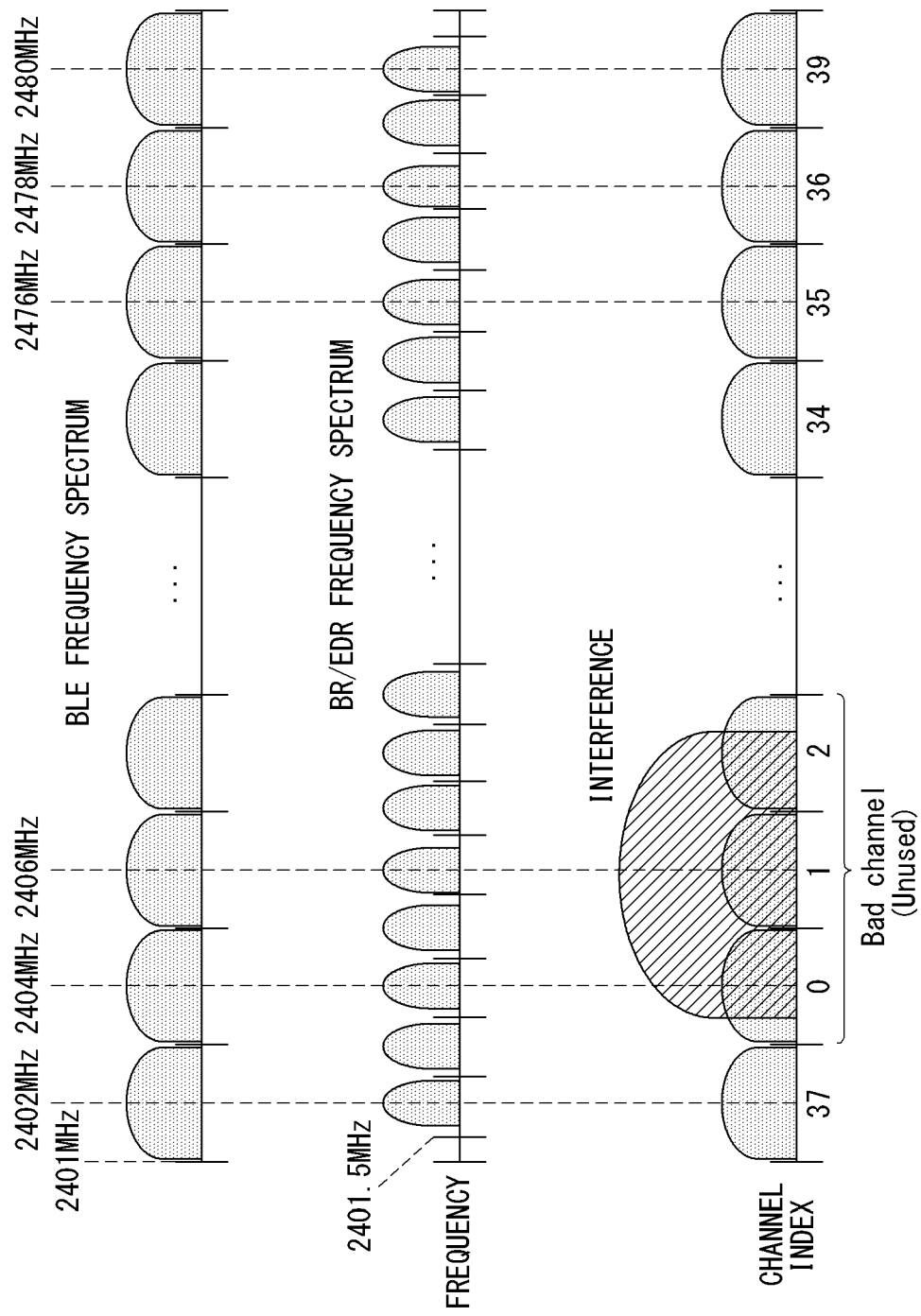
[FIG. 10]

[FIG. 11]
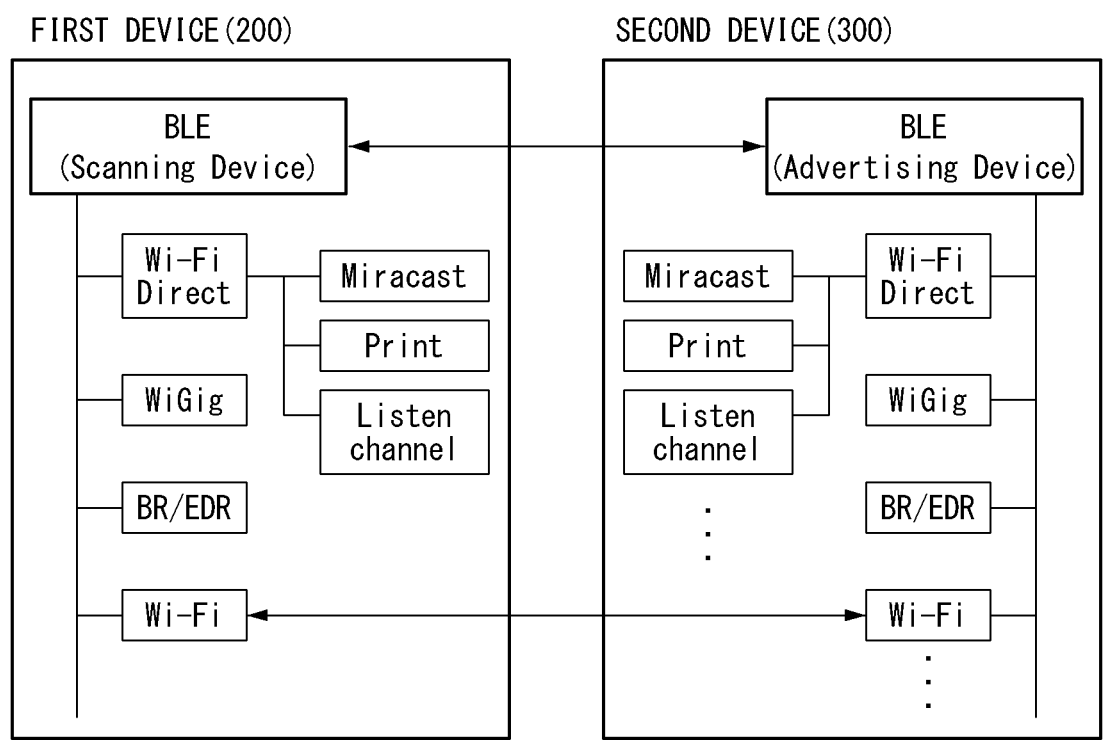

[FIG. 12]
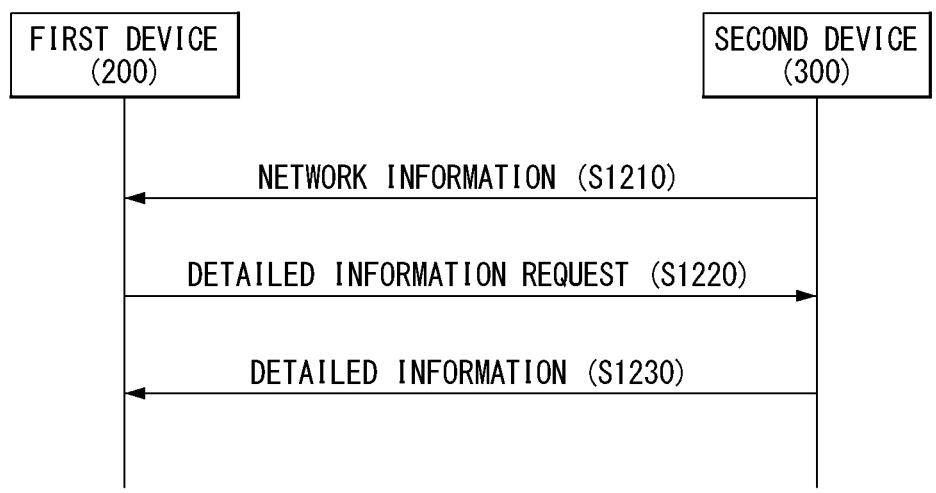

[FIG. 13]

| INFORMATION TYPE #1 | DETAILED INFORMATION #1 | · · · | INFORMATION TYPE #n | DETAILED INFORMATION #n |
|---|---|---|---|---|

[FIG. 14]
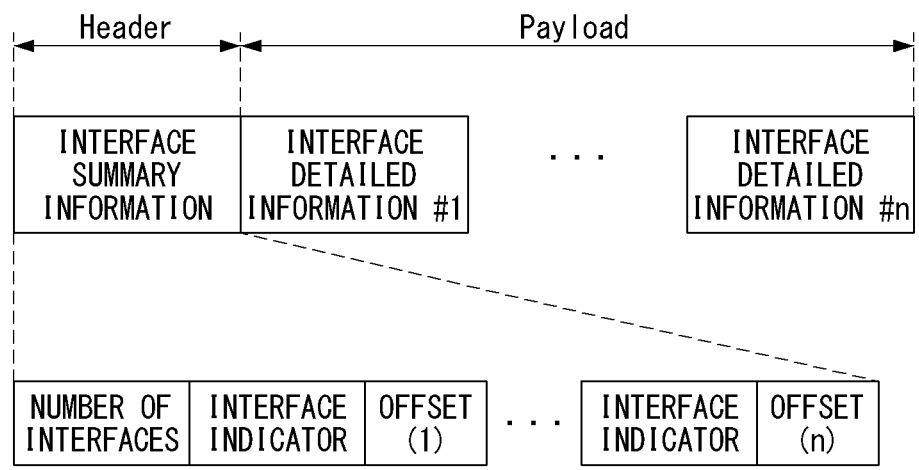

[FIG. 15]
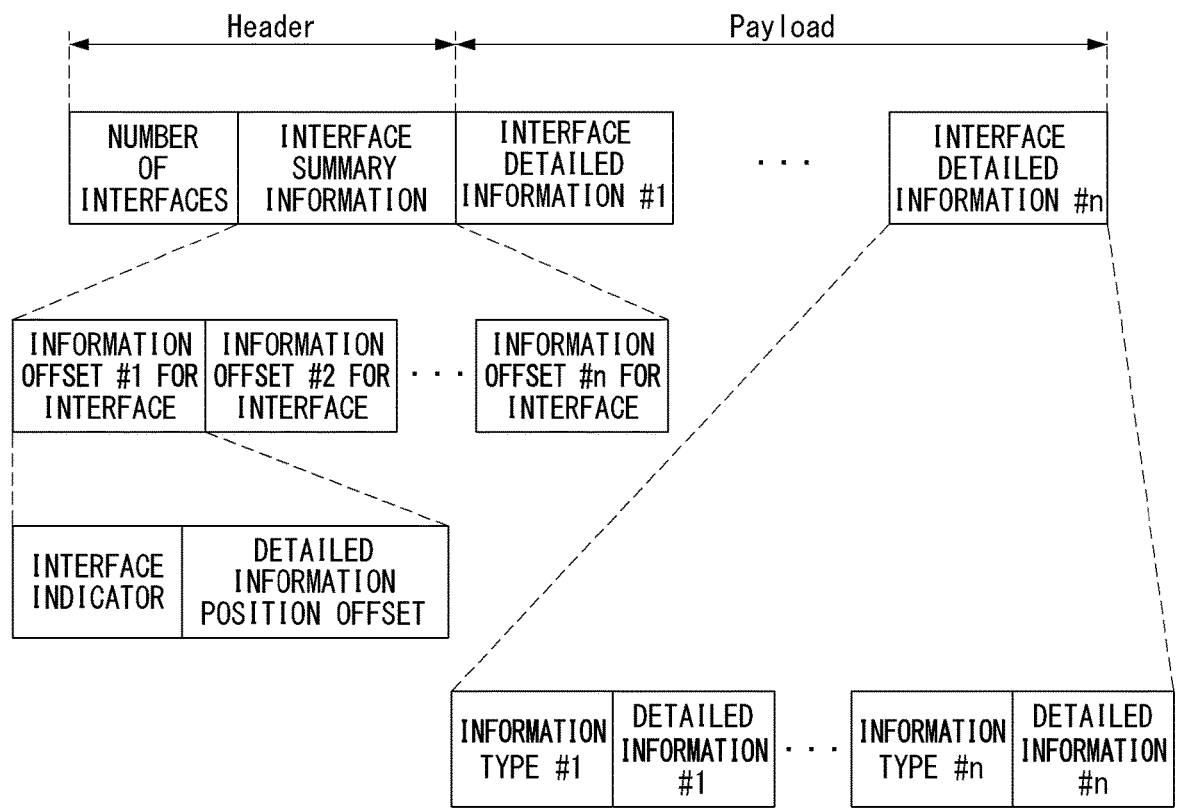

[FIG. 16]
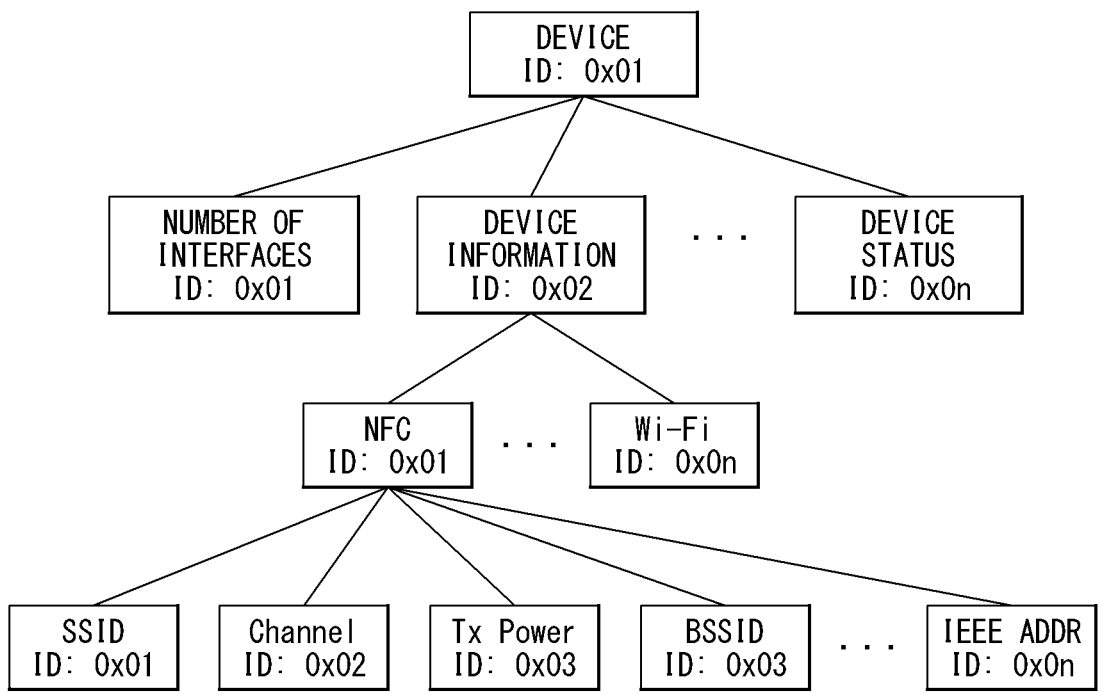

[FIG. 17]
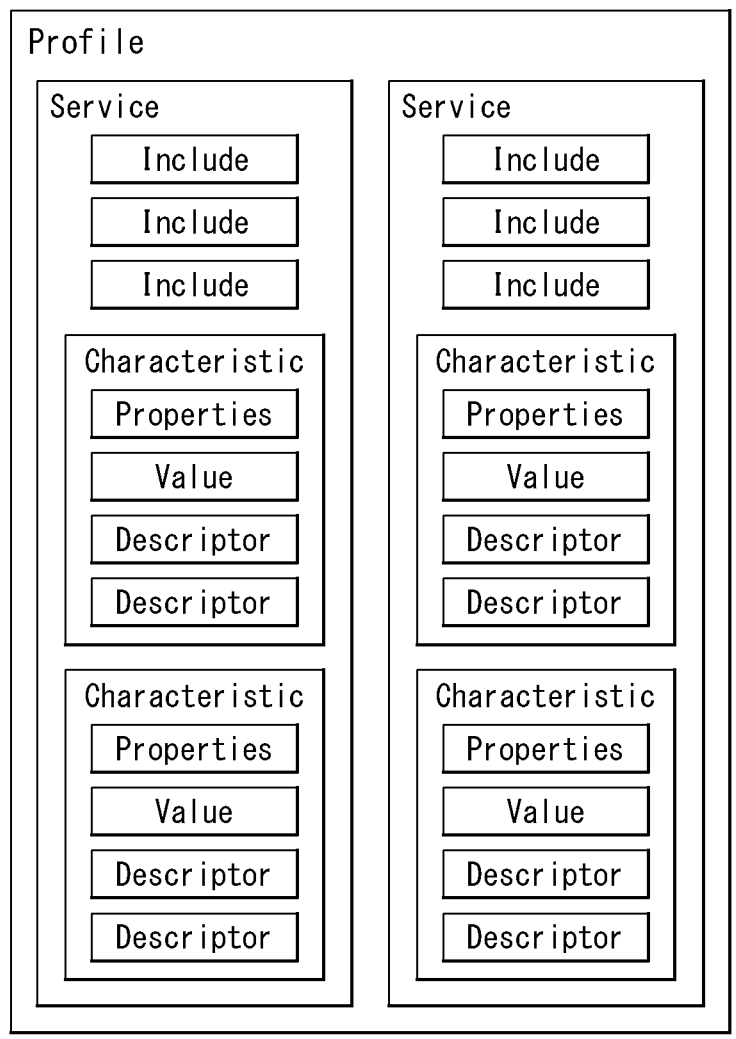

[FIG. 18]

Service Definition

Service Declaration

Attribute Handle
Attribute Type = <<Primary Service>>
Attribute Value = Service UUID (Service name)
Attribute Permission = Read Only, No Authentication/Authorization Characteristic Definition Attribute Handle
Attribute Type = <<Characteristic>>
Attribute Value
 - Characteristic Properties
 - Characteristic Value Attribute Handle
 - Characteristic UUID = <<Characteristic name>>
Attribute Permission = Read Only, No Authentication/Authorization Characteristic Value Declaration Attribute Handle
Attribute Type = <<Characteristic name>>
Attribute Value = Characteristic value
Attribute Permission = Read Only, No Authentication/Authorization

[FIG. 19]
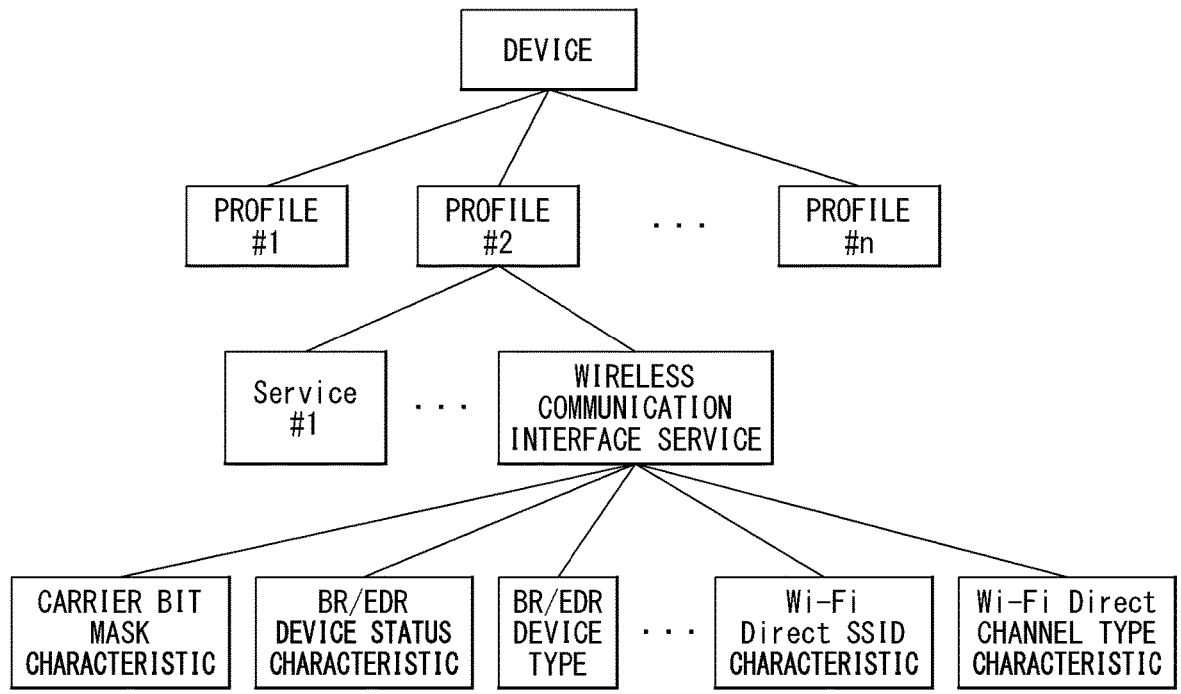

[FIG. 20]
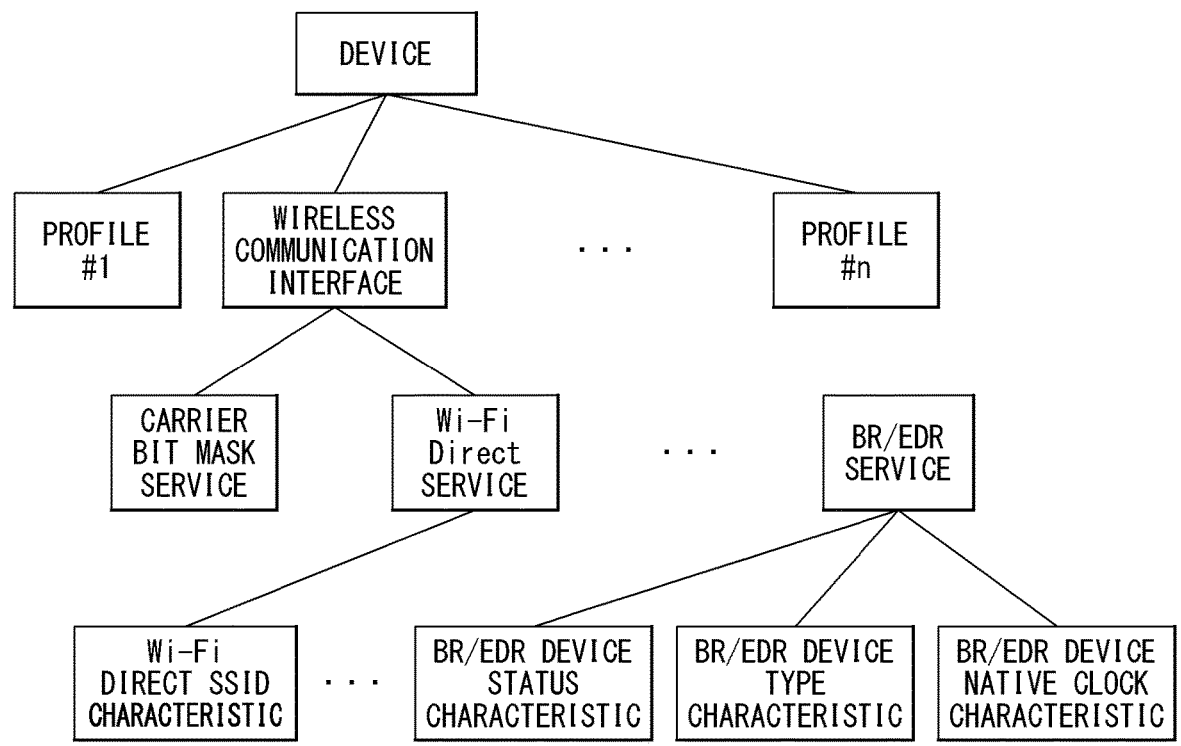

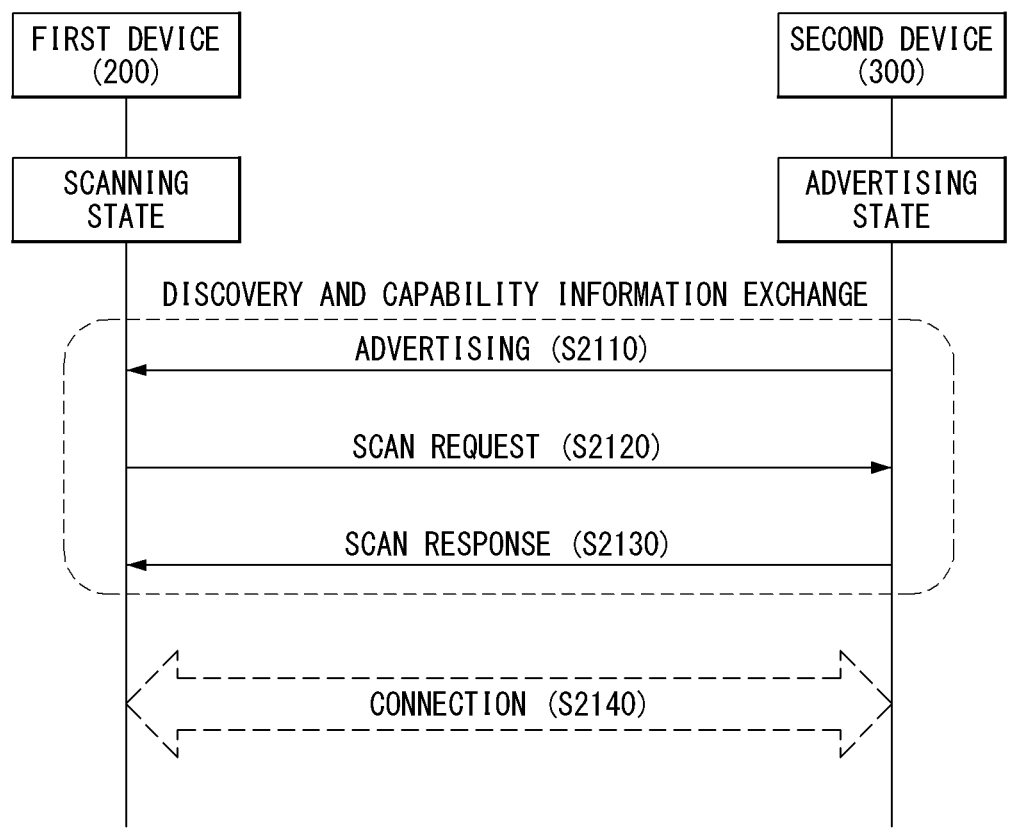

[FIG. 22]
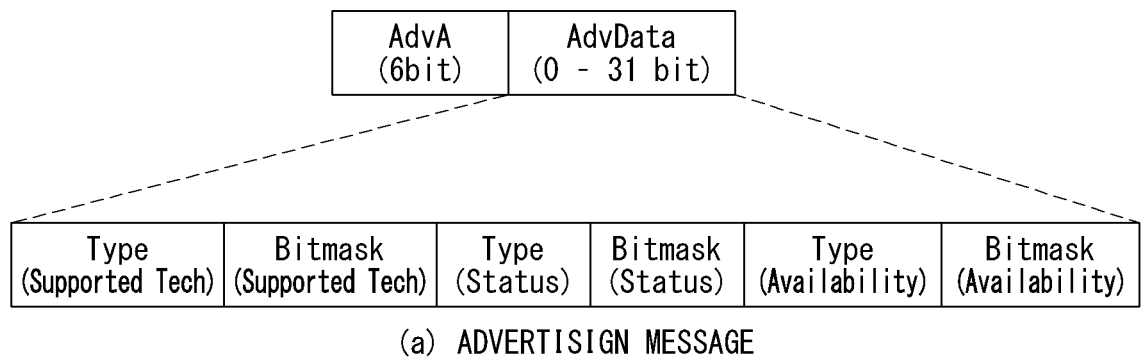
(a) ADVERTISIGN MESSAGE
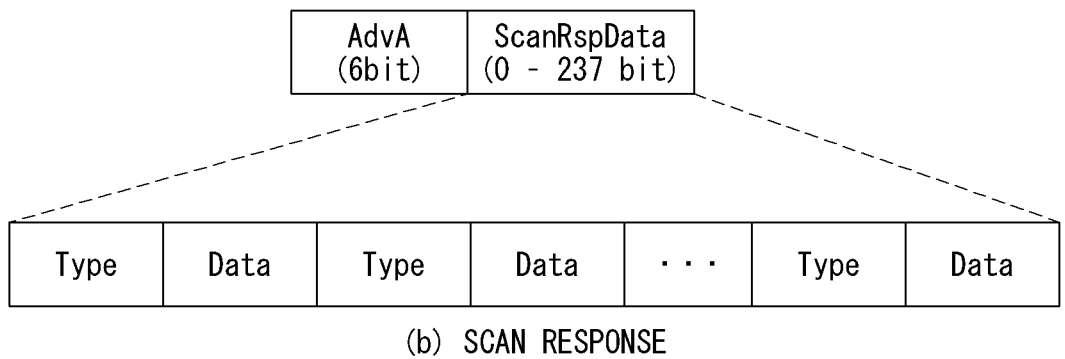
(b) SCAN RESPONSE

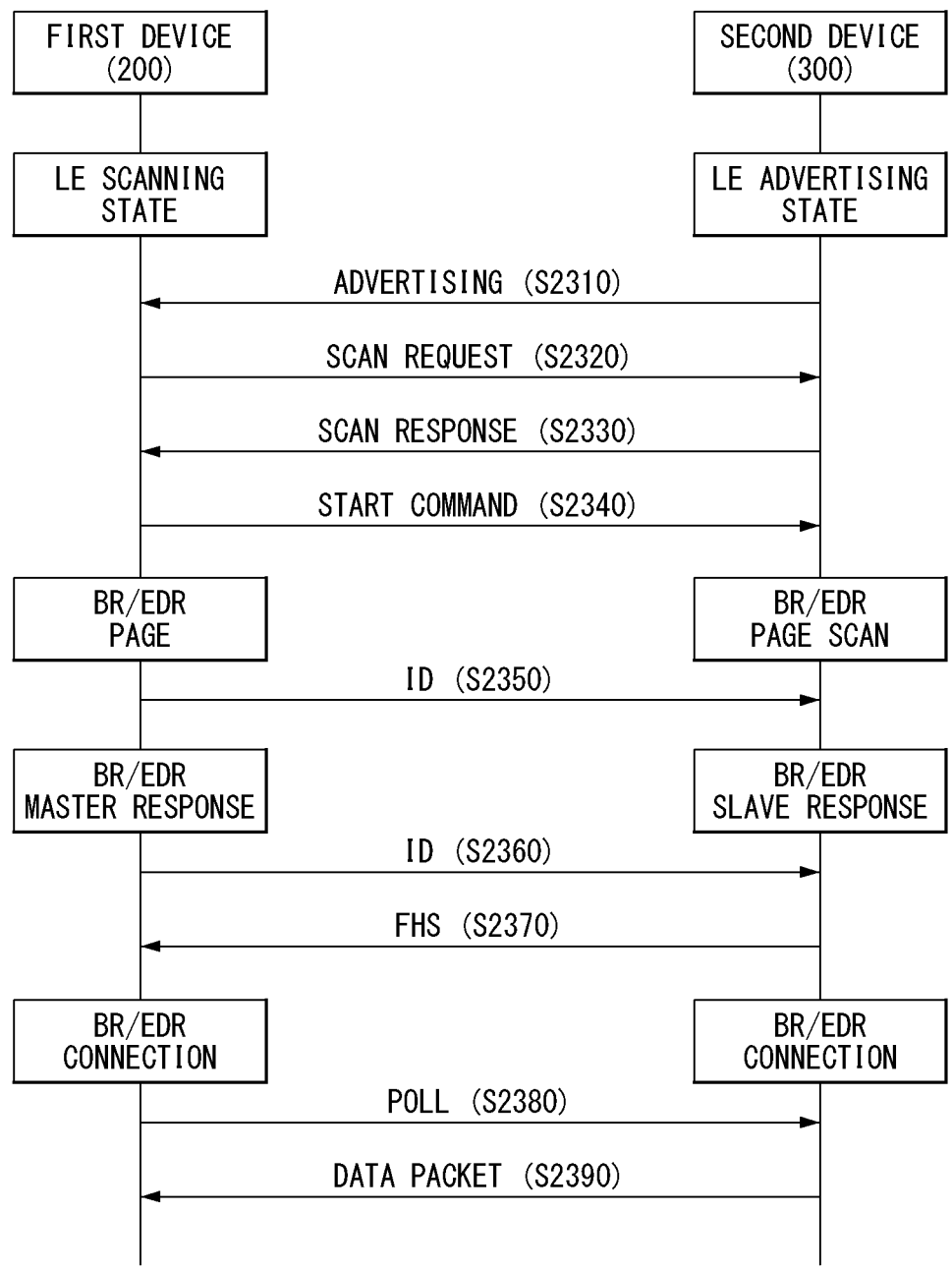
[FIG. 23]

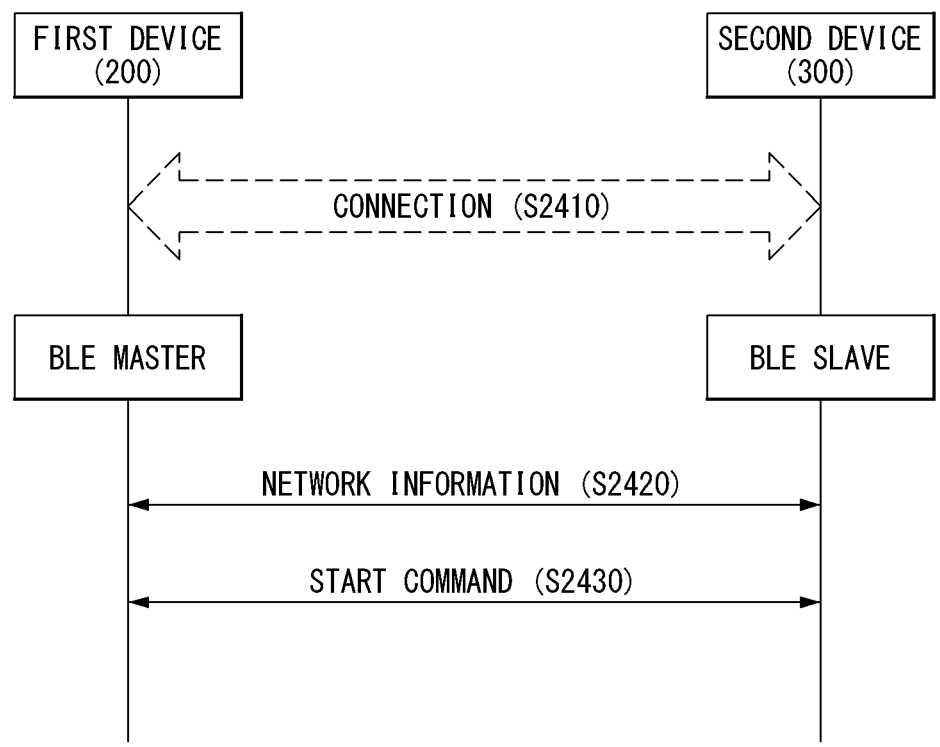
[FIG. 24]

[FIG. 25]
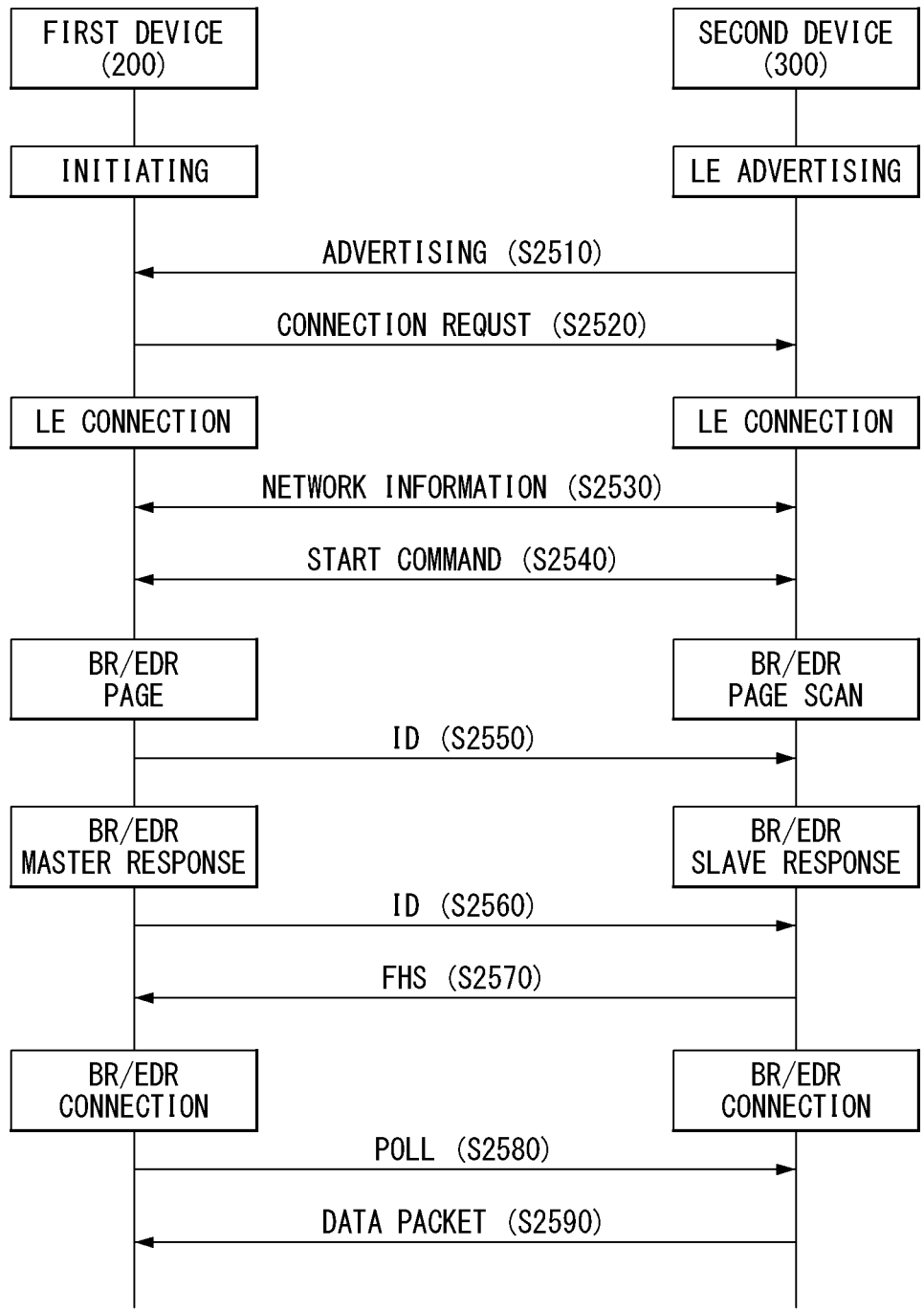

[FIG. 26]
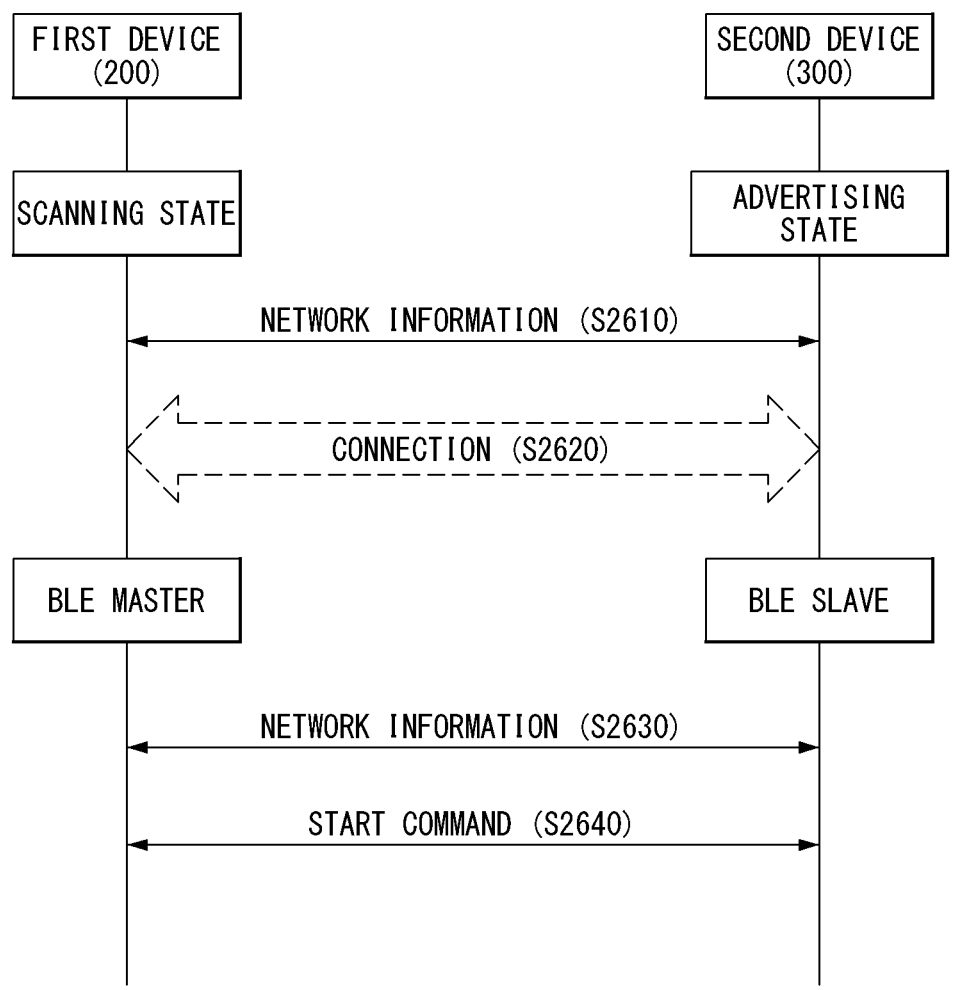

[FIG. 27]
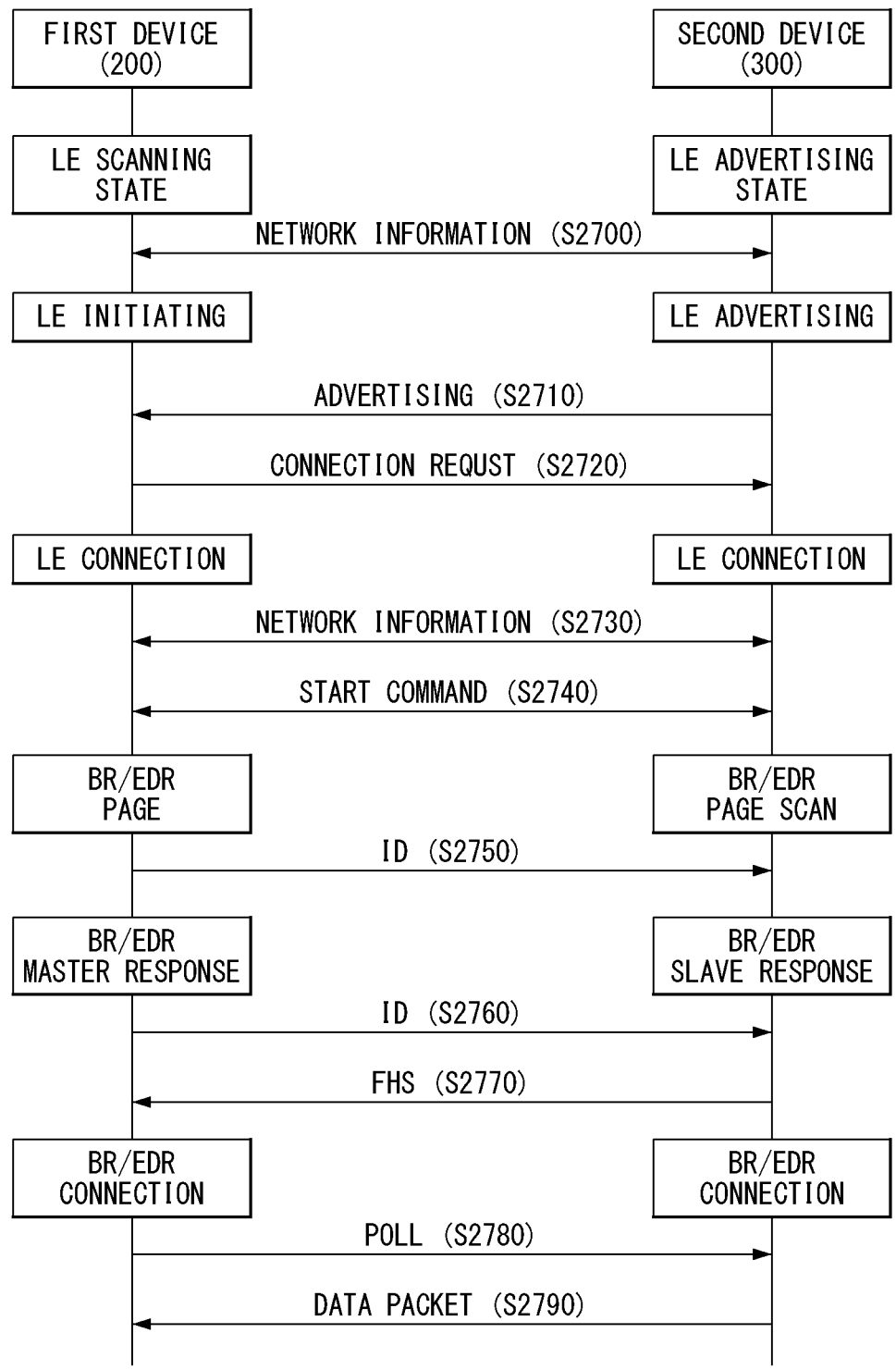

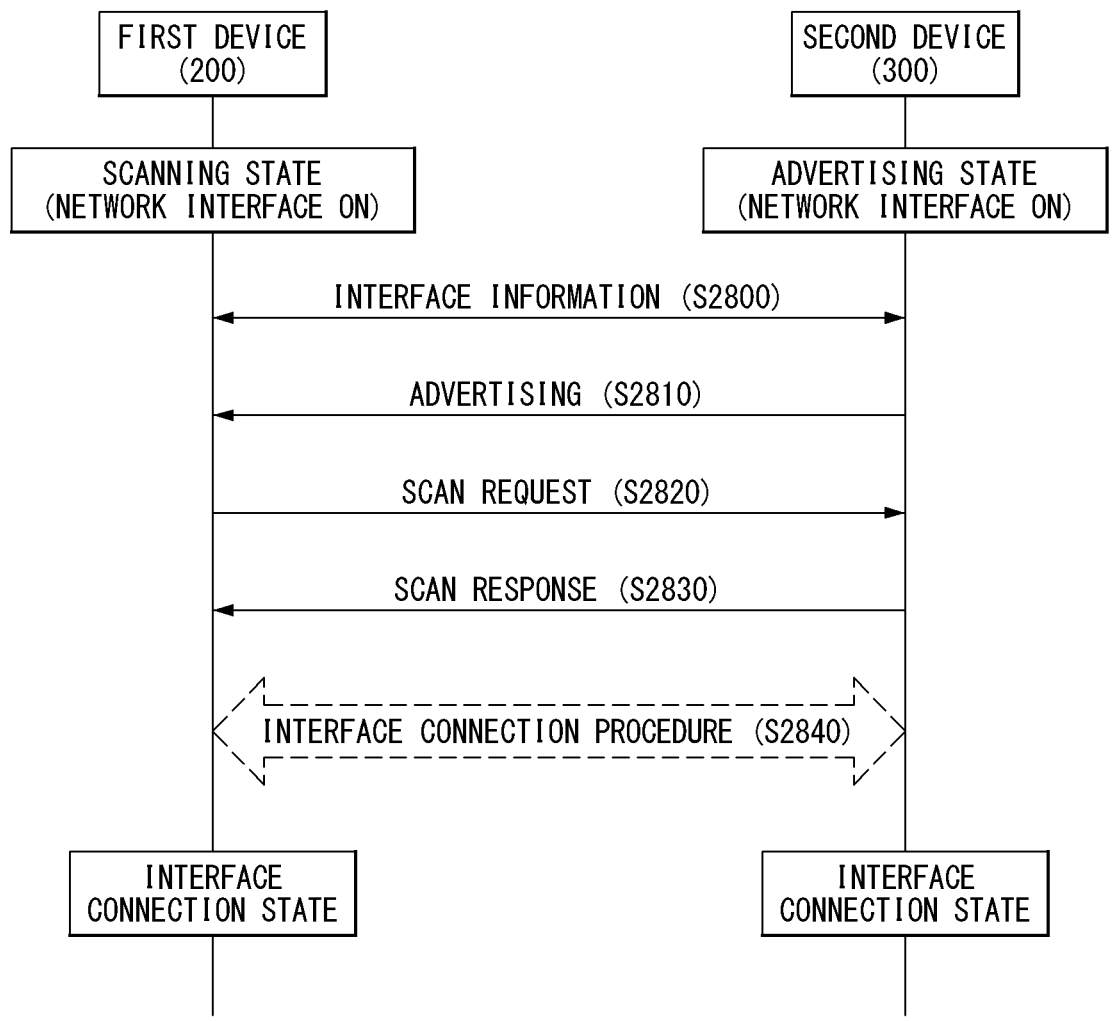
[FIG. 28]

[FIG. 29]
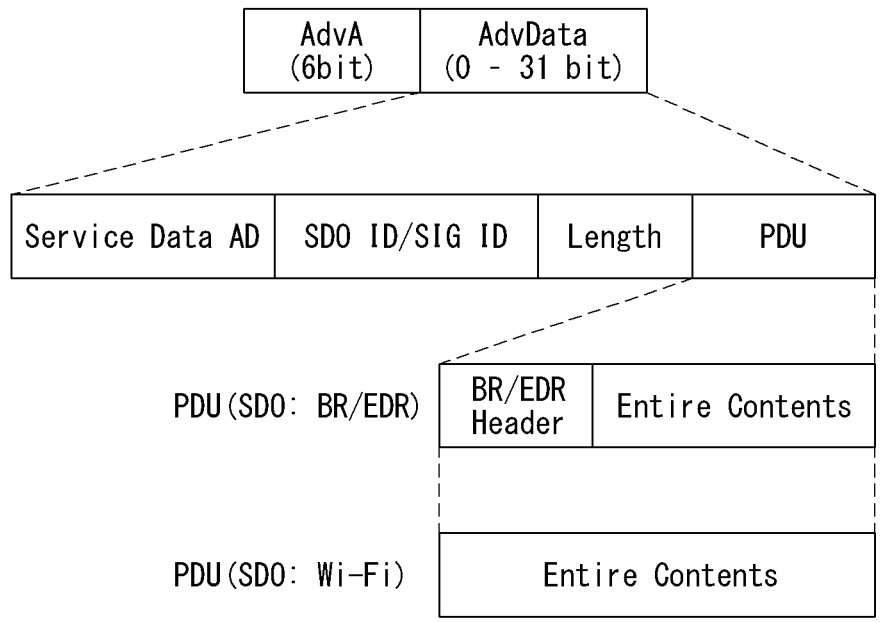
(a) ADVERTISING PDU
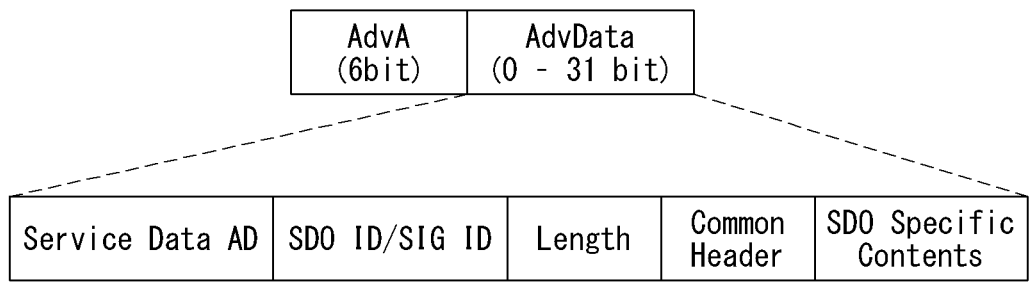
(b) ADVERTISING PDU

[FIG. 30]
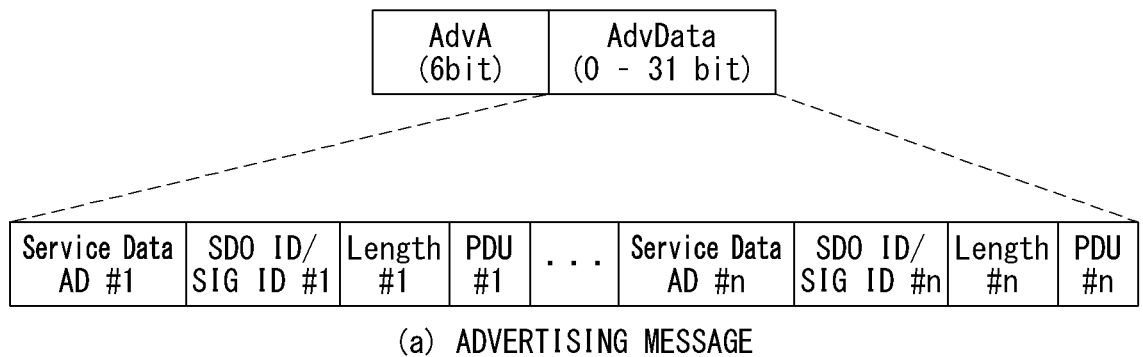
(a) ADVERTISING MESSAGE
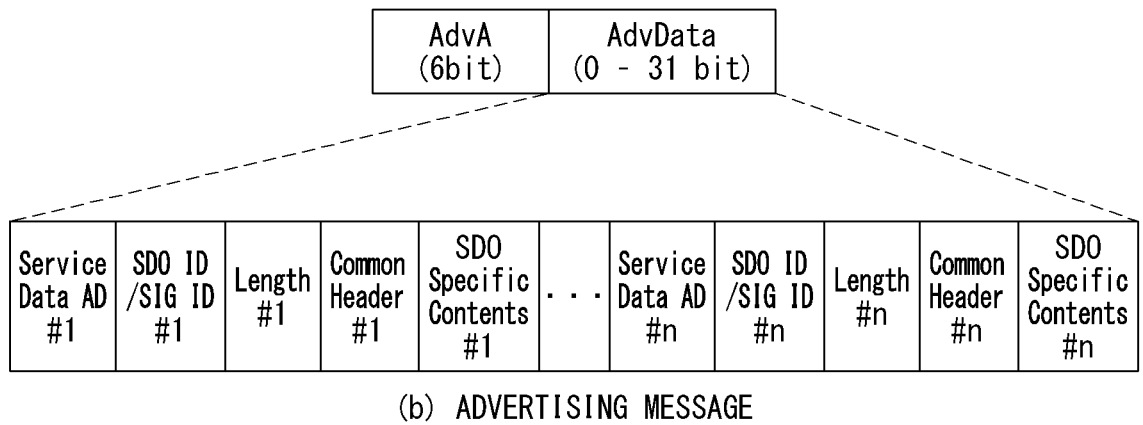
(b) ADVERTISING MESSAGE

[FIG. 31]
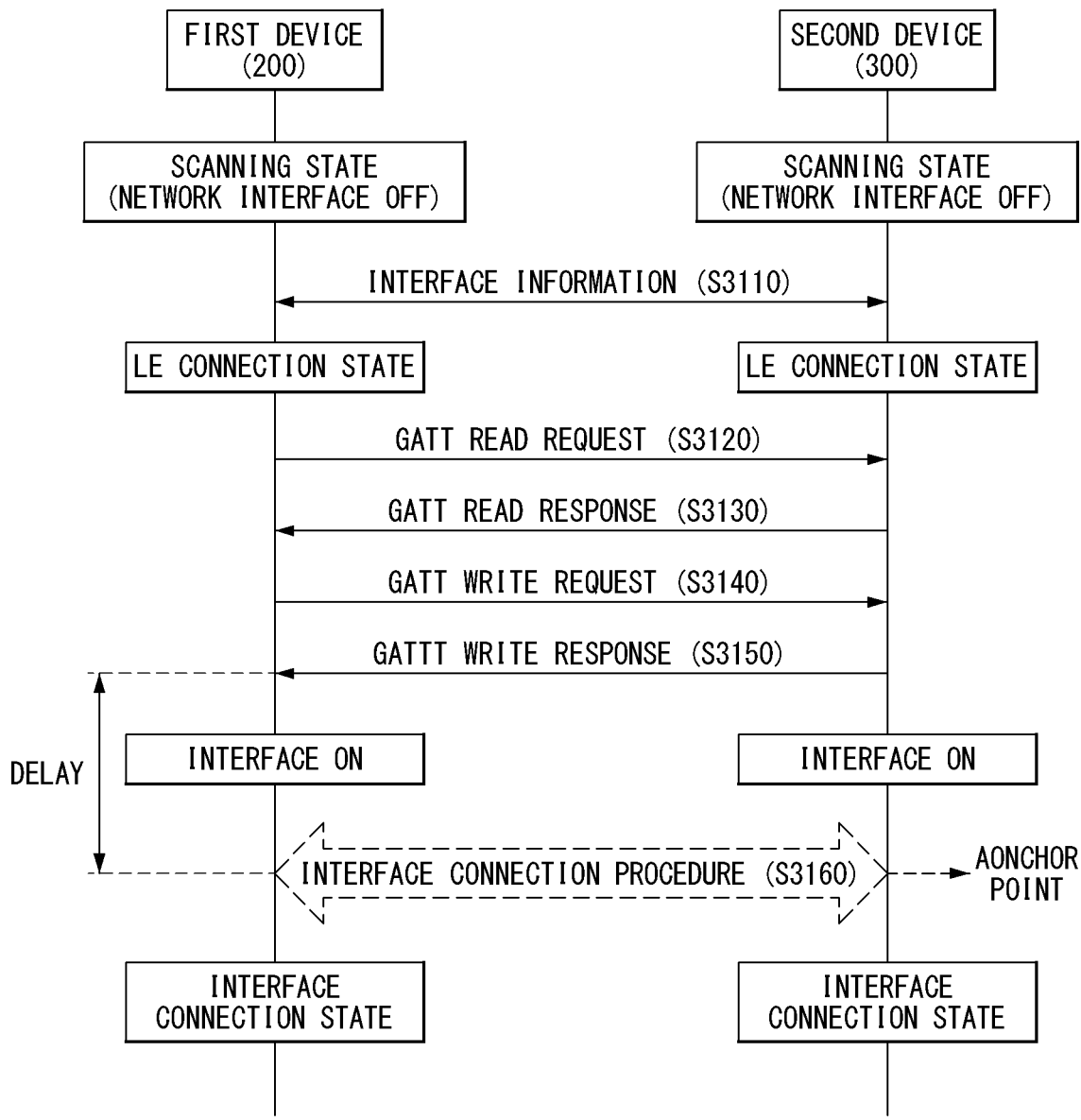

[FIG. 32]
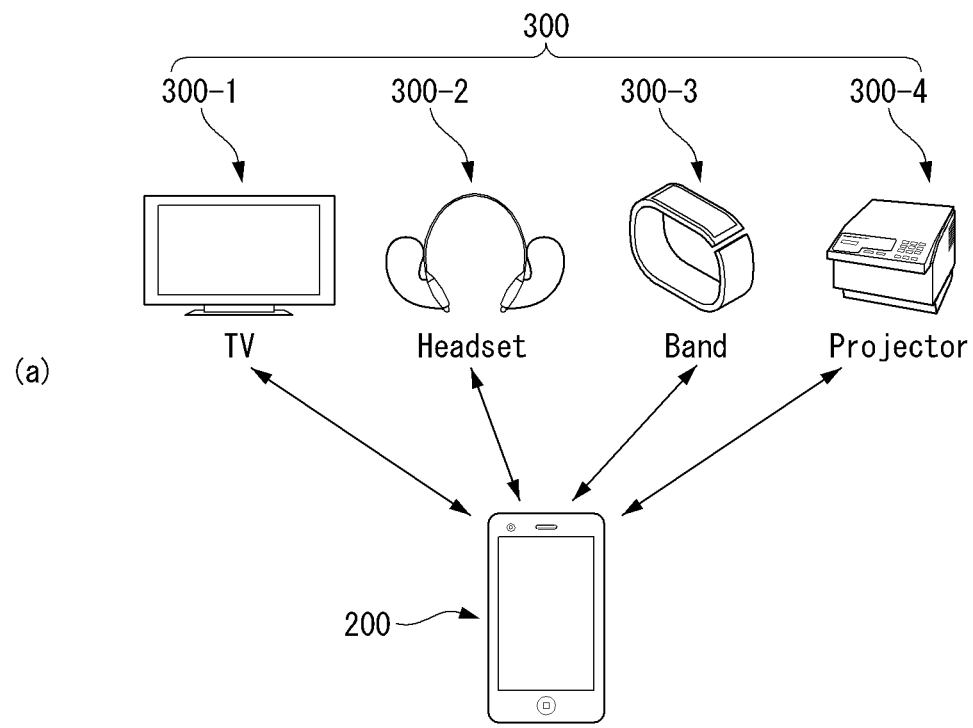
(a)
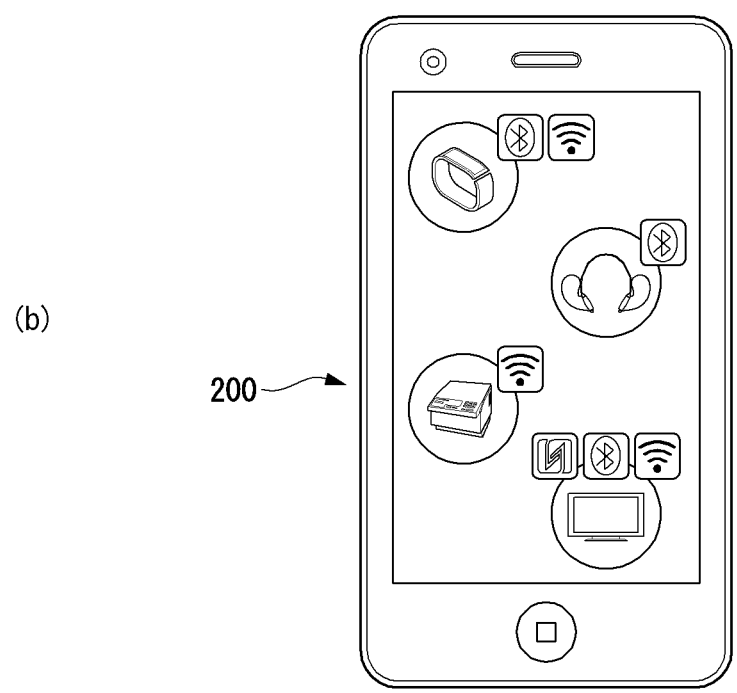
(b)

[FIG. 33a]
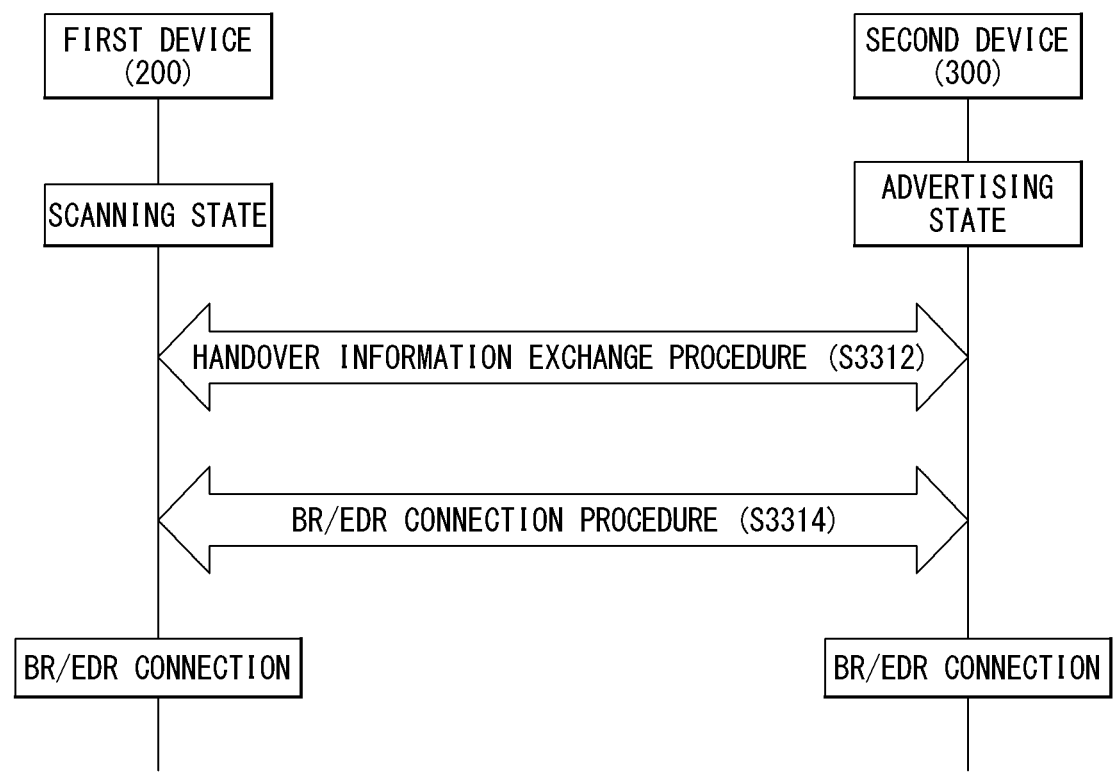

[FIG. 33b]
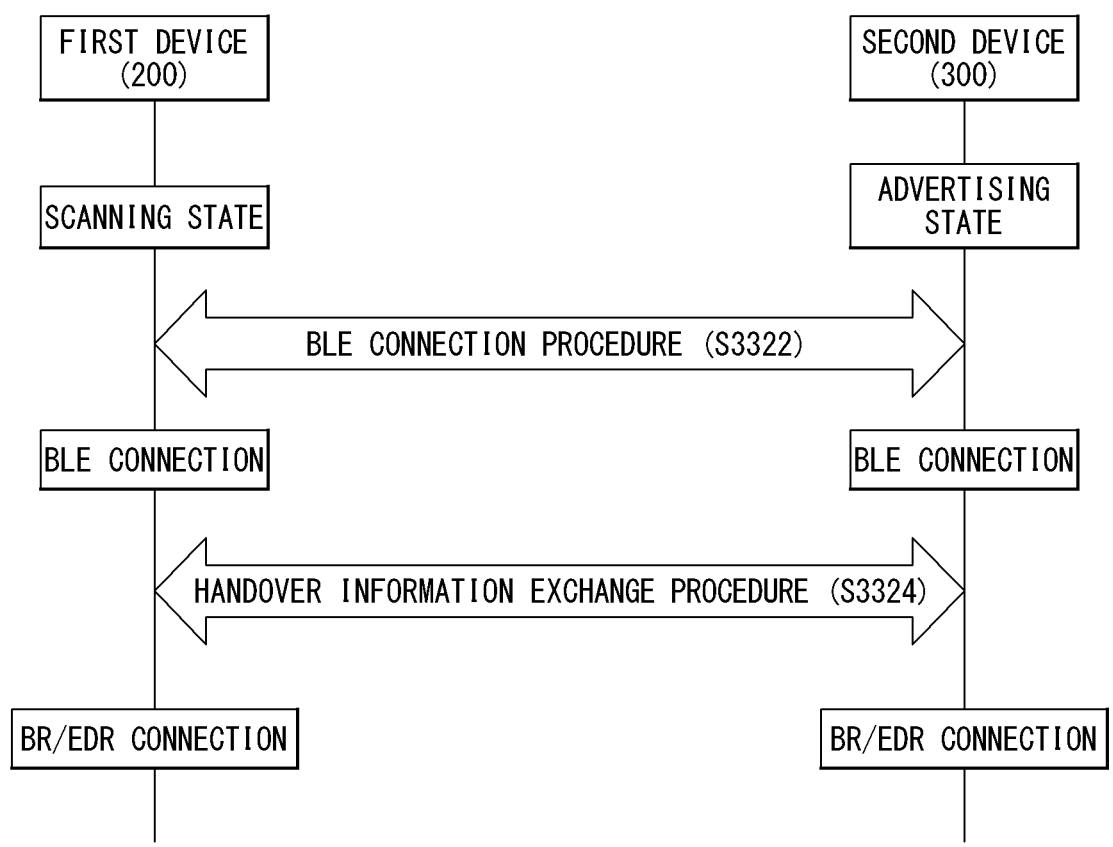

[FIG. 33c]
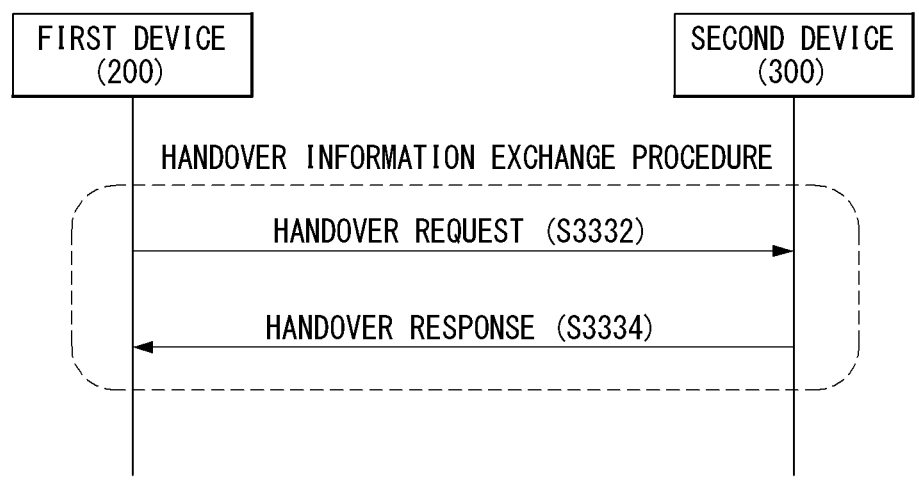
(a) HANDOVER INFORMATION EXCHANGE PROCEDURE
(b) HANDOVER REQUEST MESSAGE

[FIG. 34a]
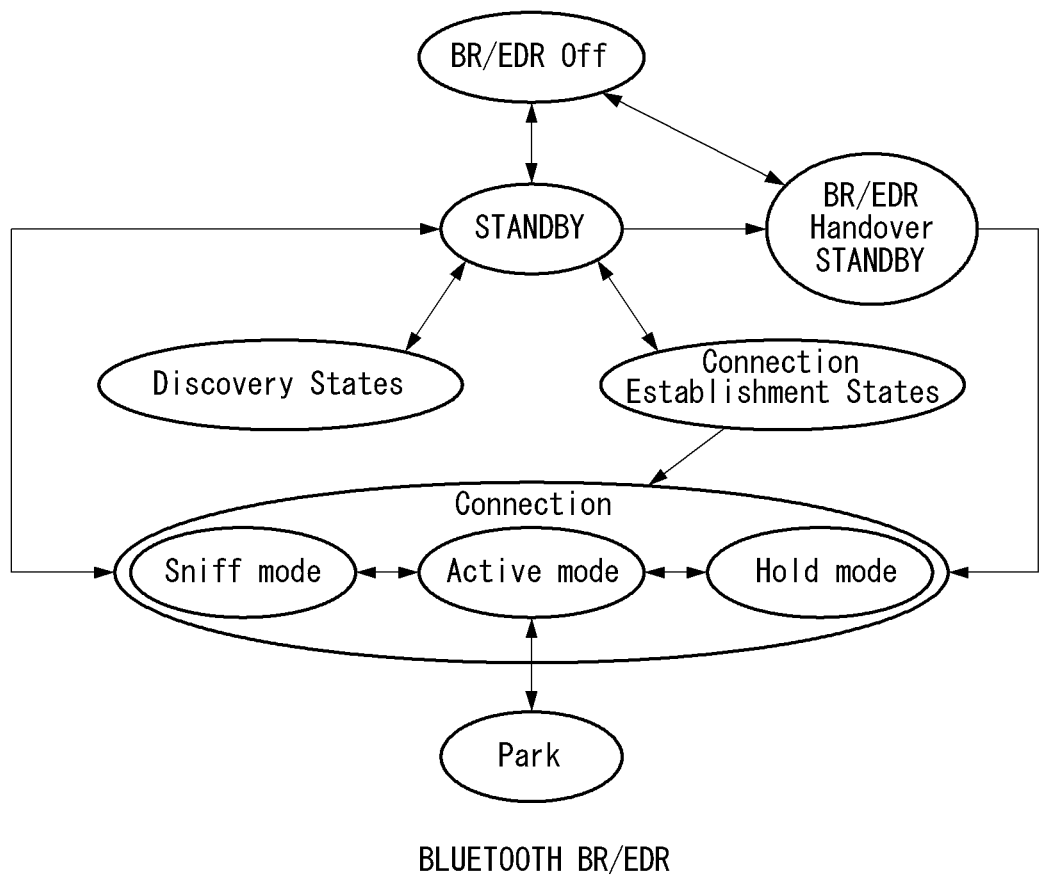

[FIG. 34b]
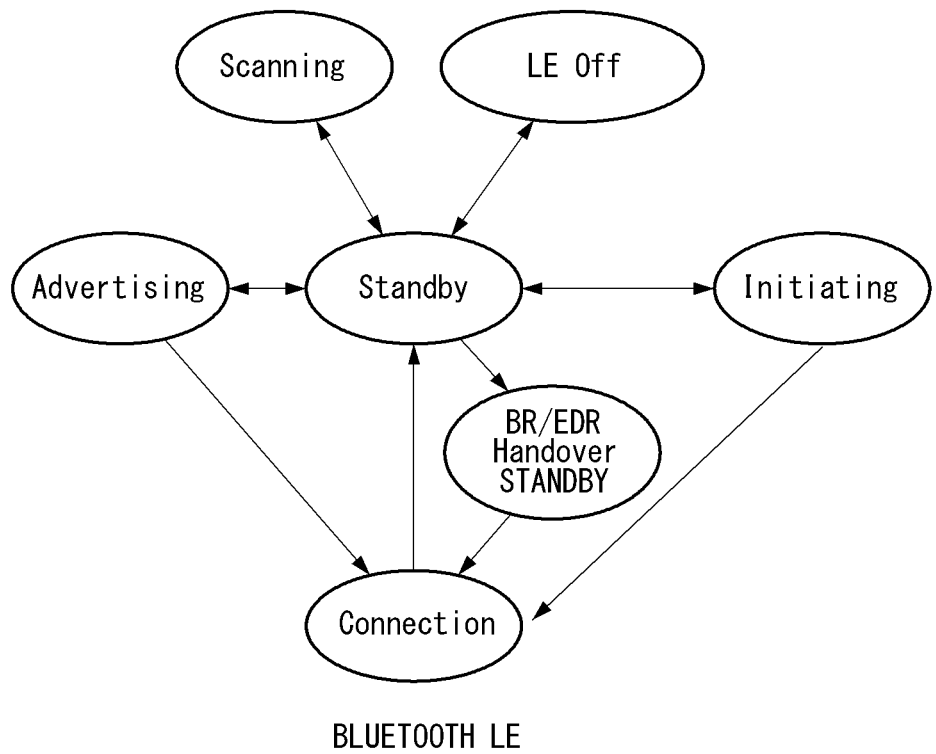
BLUETOOTH LE

[FIG. 35]
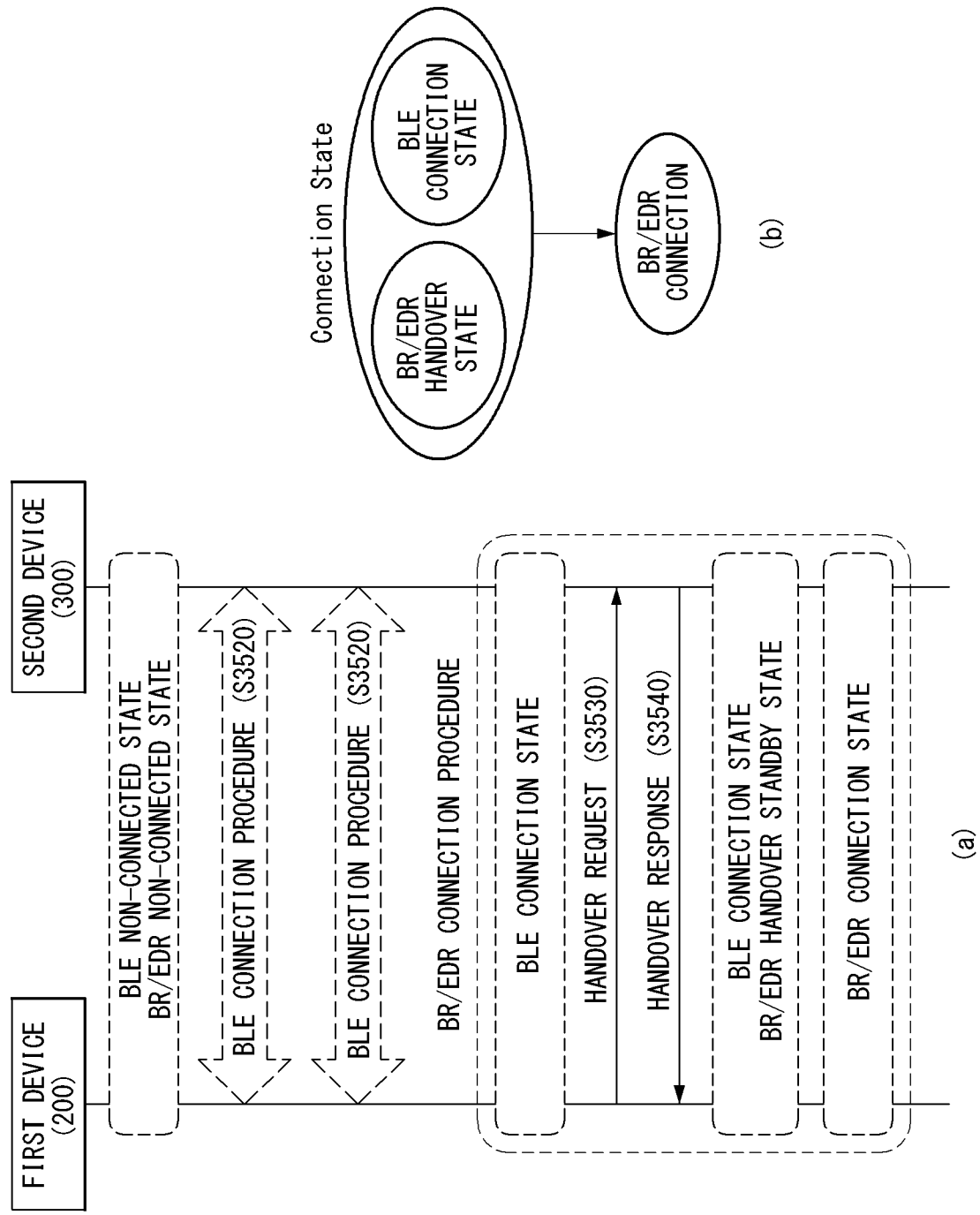

[FIG. 36]
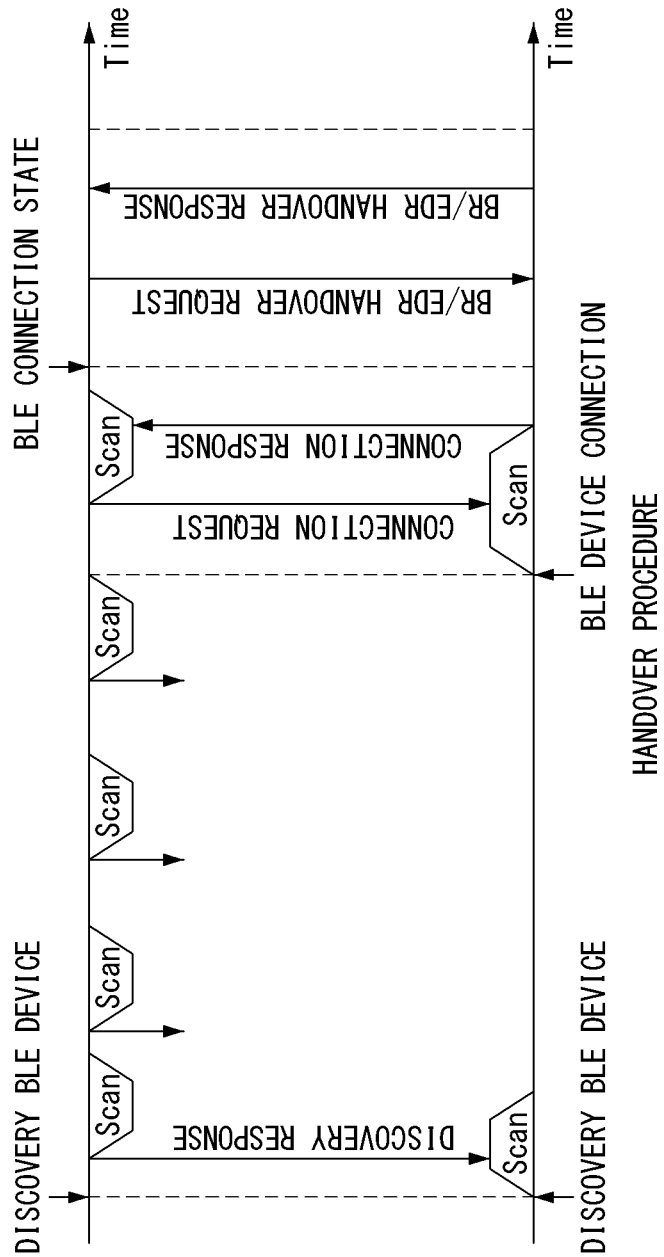

[FIG. 37]
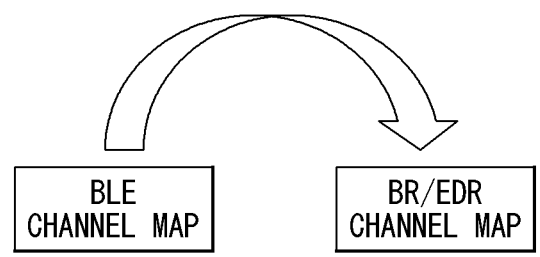
(a)
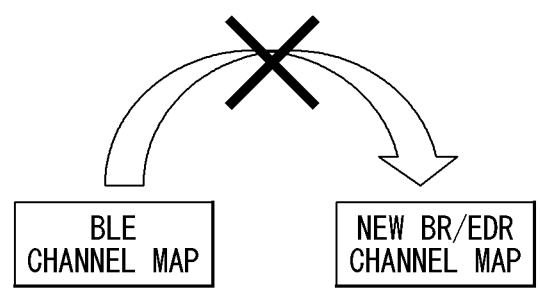
(b)

[FIG. 38]
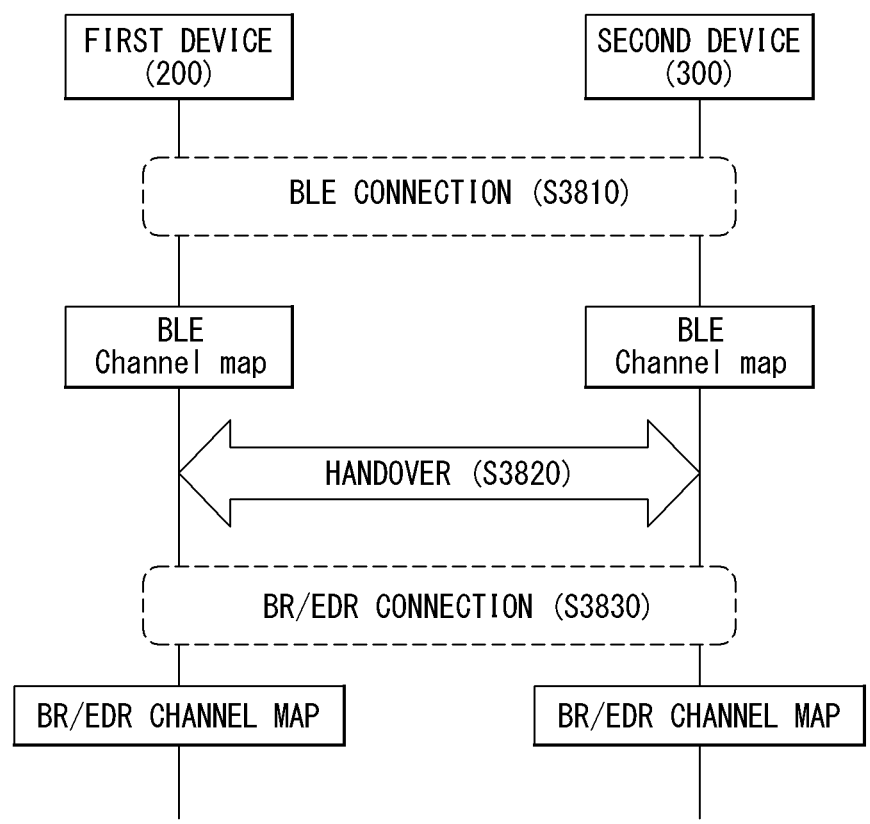

[FIG. 39]
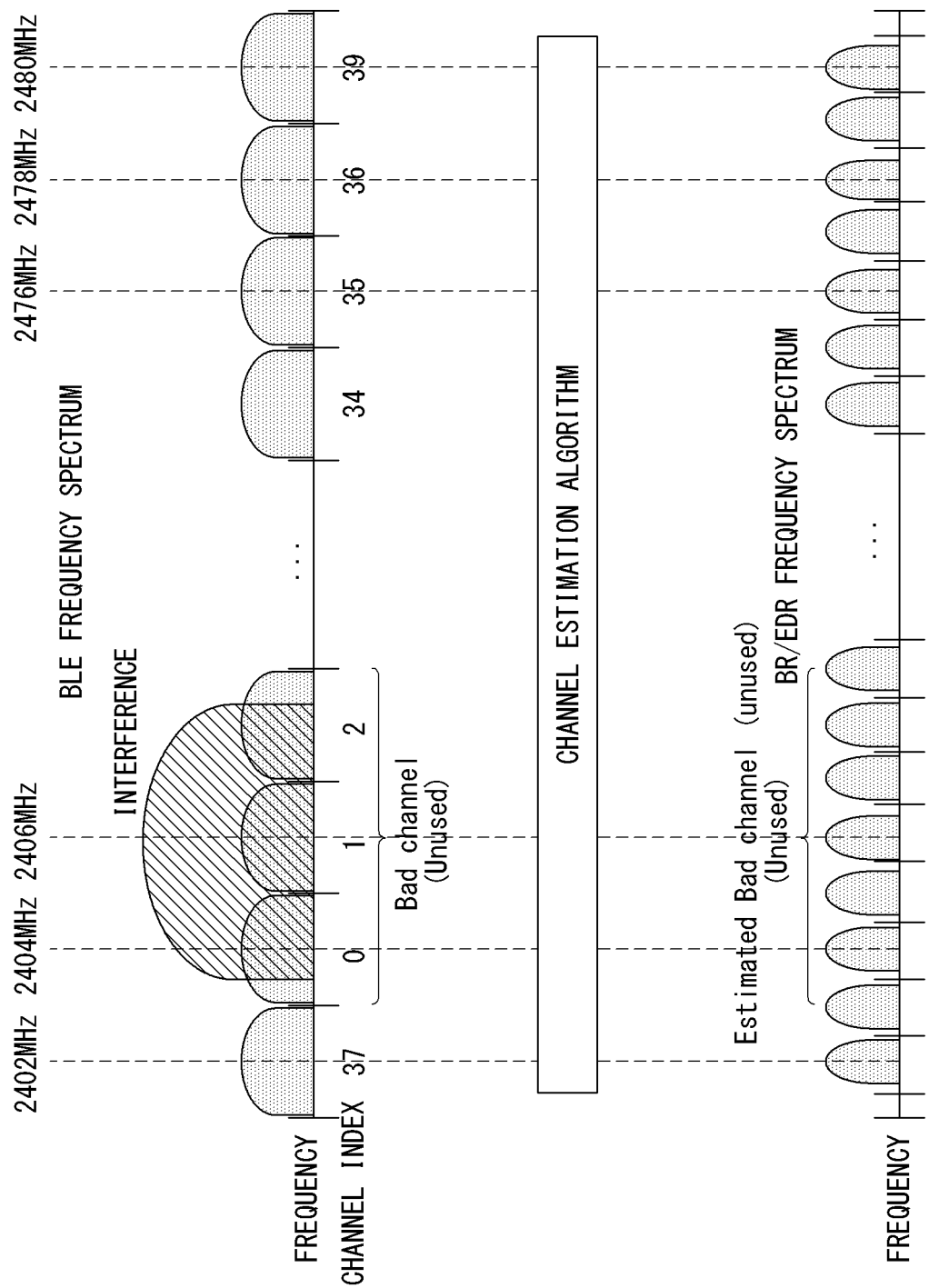

[FIG. 40a]
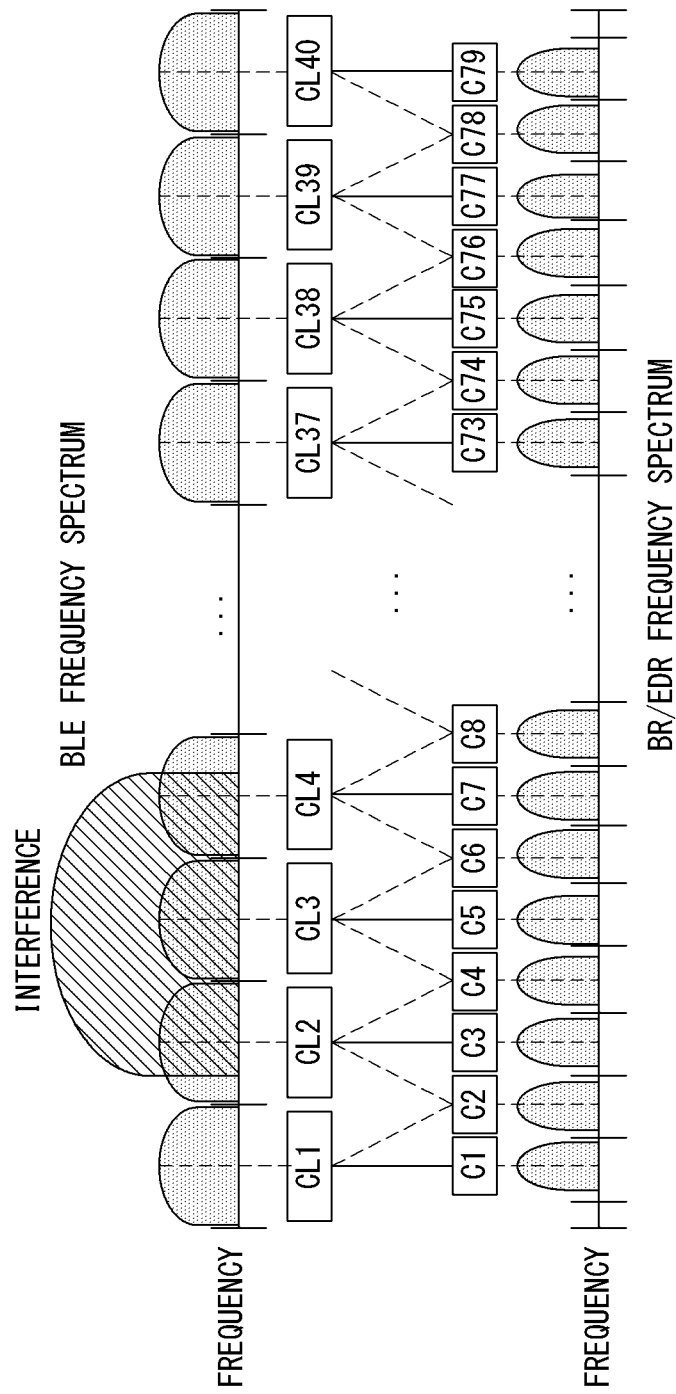

[FIG. 40b]

| | BR/EDR RF Channel index |
|---|---|
| 0 | 0, 1 |
| 1 | 1, 2, 3 |
| 2 | 3, 4, 5 |
| 3 | 5, 6, 7 |
| 4 | 7, 8, 9 |
| 5 | 9, 10, 11 |
| 6 | 11, 12, 13 |
| ... | ... |
| 35 | 69, 70, 71 |
| 36 | 71, 72, 73 |
| 37 | 73, 74, 75 |
| 38 | 75, 76, 77 |
| 39 | 77, 78 |

(a) BLE → BR/EDR

| | BLE RF Channel index |
|---|---|
| 0 | 0 |
| 1 | 0, 1 |
| 2 | 1 |
| 3 | 1, 2 |
| 4 | 2 |
| 5 | 2, 3 |
| 6 | 3 |
| ... | ... |
| 74 | 37 |
| 75 | 37, 38 |
| 76 | 38 |
| 77 | 38, 39 |
| 78 | 39 |

(b) BR/EDR → BLE

[FIG. 40c]
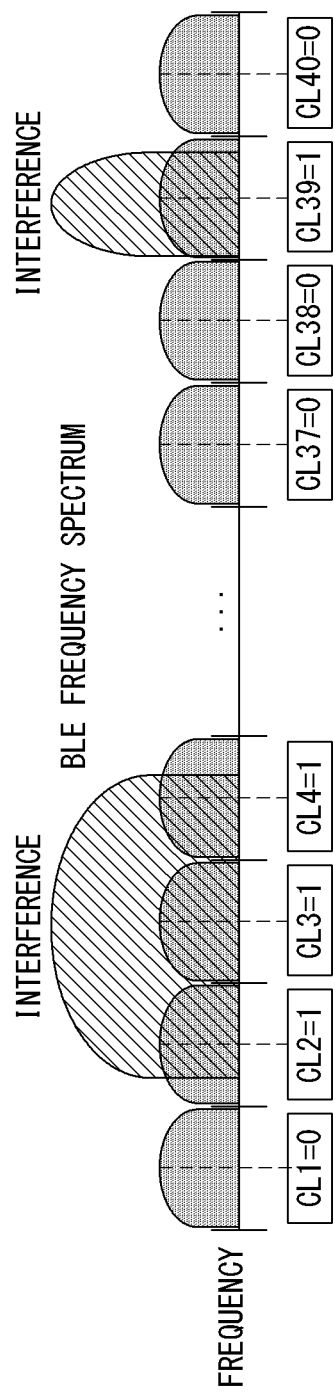

[FIG. 40d]

| EC index | Value |
|---|---|
| EC1 | 0 |
| EC2 | 0.5 |
| EC3 | 1 |
| EC4 | 1 |
| EC5 | 1 |
| EC6 | 1 |
| EC7 | 1 |
| EC8 | 0.5 |
| EC9 | 0 |
| EC10 | 0 |
| ... | ... |
| EC75 | 0 |
| EC76 | 0.5 |
| EC77 | 1 |
| EC78 | 0.5 |
| EC79 | 0 |

(a) EC RESULT VALUE

| EC index | Value |
|---|---|
| C1 | Used |
| C2 | Unused |
| C3 | Unused |
| C4 | Unused |
| C5 | Unused |
| C6 | Unused |
| C7 | Unused |
| C8 | Unused |
| C9 | Used |
| C10 | Used |
| ... | ... |
| C75 | Used |
| C76 | Unused |
| C77 | Unused |
| C78 | Unused |
| C79 | Used |

(b) USED WHEN EC VALUE IS LESS THAN 0.5

| EC index | Value |
|---|---|
| C1 | Used |
| C2 | Used |
| C3 | Unused |
| C4 | Unused |
| C5 | Unused |
| C6 | Unused |
| C7 | Unused |
| C8 | Used |
| C9 | Used |
| C10 | Used |
| ... | ... |
| C75 | Used |
| C76 | Used |
| C77 | Unused |
| C78 | Used |
| C79 | Used |

(c) USED WHEN EC VALUE IS EQUAL TO OR LESS THAN 0.5

[FIG. 41]
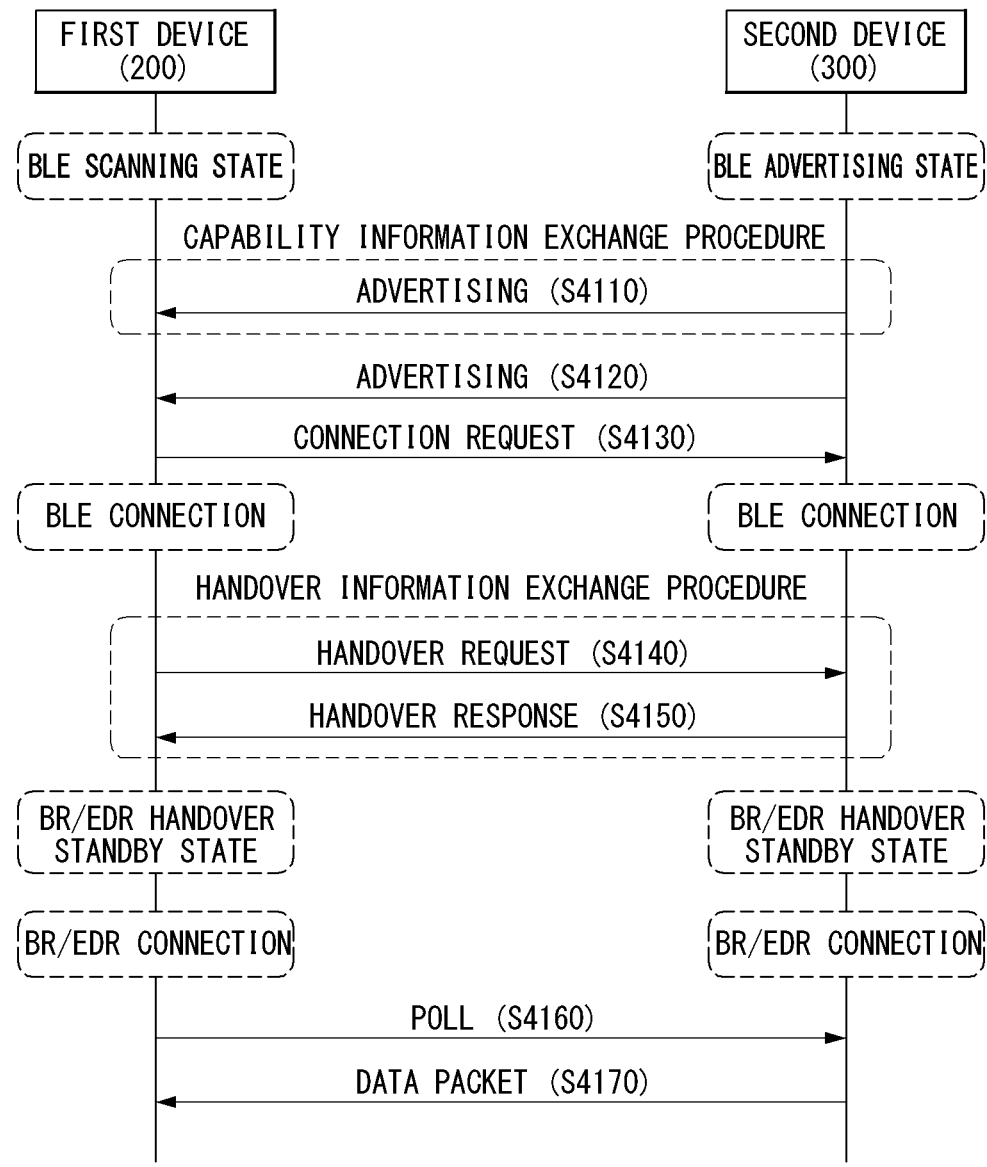

[FIG. 42]
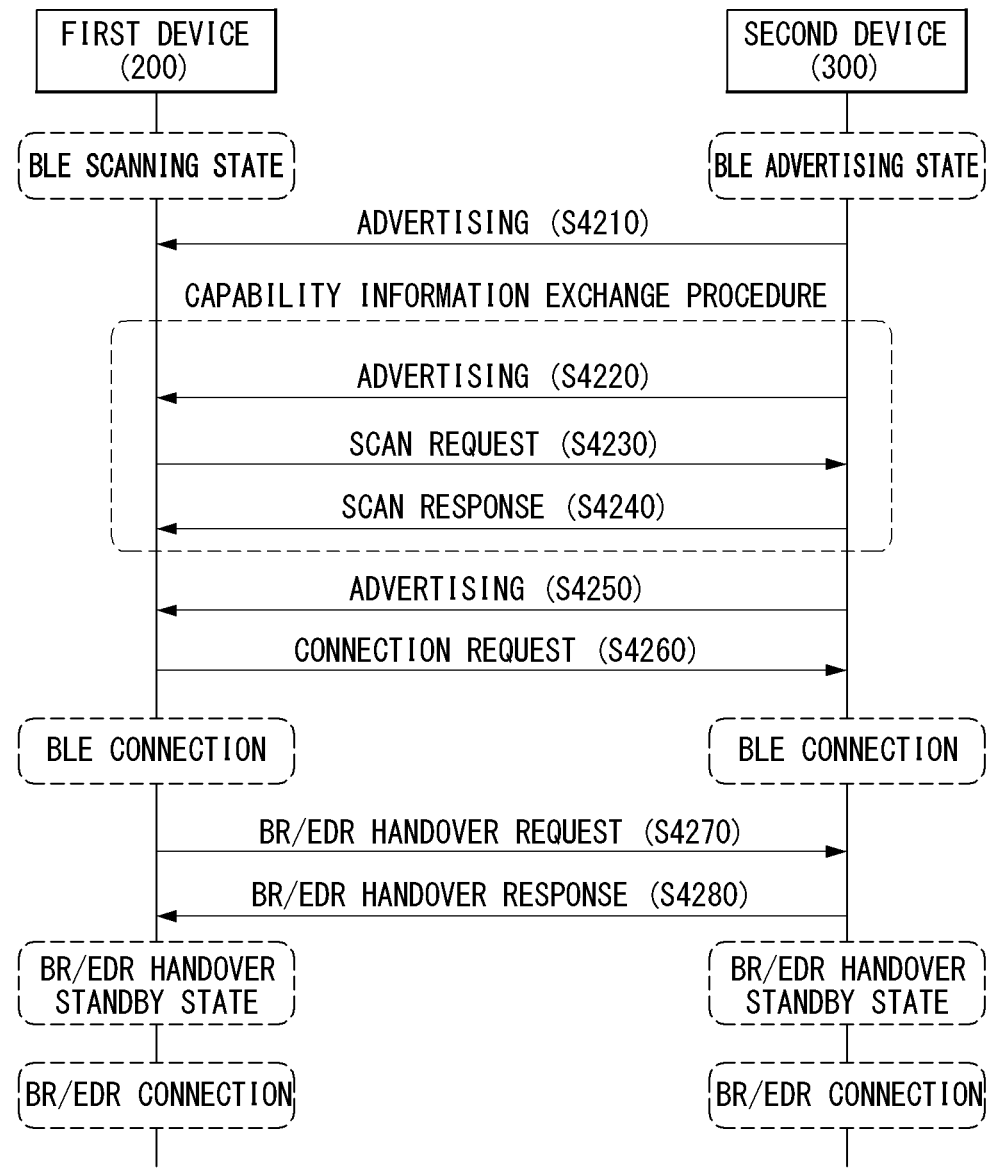

[FIG. 43]
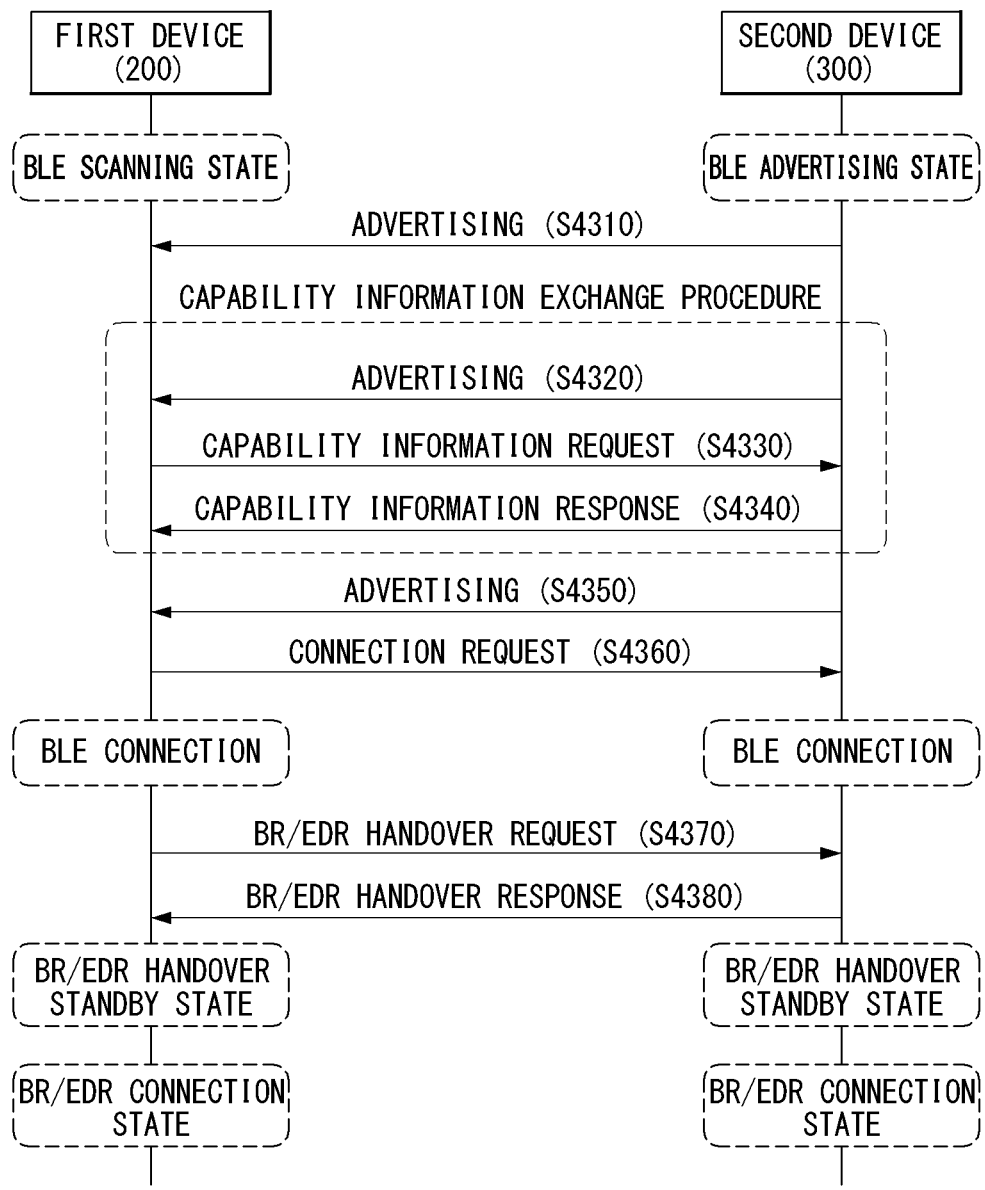

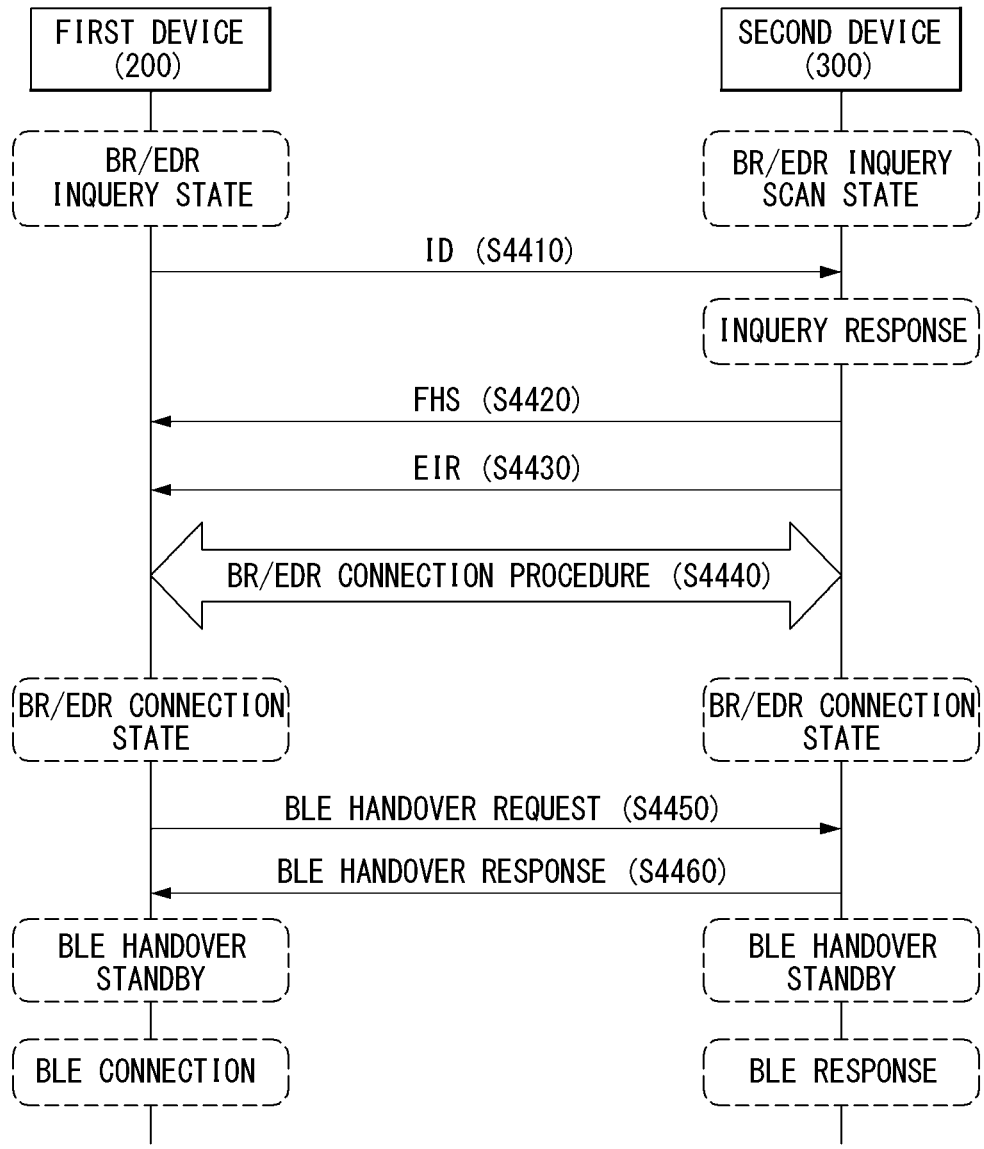
[FIG. 44]

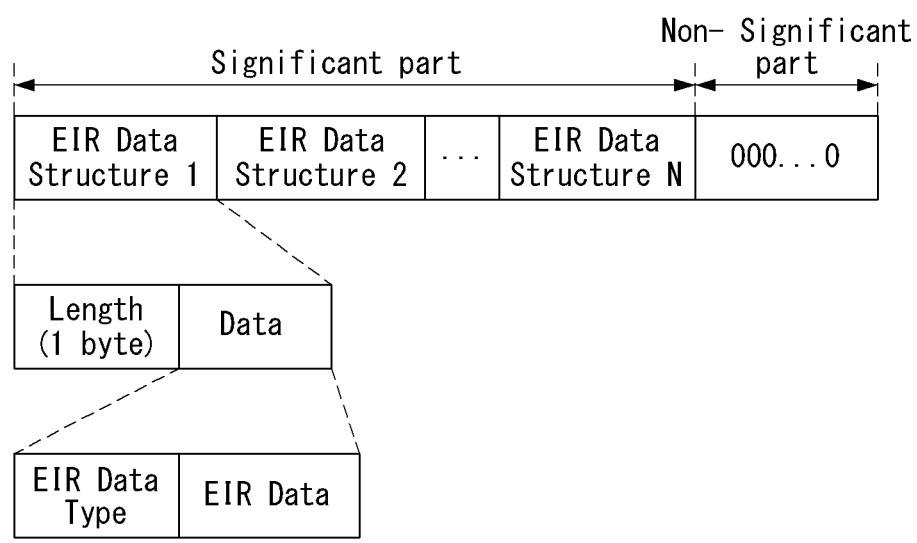
[FIG. 45]

[FIG. 46]
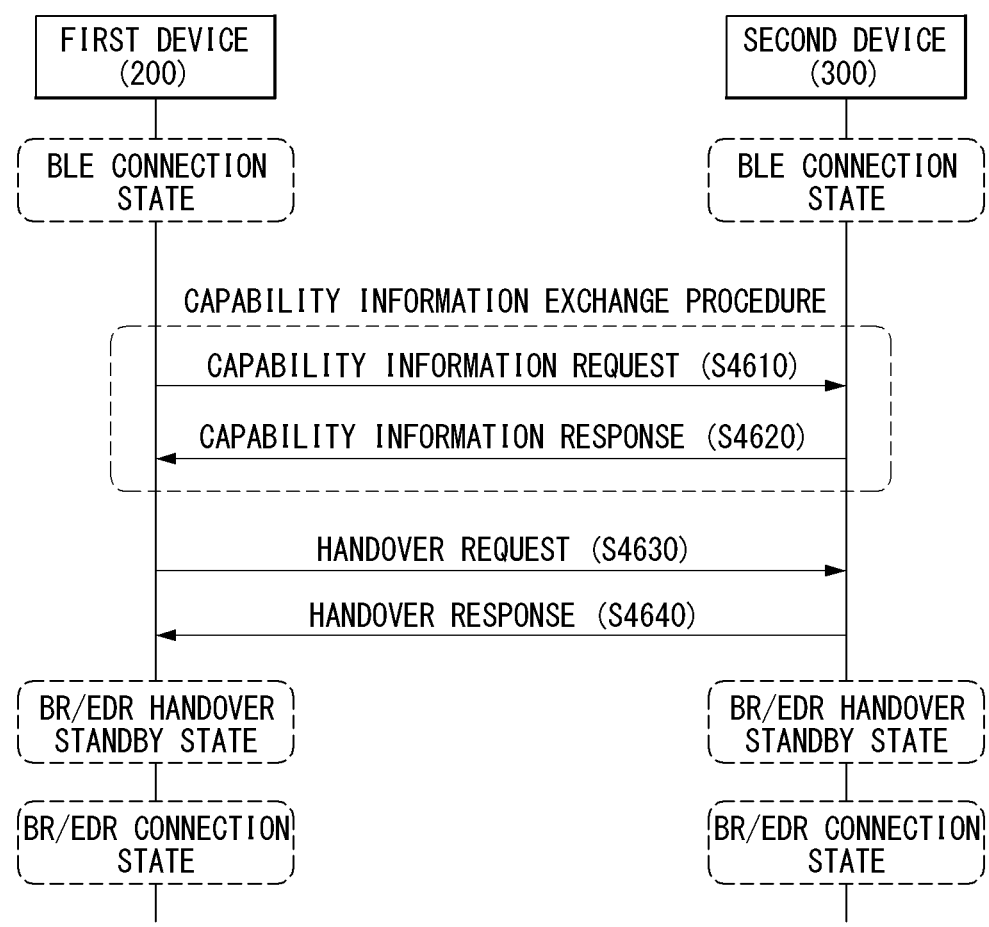

[FIG. 47]

| Payload | |
|---|---|
| Opcode (6B) | Ctr Data (0 ~ 26B) |

(a) PAYLOAD

| Opcode | Control PDU Name |
|---|---|
| 0x00 | LL_CONNECTION_UPDATE_REQ |
| 0x01 | LL_CHANNEL_MAP_REQ |
| 0x02 | LL_TERMINATE_IND |
| ... | ... |
| 0x12 | LL_PING_REQ |
| 0x13 | LL_PING_RSP |
|  | LL_Capability information exchange_REQ |
|  | LL_Capability information exchange_RSP |
| 0x16-0xFF | Reserved for Future Use |

(b) Opcode

[FIG. 48]
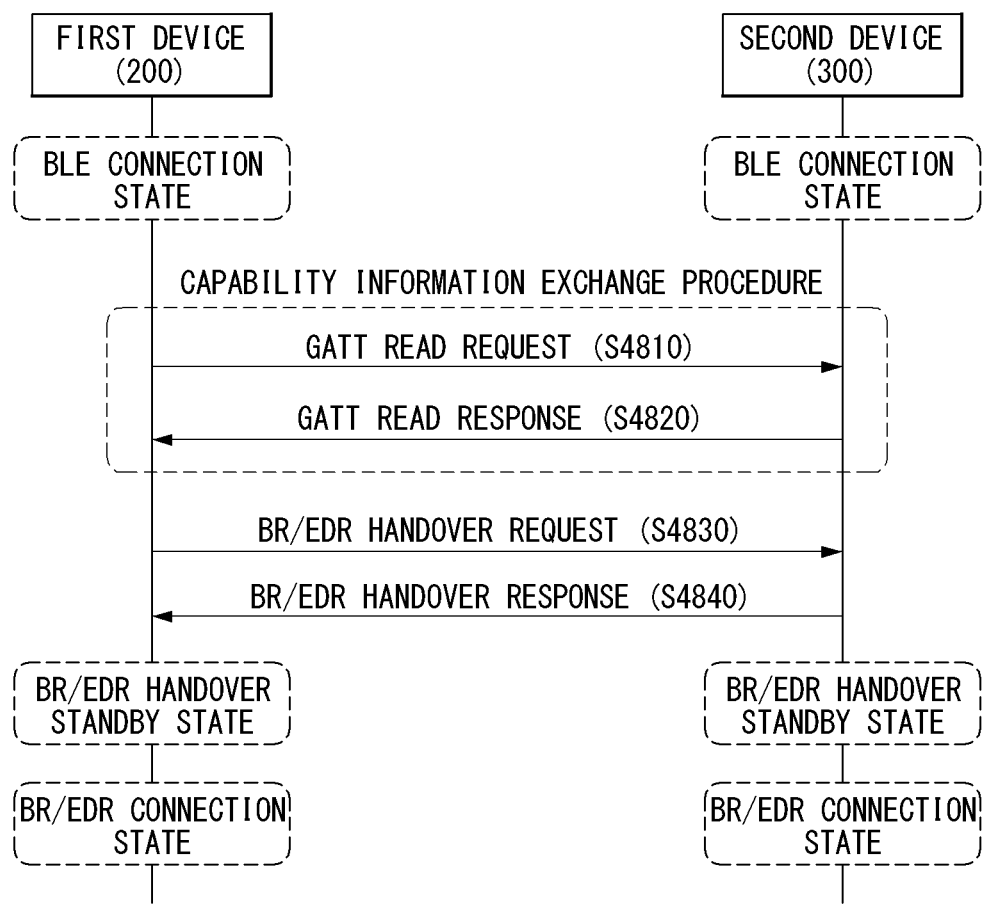

[FIG. 49]
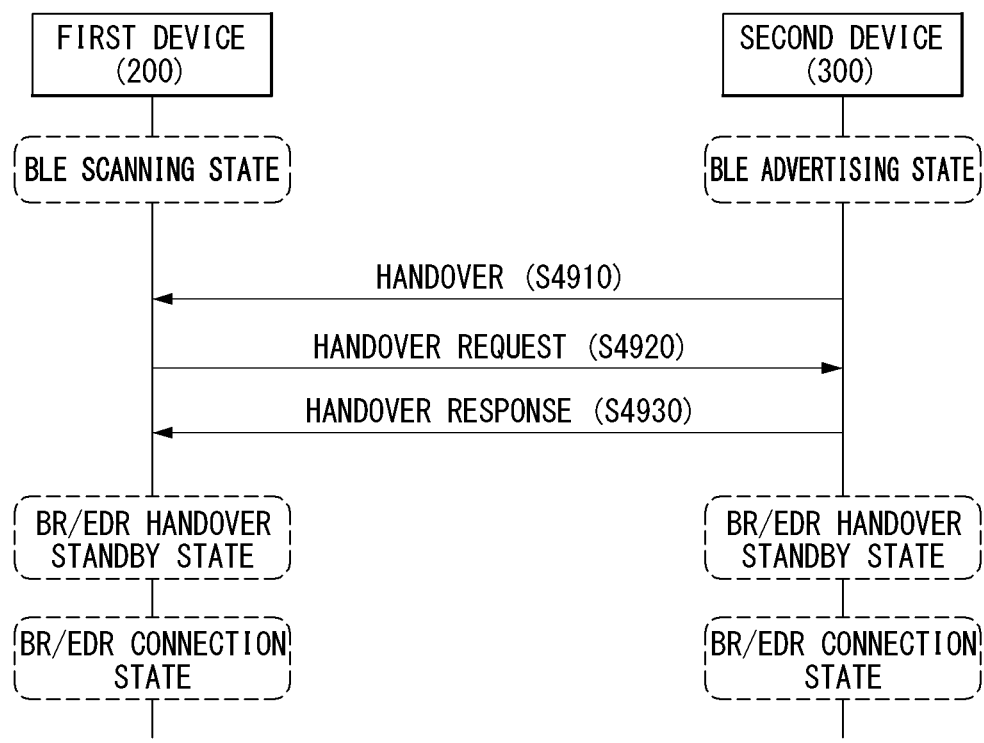

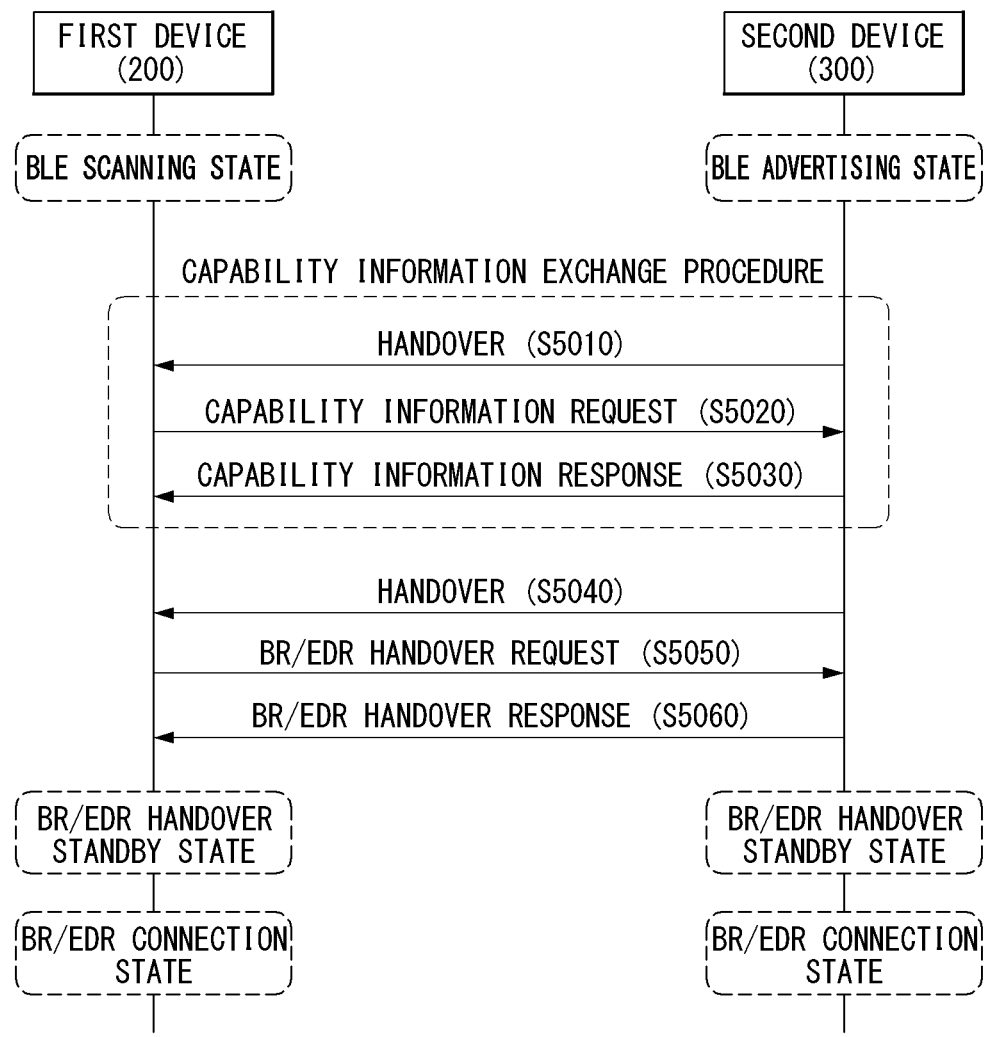
[FIG. 50]

[FIG. 51a]
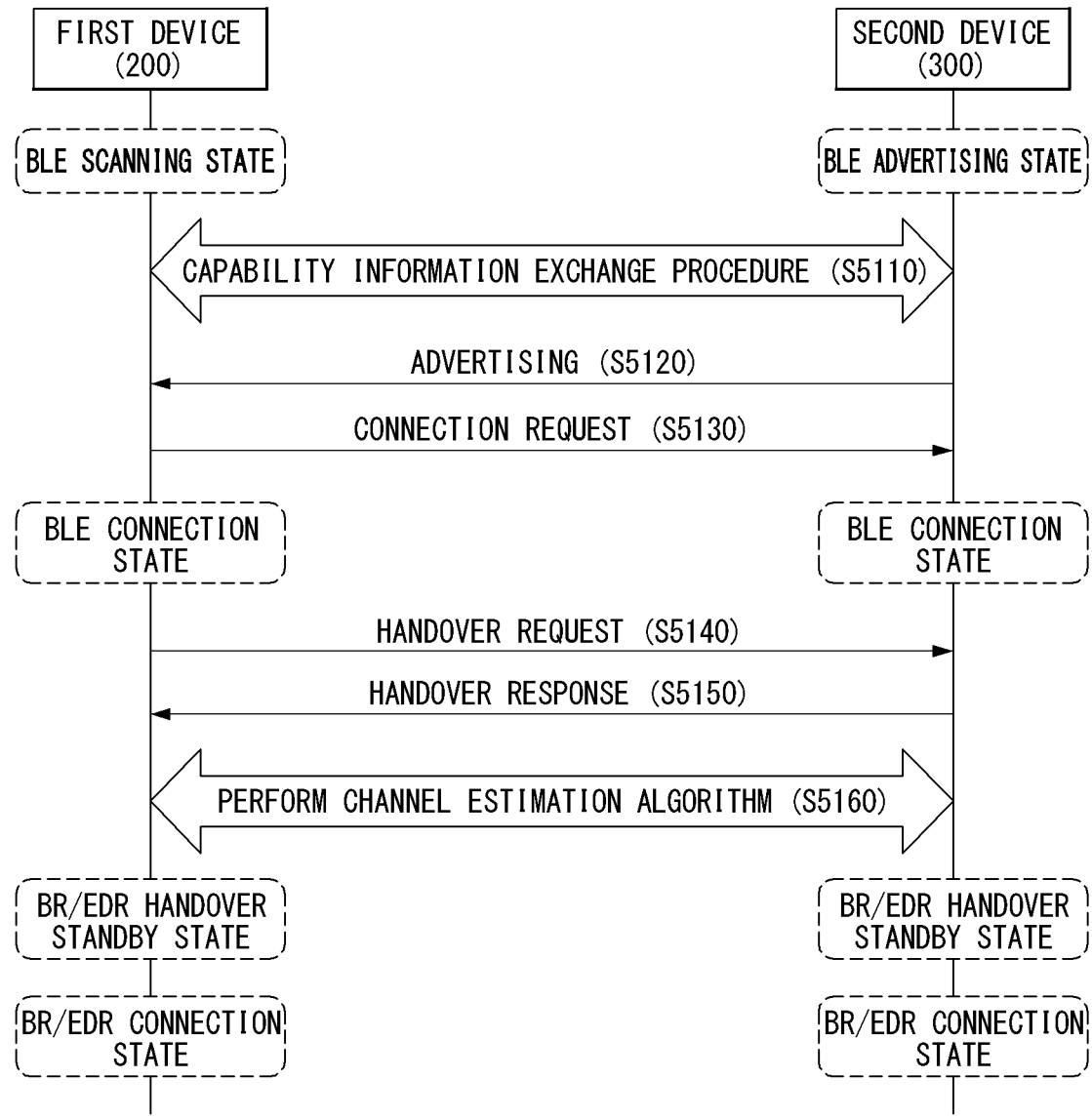

[FIG. 51b]

| Payload | |
|---|---|
| Opcode (6B) | Ctr Data (0 ~ 26B) |

(a) PAYLOAD

| Opcode | Control PDU Name |
|---|---|
| 0x00 | LL_CONNECTION_UPDATE_REQ |
| 0x01 | LL_CHANNEL_MAP_REQ |
| 0x02 | LL_TERMINATE_IND |
| ... | ... |
| 0x12 | LL_PING_REQ |
| 0x13 | LL_PING_RSP |
|  | LL_BR/EDR Handover_REQ |
|  | LL_BR/EDR Handover_RSP |
| 0x16-0xFF | Reserved for Future Use |

(b) Opcode

[FIG. 52]
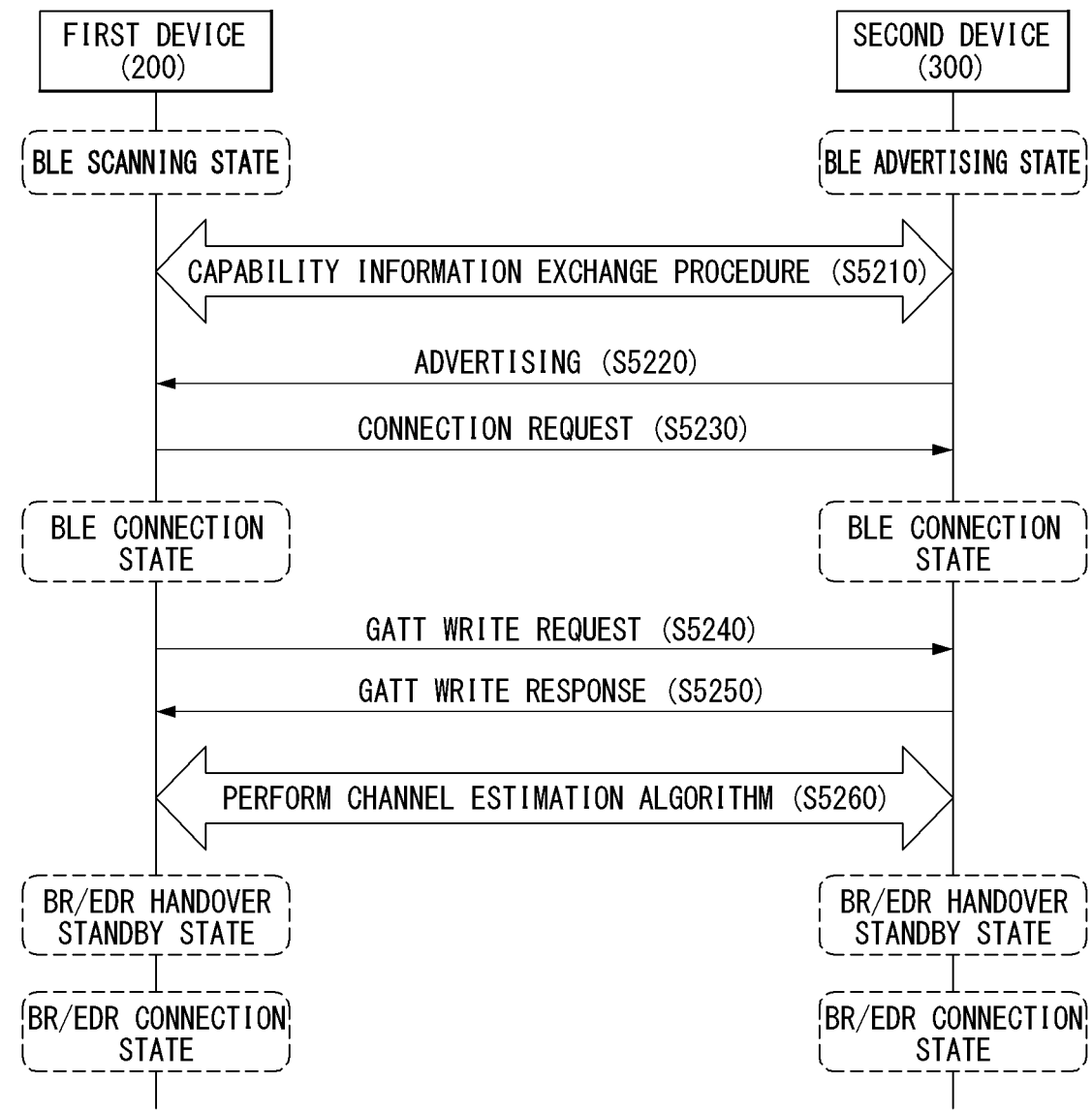

[FIG. 53]
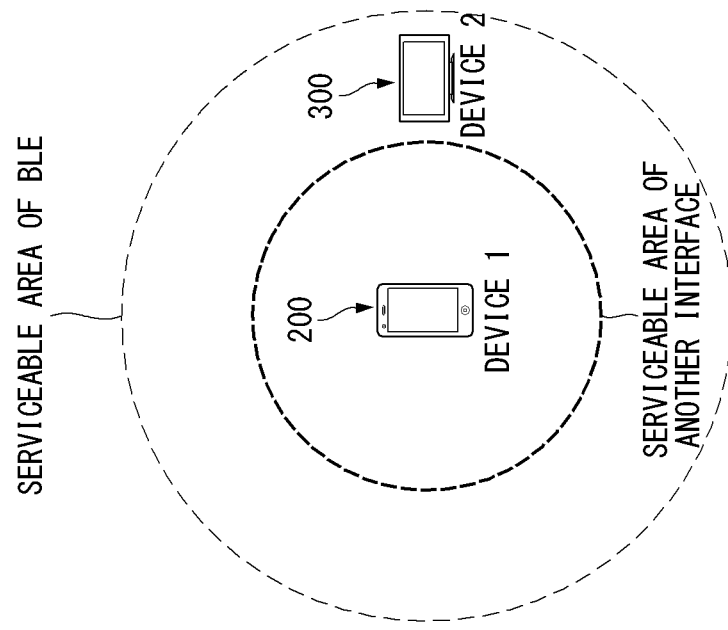
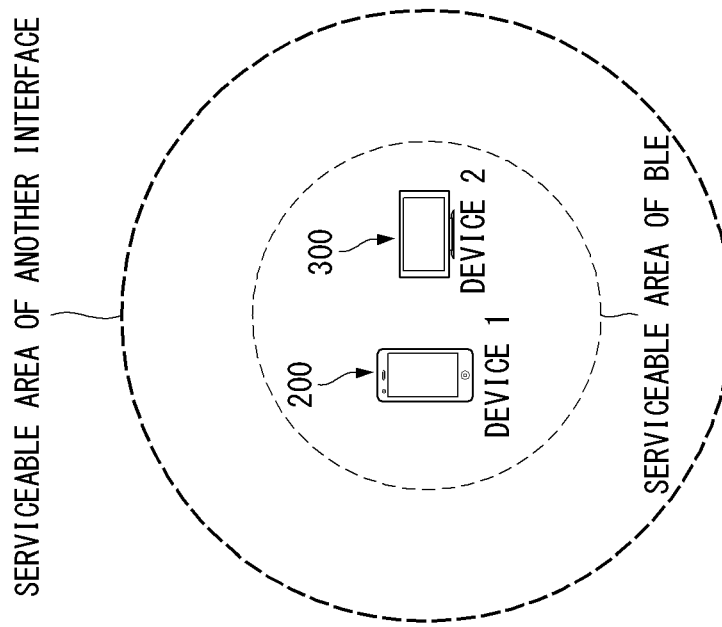

[FIG. 54]
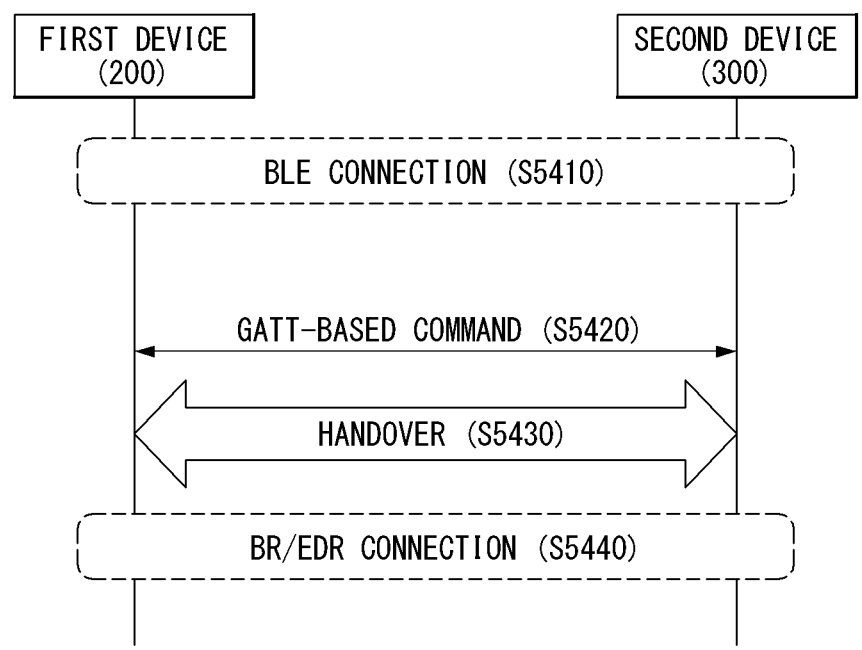

METHOD AND APPARATUS FOR CONTROLLING ELECTRONIC DEVICE IN WIRELESS COMMUNICATION SYSTEM SUPPORTING BLUETOOTH COMMUNICATION

CROSS REFERENCE TO RELATED APPLICATIONS

This application is the National Phase of PCT International Application No. PCT/KR2015/004675, filed on May 11, 2015, which claims priority under 35 U.S.C. 119(e) to U.S. Provisional Application Nos. 62/031,167, filed on Jul. 31, 2014; 62/067,406, filed on Oct. 22, 2014; 62/068,749, filed on Oct. 26, 2014; 62/080,383, filed on Nov. 16, 2014; and 62/103,025, filed on Jan. 13, 2015, all of which are hereby expressly incorporated by reference into the present application.

TECHNICAL FIELD

The present invention relates to a method and an apparatus for transmitting information of a wireless network in a wireless communication system, and particularly, to a method and an apparatus for connecting Bluetooth low energy (LE) by Bluetooth BR/EDR through the Bluetooth LE or through the Bluetooth BR/EDR.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

An object of the present invention is to provide a method for discovering an alternative communication means and a service of the alternative communication means through Bluetooth communication.

Further, another object of the present invention is to provide a method for establishing a connection by discovering the alternative communication means and the service of the alternative communication means through Bluetooth low energy (LE) communication.

In addition, yet another object of the present invention is to provide a method for reducing power consumption by deactivating another alternative communication means in addition to the Bluetooth low energy (LE) communication.

Moreover, still yet another object of the present invention is to provide a method for simplifying a connection procedure of the alternative communication means by acquiring information required for connecting the alternative communication means by using the Bluetooth low energy (LE) communication.

Besides, still yet another object of the present invention is to increase user convenience because multiple wireless communication means may be connected by using one wireless communication means.

Technical Solution

In order to address the aforementioned problem, the present invention provides a method and an apparatus for connecting an alternative communication means through Bluetooth low energy (LE) technology.

In detail, according to an embodiment of the present invention, provided is a method for connecting an alternative communication means through Bluetooth low energy (LE), including: receiving an advertising message from a second device; transmitting a request message for requesting detailed information associated with the Bluetooth BR/EDR connection to the second device based on the advertising message; receiving a response message including the detailed information from the second device in response to the request message; transmitting a connection request message to the second device based on the detailed information; and establishing the Bluetooth BR/EDR LE connection with the second device, wherein the advertising message includes at least one of location information of the detailed information and available information of the Bluetooth BR/EDR.

Further, in the present invention, the location information indicates a scan response message, a Generic Attribute Profile (GATT) data base, and one of the scan response message and the GATT data base.

In addition, in the present invention, the detailed information includes at least one of frequency information, channel map switching information, transmission power information, and connection state information.

Moreover, in the present invention, when the channel map switching information has a value of 'True', a Bluetooth BR/EDR channel map is generated based on a channel map of the Bluetooth LE.

Further, the method further includes establishing the Bluetooth BR/EDR channel map through a channel estimation algorithm.

In addition, in the present invention, the connection request message includes at least any one of device type information, service type information, and service providing distance information.

Further, according to the present invention, provided is a method including: transmitting an ID packet to a second device; receiving a response message including first information associated with an alternative interface from the second device in response to the ID packet; establishing a Bluetooth BR/EDR LE connection with the second device; transmitting a handover request message through the formed Bluetooth BR/EDR connection; receiving a handover response message as the response to the hand over request message; and establishing an alternative interface link with the second device, wherein the first information associated with the alternative interface includes at least one of a device type, a service type, and a service providing range, and at least one of the handover request message and the handover response message includes second information associated with connection of the alternative interface.

In addition, in the present invention, the second information includes at least one of frequency information, channel map switching information, transmission power information, and connection state information.

Moreover, in the present invention, when the channel map switching information has a value of 'True', a channel map of the alternative interface is generated based on the channel map of Bluetooth LE.

Further, the method further includes forming the Bluetooth BR/EDR channel map through a channel estimation algorithm.

According to the present invention, provided is an apparatus including: a communication unit for transceiving a signal with the outside by a wired and/or wireless scheme; and a control unit functionally connected with the communication unit, wherein the control unit performs a control to receive an advertising message from a second device, transmit a request message for requesting detailed information associated with the Bluetooth BR/EDR connection to the second device based on the advertising message, receive a response message including the detailed information from the second device in response to the request message, transmit a connection request message to the second device based on the detailed information, and form the Bluetooth BR/EDR LE connection with the second device, and the advertising message includes at least one of location information of the detailed information and available information of the Bluetooth BR/EDR.

Further, in the present invention, the location information indicates a scan response message, a Generic Attribute Profile (GATT) data base, and one of the scan response message and the GATT data base.

In addition, in the present invention, the detailed information includes at least one of frequency information, channel map switching information, transmission power information, and connection state information.

Moreover, in the present invention, when the channel map switching information has a value of 'True', a Bluetooth BR/EDR channel map is generated based on a channel map of the Bluetooth LE.

Further, according to the present invention, provided is an apparatus including: a communication unit for transceiving a signal with the outside by a wired and/or wireless scheme; and a control unit functionally connected with the communication unit, wherein the control unit performs a control to transmit an ID packet to a second device, receive a response message including first information associated with an alternative interface from the second device in response to the ID packet, form a Bluetooth BR/EDR LE connection with the second device, transmit a handover request message through the formed Bluetooth BR/EDR connection, receive a handover response message as the, response to the hand over request message, and form an alternative interface link with the second device, the first-information associated with the alternative interface includes at least one of a device type, a service type, and a service providing range, and at least one of the handover request message and the handover response message includes second information associated with connection of the alternative interface.

Advantageous Effects

According to a method for connecting a wireless communication means through Bluetooth low energy (LE) in accordance with an embodiment of the present invention, multiple wireless communication means is connected by using one wireless communication means to increase user convenience.

Further, according to the method for connecting a wireless communication means in accordance with the embodiment of the present invention, information for a Bluetooth BR/EDR connection can be acquired through the Bluetooth LE to efficiently perform handover.

Further, according to the method for connecting a wireless communication means in accordance with the embodiment of the present invention, since a device discovery process for the Bluetooth BR/EDR connection is not performed through the Bluetooth LE to simplify a connection procedure and reduce power consumption.

In addition, according to the method for connecting a wireless communication means in accordance with the embodiment of the present invention, since a channel map of the Bluetooth BR/EDR can be configured after the handover through the channel map of the Bluetooth LE, a channel map configuration procedure is simplified and power is reduced.

Further, according to the method for connecting a wireless communication means in accordance with the embodiment of the present invention, since a channel map of the Bluetooth LE can be configured after the handover through the channel map of the Bluetooth BR/EDR, the channel map configuration procedure is simplified and the power is reduced.

DESCRIPTION OF DRAWINGS

FIG. 1 is a schematic view illustrating an example of a wireless communication system using a Bluetooth low energy technology proposed in this specification.

FIG. 2 illustrates an example of a connection method of a device-to-device wireless communication interface.

FIG. 3 is a view illustrating an example of a Bluetooth low energy topology.

FIG. 4 is a view illustrating an example of a Bluetooth communication architecture proposed in this specification.

FIG. 5 illustrates one example of an internal block diagram of a device which may implement methods proposed by this specification.

FIG. 6 is a diagram illustrating search and connection procedures of Bluetooth BR/EDR.

FIG. 7 is a diagram simplifying and illustrating the search and connection procedures of the Bluetooth BR/EDR.

FIG. 8 is a diagram illustrating a connection procedure of the Bluetooth BR/EDR after a Bluetooth LE connection.

FIG. 9 is a diagram illustrating a data format and a procedure for transmitting Channel Map information in the Bluetooth LE.

FIG. 10 is a diagram showing a channel map configuration of the Bluetooth LE and the Bluetooth BR/EDR.

FIG. 11 shows an example of a wireless communication interface structure proposed in the present specification.

FIG. 12 is a flowchart illustrating an example of a method of providing information of a wireless communication interface proposed in the present specification.

FIG. 13 is a diagram showing an example of a data format of the detailed information described in FIG. 12.

FIG. 14 and FIG. 15 are diagrams illustrating another example of a method for providing information of a wireless communication interface proposed in the present specification.

FIG. 16 is a diagram showing another example of a method of providing information of a wireless communication interface proposed in the present specification.

FIG. 17 and FIG. 18 are diagrams showing a GATT (Generic Attribute Profile) structure of Bluetooth as an example of the tree structure shown in FIG. 16.

FIG. 19 and FIG. 20 are diagrams showing an example of wireless communication interface information of a GATT structure proposed in the present specification.

FIG. 21 and FIG. 22 are diagrams illustrating an example of a method and a data format for providing information of a wireless communication interface through the Bluetooth LE connection process proposed in the present specification.

FIG. 23 is a flowchart illustrating another example of a method for providing information of a wireless communication interface through a Bluetooth LE connection process proposed in the present specification.

FIG. 24 is a flowchart illustrating an example of a method of providing information of a wireless communication interface through the Bluetooth LE proposed in the present specification.

FIG. 25 is a flowchart showing another example of a method for providing information of a wireless communication interface through the Bluetooth LE proposed in the present specification.

FIG. 26 is a flowchart illustrating an example of a Bluetooth LE connection procedure and a method for providing information of a wireless communication interface through the Bluetooth LE proposed in the present specification.

FIG. 27 is a flowchart illustrating another example of a Bluetooth LE connection procedure and a method for providing information of a wireless communication interface through the Bluetooth LE proposed in the present specification.

FIG. 28 is a flowchart illustrating another example of a method for providing information of a wireless communication interface through the Bluetooth LE connection process proposed in the present specification.

FIG. 29 and FIG. 30 are diagrams showing another example of a data format proposed in the present specification.

FIG. 31 is a flowchart showing another example of a method for providing information of a wireless communication interface through the Bluetooth LE proposed in the present specification.

FIG. 32 is a diagram showing an example of a UI (User Interface) proposed in the present specification.

FIG. 33A to FIG. 33C are flowcharts illustrating a method for exchanging information required for a Bluetooth BR/EDR connection through the Bluetooth LE proposed in the present specification.

FIG. 34A and FIG. 34B are diagrams showing an example of state change of the Bluetooth LR and the Bluetooth BR/EDR proposed in the present specification.

FIG. 35 is a flowchart showing an example of a method proposed in the present specification for performing handover from Bluetooth LE (Low Energy) to Bluetooth BR/EDR.

FIG. 36 is a flowchart briefly showing an example for handover from Bluetooth LE (Low Energy) to Bluetooth BR/EDR proposed in the present specification.

FIG. 37 is a diagram illustrating an example of a method for sharing a channel map between wireless communication interfaces proposed in the present specification.

FIG. 38 is a flowchart illustrating an example of a method for sharing a channel map between wireless communication interfaces proposed in the present specification.

FIG. 39 is a diagram for comparing channels for channel map estimation between Bluetooth LE (Low Energy) and Bluetooth BR/EDR proposed in the present specification.

FIG. 40A and FIG. 40B are views showing an example of a channel map estimation method between Bluetooth LE (Low Energy) and Bluetooth BR/EDR proposed in this specification.

FIG. 40C and FIG. 40D are diagrams showing an example of a channel map estimation result proposed in the present specification.

FIG. 41 is a flowchart showing an example of a method for handover from Bluetooth LE to Bluetooth BR/EDR proposed in the present specification.

FIG. 42 is a flowchart showing another example of a method for handover from Bluetooth LE to Bluetooth BR/EDR proposed in the present specification.

FIG. 43 is a flowchart showing another example of a method for handover from Bluetooth LE to Bluetooth BR/EDR proposed in the present specification.

FIG. 44 and FIG. 45 are diagrams showing an example of a method and a data structure for handover from the Bluetooth BR/EDR to the Bluetooth LE proposed in the present specification.

FIG. 46 and FIG. 47 are diagrams showing an example of a method and a data structure for handover from the Bluetooth LE to the Bluetooth BR/EDR proposed in the present specification.

FIG. 48 is a flowchart showing another example of a method of handover from Bluetooth LE to Bluetooth BR/EDR proposed in the present specification.

FIG. 49 is a flowchart showing another example of a method for handover from Bluetooth LE to Bluetooth BR/EDR proposed in the present specification.

FIG. 50 is a flowchart showing another example of a method for handover from Bluetooth LE to Bluetooth BR/EDR proposed in the present specification.

FIG. 51A and FIG. 51B are diagrams illustrating an example of a method and a data format for estimating a channel map upon handover from a Bluetooth LE to a Bluetooth BR/EDR proposed in the present specification.

FIG. 52 is a flowchart showing another example of a method for estimating a channel map upon handover from Bluetooth LE to Bluetooth BR/EDR proposed in this specification.

FIG. 53 shows an example of a method proposed by the present invention for notifying a serviceable range among wireless communication interfaces.

FIG. 54 is a flowchart showing an example of exchanging frequency hopping synchronization (FHS) information of the Bluetooth BR/EDR proposed in the present specification through the Bluetooth LE.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Electronic devices in this document may include a cellular phone, smartphone, laptop computer, digital broadcasting terminal, personal digital assistants (PDA), portable multimedia player (PMP), navigation terminal, and temperature/barometer/biometric data sensor; however, it should be clearly understood by those skilled in the art that except for those specific cases applicable only to a mobile terminal, the structure according to the embodiments of the present invention can also be applied to fixed terminals such as a digital TV and a desktop computer.

A signal described in this document can be transmitted in the form of not only a message but also a frame. A wireless communication interface and a wireless communication means are assigned or used interchangeably by taking into account only the convenience of writing the specification of the present invention and do not have individual implications or provide individual roles that can be distinguished from each other.

FIG. 1 is a schematic view illustrating an example of a wireless communication system using a Bluetooth low energy technology proposed in this specification.

A wireless communication system 100 includes at least one server device 110 and at least one client device 120.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 110 may operate as a client device in a relationship with other device, and the client device may operate as a server device in a relationship with other device. That is, in the BLE communication system, any one device may operate as a server device or a client device, or may operate as both a server device and a client device if necessary.

The server device 110 can be denoted as a data service device, master device, master, server, conductor, host device, audio source device, gateway, or first device; and the client device can be denoted as a slave device, slave, client, member, sensor device, sink device, audio sink device, or second device.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 5.

Also, the wireless communication system may configure personal area networking (PAN) through the Bluetooth technology. For example, in the wireless communication system, a private piconet may be established between devices to quickly and safely exchange files, documents, and the like.

A BLE device (or apparatus) can operate to support various Bluetooth-related protocols, profiles, and processes.

An electronic device supporting the BLE also supports various wireless communication interfaces such as Wi-Fi, Bluetooth BR/EDR, and NFC.

Since it is difficult for various wireless communication interfaces to predict when a connection to a corresponding device is established, most electronic devices maintain a plurality of wireless communication interfaces to be at awake-up state.

These communication interfaces have a technical solution for minimizing standby power within idle time and also exhibit excellent energy efficiency due to the technical solution. However, it is highly restrictive to maintain all of wireless communication interfaces that can be newly devised with technological development to be at a wake-up state all the time, which can be more serious for battery-limited devices.

To overcome this situation, the present invention proposed a method which uses BLE as a wake-up interface and wakes up other wireless communication interfaces only upon a request being made.

FIG. 2 illustrates an example of a connection method of a device-to-device wireless communication interface.

Referring to FIG. 2, wireless communication interfaces included in the device perform a connection according to respective procedures.

In detail, in the case of a first device 200 and a second device 300 possessing multiple wireless communication interfaces, the respective wireless communication interfaces of the electronic apparatus performs roles thereof in respective different methods and forms for the same or similar purpose as illustrated in FIG. 2.

However, in most cases, there is a high probability that only one wireless communication interface will be used at any one time and when multiple wireless communication interfaces maintain a reception stand-by state for information exchange with target apparatuses in this regard, respectively, the resulting energy consumption may be unnecessarily generated.

In FIG. 2, when the first device 200 and the second device 300 intend to perform wireless communication through the Bluetooth BR/EDR, the first device 200 searches the Bluetooth BR/EDR of the second device 300, verifies a capability, and connects the second device 300 through the Bluetooth BR/EDR to perform the wireless communication.

Similarly thereto, when the first device 200 and the second device 300 intend to perform the wireless communication through near field communication (NFC), the first device 200 searches the Bluetooth BR/EDR of the second device 300, verifies the capability, and connects the second device 300 through the NFC.

As described above, it is inefficient that the multiple wireless communication interfaces continuously stands by for information exchange with the target apparatus, of which occurrence time may not be known in a single which may not occur in a single device in terms of energy efficiency.

Further, since a procedure performed for search and connection is diversified for each wireless communication interface, user convenience deteriorates.

The present invention proposes a method for unifying an interface for communication stand-by with the target apparatus to BLE and activating other wireless communication interfaces through the BLE only when needed in order to address such a problem.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

Device D is an advertiser and device A is an initiator (group D).

Device E is a scanner and Device C is an advertiser (group C).

Device H is an advertiser, and devices I and J are scanners (group H).

Device K is also an advertiser, and device N is an initiator (group K).

Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time FIG. 4 is a view illustrating an example of a Bluetooth communication architecture proposed in this specification.

With reference to FIG. 4, FIG. 4(a) illustrates one example of protocol stack of Bluetooth BR (Basic Rate)/EDR (Enhanced Data Rate), and FIG. 4(b) illustrates one example of a protocol stack of Bluetooth LE (Low Energy).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides the interface between the Host module and the Controller module to allow the host to provide the command and the data to the controller and the controller to provide the event and the data to the host.

The host stack (alternatively, host module 20) includes a logic link control and adaptation protocol (L2CAP) 21, a BR/EDR protocol 22, a generic access profile (GAP) 23, and a BR/EDR profile 24.

The logic link control and adaptation protocol (L2CAP) 21 may provide one bidirectional channel for transmitting the data to a specific protocol or profile.

The L2CAP 21 may multiplex various protocols, profiles, and the like provided in a higher Bluetooth layer.

The L2CAP of the Bluetooth BR/EDR uses a dynamic channel, supports a protocol service multiplexer, retransmission, and a streaming mode, and provides segmentation, reassembly, per-channel flow control, and error control.

The BR/EDR protocol 22 and the profiles 24 define a service (profile) using the Bluetooth BR/EDR and define an application protocol for transmitting and receiving the data and the generic access profile (GAP) 23 defines a scheme that discovers the device, connects the device, and provides information to the user and provides privacy.

As illustrated in FIG. 4(b), the Bluetooth LE protocol stack includes a controller stack 30 which is operable to process a wireless device interface of which a timing is important and a host stack 40 which is operable to process high-level data.

First, the controller stack 30 may be implemented by using a communication module which may include a Bluetooth wireless apparatus, for example, a processor module which may include a processing device such as a microprocessor.

The host stack may be implemented as a part of an OS which operates on the processor module or instantiation of a package above the OS.

In some cases, the controller stack and the host stack may be actuated or executed on the same processing device in the processor module.

The controller stack 30 includes a physical layer (PHY) 32, a link layer 34, and a host controller interface 36.

The physical layer (PHY) (wireless transceiving module) 32 as a layer that transceives a 2.4 GHz wireless signal uses Gaussian frequency shift keying (GFSK) modulation and a frequency hopping technique constituted by 40 RF channels.

The link layer 34 that serves to transmit or receive a Bluetooth packet performs advertising and scanning functions by using three advertising channels and thereafter, provides functions to generate a device-to-device connection and transmit and receive a data packet of a maximum of 42 bytes through 37 data channels.

In the present invention, information for a connection procedure of another wireless communication interfaces in addition to the BLUE may be exchanged between the devices by using the advertising or scanning function and the connection procedure of the another communication interface may be performed based on the exchanged information.

The host stack may include a generic access profile (GAP) 40, a logic link control and adaptation protocol (L2CAP) 41, a security manager (SM) 42, an attribute protocol (ATT) 440, a generic attribute profile (GATT) 44, a generic access profile 25, and an LT profile 46. However, the host stack 40 is not limited thereto and the host stack 40 may include various protocols and profiles.

The host stack may multiplex various protocols, profiles, and the like provided in the higher Bluetooth layer by using the L2CAP.

First, the logic link control and adaptation protocol (L2CAP) 41 may provide one bidirectional channel for transmitting the data to a specific protocol or profile.

The L2CAP 41 is operable to multiplex the data among higher layer protocols, segment and reassemble packages, and manage multicast data transmission.

In the Bluetooth LE, three fixed channels (one for a signaling CH, one for the security manager, and one for the attribute protocol) are used.

On the contrary, in basic rate/enhanced data rate (BR/EDR), the dynamic channel is used and the protocol service multiplexer, the retransmission, the streaming mode, and the like are supported.

The security manager (SM) 42 is a protocol for authenticating the device and providing key distribution.

The attribute protocol (ATT) 43 defines a rule for accessing data of a counter device in a server-client structure. The ATT includes six following message types (request, response, command, notification, indication, and confirmation).

① Request and Response message: a request message refers to the message used by a client device to request specific information from a server device, and a response message refers to the message transmitted by the server device to the client device in response to the request message.

② Command message: a message transmitted from a client device to a server device to command a specific operation. The server device does not transmit a response to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The generic access profile (GAP) 45 as a layer newly implemented for the Bluetooth LE technology is used for selecting a role for communication among Bluetooth LE devices and control how multi profiles are actuated.

Further, the generic access profile (GAP) 45 is primarily used in device discovery, connection creation, and security procedure parts and defines a scheme for providing the information to the user and defines the type of the attribute.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46 has a dependency on the GATT and is used mainly for Bluetooth LE devices. For example, the LE profile 46 includes Battery, Time, FindMe, Proximity, Time, Object Delivery Service, and the like; specific contents of the GATT-based profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 is operable as a protocol for describing how the attribute protocol 43 is used at the time of configuring the services. For example, the generic attribute profile (GATT) 44 is operable to regulate how ATT attributes are together grouped by the services and operable to describe features associated with the services.

Therefore, the generic attribute profile 44 and the attribute protocol (ATT) 43 may use the features in order to describe the status of the device and the services and describe how the features are associated with each other and how the features are used.

Hereinafter, the procedures of the Bluetooth low energy (BLE) technology will be described in brief.

The BLE procedures may be divided into a device filtering procedure, an advertising procedure, s scanning procedure, a discovering procedure, a connecting procedure, and the like.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

At this time, undirected broadcast refers to broadcasting in all directions rather than in a specific direction.

On the other hand, directed broadcast refers to broadcasting in a specific direction. Undirected broadcast is performed without involving a connection procedure between an advertising device and a device in a listening state (in what follows, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional user data from the advertising device. The advertising device transmits a scan response in response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 illustrates one example of an internal block diagram of a device which may implement methods proposed by this specification.

As illustrated in FIG. 5, the first device 200 and the second device 300 may include network interfaces 210 and 310, output units 220 and 320, input units 230 and 330, control units 240 and 340, multimedia modules 250 and 350, first storage units 260 and 360, and/or second storage units 270 and 370.

The internal block diagram of the device illustrated in FIG. 5 may further include other components (a module, a block, and a unit) and some of the components of FIG. 5 may be omitted.

The network interfaces 210 and 310, the output units 220 and 320, the input units 230 and 330, the control units 240 and 340, the multimedia modules 250 and 350, the first storage units 260 and 360, and/or the second storage units 270 and 370 are functionally connected in order to perform the method proposed by this specification.

The network interfaces 210 and 310 represent units (alternatively, modules) in which the data may be transmitted among the devices by using various network technologies (alternatively, means).

The network interfaces 210 and 310 may include energy efficiency interfaces 212 and 312 and/or external interfaces 214 and 314 again.

The energy efficiency interfaces 212 and 312 as units (alternatively, modules) using a network technology for low-power wireless communication may search another device to be connected or transmit data (for example, Bluetooth Low Energy (BLE)).

The external interfaces 214 and 314 represent interfaces (alternatively, wireless communication means) for wireless communication except for the energy efficiency interfaces 212 and 312.

In the present invention, the first device 200 and the second device 300 may transmit/receive information for connecting the external interfaces 214 and 314 through the energy efficiency interfaces 212 and 312 and thus perform connection procedures of the external interfaces 214 and 314.

The output units 220 and 320 represent modules for providing status information of the device and message exchange information to the user through a screen.

The input units 230 and 330 represent modules that allow the user to control the operation of the device by providing an input of the user to the control units 240 and 340, such as a screen button.

The multimedia modules 250 and 350 represent modules for reproducing various types of multimedia and the multimedia modules may be implemented in the control units 240 and 340 and implemented separately from the control units 240 and 340.

The first storage units 260 and 360 represent non-volatile physical devices which may store various types of data.

The second storage units 270 and 370 represent volatile physical devices which temporarily store various types of data.

Although not illustrated, the first device 200 and the second device 300 may include power supply units and the power supply units are applied with external power and/or internal power to supply power required for operating the respective components under the control by the control units.

As described above, in the BLE technology, a small duty cycle may be achieved and the power consumption may be significantly reduced through low-speed data transmission rate and the power supply units may supply the power required for operating the respective components even with low output power (10 mW (10 dBm) or lower).

FIG. 6 is a diagram illustrating search and connection procedures of Bluetooth BR/EDR.

Discovery Procedure

The first device 200 and the second device 300 in the Bluetooth BR/EDR disconnection state exist in a standby state, and then for searching the Bluetooth BR/EDR, the first device 200 exists in an inquiry state and the second device 300 becomes an inquiry scan state.

In the inquiry state, the first device 200 transmits an ID packet to perform a Bluetooth BR/EDR discovery procedure (S610), and in response to the inquiry, the first device 200 receives a frequency hop synchronization (FHS) packet from the second device 300 (S620).

When the second device 300 intends to transmit additional information to the second device 300, the second device 300 may transmit the additional information to the first device 200 using an enhanced inquiry (EIR) packet (S630).

When the first device 200 that verifies existence and information of other devices through such a search intends to be connected with the second device 300, the first device 200 performs a paging procedure.

Paging Procedure

In the paging procedure, the first device 200 enters a BR/EDR paging state and the second device 300 enters a paging scan state.

The first device 200 transmits an ID packet to the second device 300 in the paging state (S640).

When the second device 300 receives the ID packet transmitted by the first device, the first device 200 enters a BR/EDR master response state in the BR/EDR paging state and the second device 300 enters a BR/EDR slave state in the BR/EDR paging state.

Thereafter, the first device 200 transmits a second ID packet in a channel transmitting the ID packet (S650).

The second device 300 receiving the second ID packet transmits a frequency hopping synchronization (FHS) packet to the first device 200 for frequency synchronization (S660).

When the paging procedure is completed, the first device 200 and the second device 300 are switched to the BR/EDR connection state.

Thereafter, the second device 300 is switched to a hopping pattern of the first device 200, and in order to verify this, the first device 200 transmits a Poll packet to the second device 300 (S670). The second device receiving the Poll packet transmits a data packet to the first device 200 in response to the Poll packet (S680) and terminates the Bluetooth BR/EDR connection procedure.

FIG. 7 is a diagram schematically illustrating search and connection procedures of Bluetooth BR/EDR.

Referring to FIG. 7, the search and connection procedures of the Bluetooth BR/EDR described in FIG. 6 may be schematically described.

In detail, the first device 200 serves to announce peripheral device information to the user and request the connection by requesting the search and receiving the response. The second device 300 serves to respond to the search request and respond to the connection request.

In this case, since the second device 300 may not know when the search request and the connection request of the first device 200 may be made, the second device 300 needs to maintain the scan state.

During such a process, there is a problem in which the second device 300 consumes a lot of power.

FIG. 8 is a diagram illustrating a connection procedure of the Bluetooth BR/EDR after a Bluetooth LE connection.

Referring to FIG. 8, when Bluetooth BR/EDR communication and the Bluetooth LE communication are alternatively performed, the device needs to perform a connection procedure defined in each wireless communication.

In detail, both the first device 200 and the second device 300 exist in a non-connection state at an initial stage.

Thereafter, the second device 300 performs a Bluetooth LE search procedure (S810) to discover the first device 200. In this case, both the first device 200 and the second device 300 exist in the non-connection state.

The second device 300 performs the Bluetooth connection procedure for communication with the searched first device 200 through the Bluetooth LE (S820) and the second device 300 and the first device 200 enter the Bluetooth connection state through the Bluetooth LE connection procedure.

When the first device 200 and the second device 300 intend to be connected with the Bluetooth BR/EDR in the Bluetooth LE connection state, the first and second devices 200 and 300 need to perform a separate procedure.

Therefore, the first device 200 and the second device 300 perform the Bluetooth BR/EDR connection procedure again to enter the Bluetooth BR/EDR connection state (S830).

In such a method, even though the Bluetooth LE is already connected, the search procedure is performed again in the Bluetooth BR/EDR procedure with the same device, and as a result, an unnecessary procedure is performed and time and power are consumed due to execution of the unnecessary procedure.

FIG. 9 is a diagram illustrating a data format and a procedure for transmitting channel map information in the Bluetooth LE.

Table 2 given below is a table showing one example of a channel configuration of Bluetooth.

TABLE 2

| RF Channel | RF Center Frequency | Channel Type | Data Channel | Advertising Channel |
|---|---|---|---|---|
| 0 | 2402 MHz | Advertising channel | | 37 |
| 1 | 2404 MHz | Data Channel | 0 | |
| 2 | 2406 MHz | Data Channel | 1 | |
| ... | ... | Data Channel | ... | |
| 11 | 2424 MHz | Data Channel | 10 | |
| 12 | 2426 MHz | Advertising channel | | 38 |
| 13 | 2428 MHz | Data Channel | 11 | |
| 14 | 2430 MHz | Data Channel | 12 | |
| ... | ... | Data Channel | ... | |
| 38 | 2478 MHz | Data Channel | 36 | |
| 39 | 2480 MHz | Advertising channel | | 39 |

Referring to Table 2, in the case of the RF channel of the Bluetooth, indexes 0 to 39 may be granted to 40 channels.

The respective channels are spaced apart from each other with a distance of 2 MHz and a channel type is constituted by two types of the advertising channel and the data channel.

Indexes 0 to 36 are granted to the data channel and indexes 37, 38, and 39 are granted to the advertising channel.

In the Bluetooth LE channel map, used or unused is indicated with respect to 36 data channels of the Bluetooth LE shown in Table 8 and thereafter, when the data is exchanged, a channel to exchange data is selected by using the indicated used or unused.

As illustrated in FIG. 9(a), while a master device requests a connection to a slave device, channel map information in which the used or the unused is indicated may be transmitted and in this case, the channel map information is included in a ChM field illustrated in FIG. 31(b).

FIG. 10 is a diagram illustrating a channel map configuration of the Bluetooth LE and the Bluetooth BR/EDR.

Referring to FIG. 10, the Bluetooth LE and the Bluetooth BR/EDR use the same frequency band and the channel configuration is also similar.

In detail, the Bluetooth LE and the Bluetooth BR/EDR uses a spectrum of 2400 to 2483.5 MHz which is an industrial science medical band (ISM) band. As illustrated in FIG. 32, in the case of the Bluetooth BR/EDR, communication is performed by using 79 channels of each 1 MHz and in the case of the Bluetooth LE, the communication is performed by using 20 channels of each 2 MHz.

The Bluetooth uses a frequency hopping technique that performs the communication while changing channel #1600 per second is used in order to prevent interference.

The device may check a channel in which the interference is severe while performing the communication while using frequency hopping and perform the frequency hopping with respect to channels other than the checked channel.

This is referred to as adaptive frequency hopping (AFH). In the case of the Bluetooth BR/EDR, the AFH is performed by using whether the channel map information is unused or used and the Bluetooth LE is used for a channel selection algorithm.

For example, as illustrated in FIG. 10, in the case of the Bluetooth LE, when the interference occurs in channels #0, #1, and #2 due to other wireless communication, the master device checks channels #0, #1, and #2 as unused and checks the residual channels as used to configure the channel map.

In the case of the Bluetooth BR/EDR, a hopping pattern is configured and the frequency hopping is performed by using channels having no interference based on the channel map.

When the communication is performed by using the Bluetooth LE and the Bluetooth LE is handed over to the Bluetooth BR/EDR, the Bluetooth BR/EDR also configure a separate channel map for 79 channels and performs the frequency hopping in order to perform the AFH.

However, this method is an inefficient method in which even though the Bluetooth LE and the Bluetooth BR/EDR are similar to each other in terms of a use pattern, of the frequency spectrum, a method of the AFH, and a modulation scheme, configuring respective separate channel maps perform an unnecessary procedure and the time and the power are consumed.

Accordingly, the present invention proposes a method that configures the channel map by using the existing channel map when the Bluetooth BR/EDR is handed over to the Bluetooth LE or the Bluetooth LE is handed over to the Bluetooth BR/EDR, in order to address the problem.

FIG. 11 illustrates one example of a wireless communication interface structure proposed by this specification.

Referring to FIG. 11, the first device 200 and the second device 300 in the present invention may operate while configuring all wireless communication interfaces other than the BLE module in a sleep state.

In detail, the first device 200 and the second device 300 include various wireless communication interfaces (alternatively, means) including BLE, Wi-Fi Direct, WiGig, Bluetooth BR/EDR, Wi-Fi, and the like.

The first device 200 and the second device 300 may configure the remaining wireless communication interfaces other than the BLE among the various wireless interfaces in the sleep state.

In this case, when the first device 200 or the second device 300 intends to use the wireless communication interfaces including the Wi-Fi Direct, the WiGig, the Bluetooth BR/EDR, and the like, the first device 200 or the second device 300 may connect the wireless communication interface by exchanging capability information of the wireless communication interface to be used through the BLE.

For example, when the first device 200 intends to perform a service such as Miracast or Print by using the Wi-Fi Direct, the first device 200 may negotiate whether the second device 300 may use the Wi-Fi Direct through the BLE and thereafter, exchange information (for example, a listen channel, a BSSID, and an IEEE MAC addr) required for connecting the Wi-Fi Direct.

Thereafter, the first device 200 and the second device 300 may connect the Wi-Fi Direct based on the exchanged information.

Further, the capability information for the wireless communication interface of the counter device may be searched, a control such as Enable, Disable or Connection for the wireless communication interface may be performed, and actual data may be transmitted/received through the connected wireless communication interface after connecting the Wi-Fi Direct.

Through such a method, when the wireless communication interface is not used, the wireless communication interfaces other than the BLE may be configured in the sleep state, and as a result, power consumption may be reduced as compared with a case in which all wireless communication interfaces are in a wake-up state.

Further, since connection information of the wireless communication interface may be acquired through the BLE, the connection procedure and time of the wireless communication interface may be reduced.

FIG. 12 is a flowchart illustrating one example of a method for providing information of a wireless communication interface proposed by this specification.

Referring to FIG. 12, the method is a protocol type method in which the first device 200 may receive the information associated with the wireless communication interface included in the second device 300 from the second device 300 and as necessary, the first device 200 requests detailed information to the second device 300 to receive the information.

In detail, the second device 300 may transmit the information associated with the wireless communication interface included in the second device through the BLE technology (S1210) and the first device 200 may acquire information on the wireless communication interface which may be supported by the second device 300 based on the information transmitted from the second device 300.

The information on the wireless communication interface which the second device 300 transmits to the first device 200 may be transmitted in a bit mask format.

In the case of the bit mask format, which wireless communication interface the second electronic device 300 supports and which service the second electronic device 300 may support are shown in a bit format.

Table 3 given below shows an example of the bit mask format and Table 4 shows an example of a wireless interface type indicated by each bit.

TABLE 3

| 7$^{th}$ bit | 6$^{th}$ bit | 5$^{th}$ bit | 4$^{th}$ bit | 3$^{rd}$ bit | 2$^{nd}$ bit | 1$^{st}$ bit |
| --- | --- | --- | --- | --- | --- | --- |
| 0 | 1 | 0 | 1 | 1 | 1 | 0 |

TABLE 4

| Bit | Network Interface |
| --- | --- |
| 1$^{st}$ bit | Wi-Fi |
| 2$^{nd}$ bit | Wi-Fi Direct |
| 3$^{rd}$ bit | WFDS Print |
| 4$^{th}$ bit | WFDS Display |
| 5$^{th}$ bit | Wi-Fi Display |
| 6$^{th}$ bit | NFC |

TABLE 4-continued

| Bit | Network Interface |
|---|---|
| 7th bit | Classic Bluetooth |
| 8th bit | WiGig |
| 9th bit | Zigbee |
| 10th bit | Future Interface |

The second device 300 may announce the wireless interface or service which may be supported thereby to the first device 200 through each bit value of the bit mask of Table 3.

That is, since values of the $2^{nd}$, $3^{rd}$, $4^{th}$, and $6^{th}$ bits are 1 in Table 3, the second device 300 may announce that the Wi-Fi Direct, the WFDS Print, the WFDS Display, and the NFC may be supported to the first device 200.

The first device that receives the information on the wireless interface may request detailed information (alternatively, additional information) on the wireless communication interface to the second device 300 when the detailed information (alternatively, additional information) on the wireless interface is required (S1220).

The second device 300 that receives the request for the detailed information from the first device may transmit the requested detailed information (alternatively, additional information) on the wireless communication interface to the first device (S1230).

The detailed information may include the information on the wireless interface or detailed information (alternatively, additional information) on the service provided by the wireless interface.

FIG. 13 is a diagram illustrating one example of a data format of the detailed information described in FIG. 12.

Referring to FIG. 13, the detailed information is constituted by an information type field indicting the type of the information and a detailed information field including the detailed information of the information. For example, when the first device 200 requests detailed information of Classic Bluetooth to the second device 300, the second device 300 may transmit the detailed information of the Classic Bluetooth to the first device 200 by using the data format of FIG. 8.

In detail, when the second device 300 intends to transmit detailed information regarding an address and a device type for connecting the Classic Bluetooth to the first device 200, the information type may include a value indicating information regarding the address or the device type and the detailed information may include an address value or a value indicating the device type.

Table 5 given below shows an example of parameters constituting the detailed information.

TABLE 3

| Parameter | Description |
|---|---|
| Device Address value | Unique ID value for distinguishing device |
| Device Address type | Distinguishes what type of wireless interface address corresponds to |
| Device Address length | Length of device address value |
| Device Class | Indicates to which device category device belongs (e.g., Print, Head set, etc.,) |
| Security Information | Information transmitted and received for security during pairing |
| Synch Code | Value transmitted and received for synchronization of two devices |
| Scan Window Interval | Indicates a period in which device performs listening to receive signals transmitted by other devices |

TABLE 3-continued

| Parameter | Description |
|---|---|
| Link Address | ID value for distinguishing link when wireless connection is performed between two devices |
| Clock | Native clock of device |
| Scan Mode | Indicates pattern in which device performs listening to receive signals transmitted by other devices |
| Connection Start | Command indicating device-to-device connection using specific wireless interface |
| Number of connections | Number of devices connected to specific wireless interface |
| Device Status | Device status such as on/off status of specific wireless interface, etc. |
| Carrier Bitmask | Value indicating type of wireless interface possessed by device |
| Listen Channel | Channel in which P2P exchange data with each other in search step |
| Channel Class | Frequency band (2.4 GHz/5 GHz/60 GHz) used in Wi-Fi, etc. |
| SSID | Connection identifier between wireless apparatus and AP |
| P2P Capability | Indicates whether connection to P2P group is available |
| Configuration Method | Subordinate connection method to external interface (e.g., WSCIE (Wi-Fi)) |
| Supported Rate | Tx Rate |
| Peer addr | External Interface Address of peer device |
| Channel Information | Overall information regarding channel, such as Supported Channel List or Channel Map |
| Operating Channel | Channel in which two devices are connected to exchange data |
| Connection Status | Information indicating whether device is connected with other device and device with which device is connected |
| Active Period | Time value when interface is in active state when interface operates alternately in active state and in sleep state |
| Sleep Period | Time value when interface is in sleep state when interface operates alternately in active state and in sleep state |
| Packet Transmission Interval | Time value between two packets when interface is configured to periodically transmit packets |
| Service UUID (Universal Unique Identifier) | UUIDs for services provided by device and each interface |

When the information is transmitted in the bit mask format, an effect of increasing the energy efficiency by the length of all packets may be achieved.

FIGS. 14 and 15 are flowcharts illustrating another example of the method for providing the information of the wireless communication interface proposed by this specification.

FIGS. 4 and 15 illustrate a format of a data stream to exchange the information on the wireless communication interface which may be supported by each device by the protocol type method.

In detail, the first device 200 or the second device 300 may exchange the information on the wireless communication interface which is supported by each device through the data stream. As illustrated in FIGS. 14 and 15, the first device 200 or the second device 300 is divided into a header part and a payload part.

In the data format illustrated in FIG. 14, the header part includes summary information of the wireless communication interface and the payload part includes the detailed information on each wireless communication interface.

The summary information includes information on the number of wireless communication interfaces which may be supported by each device and/or an office value at which the detailed information on each wireless communication interface is positioned.

Unlike FIG. 14, in FIG. 15, the header part includes the summary information of the wireless communication interface and the information on the number of wireless communication interfaces which may be supported by the device.

The summary information of the interface is constituted by information offsets for each wireless communication interface and each information offset is constituted by an interface indicator field and a detailed information position offset field.

The interface indicator field includes information associated with the type of the wireless communication interface included in each device and the detailed information offset field includes information indicating in which position of the payload the detailed information on a specific wireless interface is included.

The payload part is constituted by detailed information fields of the wireless communication interface and each wireless communication interface detailed information field is constituted by an information type field indicating the type of the information and a field including detailed information corresponding to the type of the information.

The detailed information field may include the parameters shown in Table 3.

The respective devices may exchange the information on the wireless communication interfaces included in the respective devices through the data streams illustrated in FIGS. 14 and 15 and perform the wireless communication interface connection procedure based on the exchanged information.

FIG. 16 is a flowchart illustrating yet another example of the method for providing the information of the wireless communication interface proposed by this specification.

Referring to FIG. 16, two devices possess a predetermined common data tree and exchange a tree number for the common data tree to exchange the information on the wireless communication interface.

In detail, the first device 200 and the second device 300 classify all data associated with the wireless communication interface for each item, and manages the classified data in a tree structure and unique IDs are granted to all items.

The structure of the wireless communication interface classified as described above is known to the first device 200 and the second device 300.

As illustrated in FIG. 16, the tree structure is configured in a hierarchical structure and respective entities which exist in respective layers possess unique IDs thereof and the first device 200 or the second device 300 may request and receive the information on the wireless communication interface of the device to be connected through the respective unique IDs.

For example, when the first device 200 requests information on a Wi-Fi SSID to the second device 300, the first device 200 requests and reads information included in "01.02.02.01" to the second device 300 to acquire the information on the "Wi-Fi SSID".

The user acquires the capability value for the wireless interface to determine the status of the wireless communication interface or change the value in the structure illustrated in FIG. 16.

FIGS. 17 and 18 are diagrams illustrating generic attribute profile (GATT) structure of Bluetooth as one example of a tree structure illustrated in FIG. 16.

The Bluetooth GATT defines a method in which two BLE devices transmit and receive data by using services and characteristics.

Through the GATT, a command to transmit data regarding the characteristics is provided from a server device to a client device and from the client device to the server device is provided. In this case, the value may be read by designating the UUID of the characteristics or a handle value provided in an information search command.

Further, the GATT may provide an announcement and a display. The client device may request the announcement of a specific characteristic to the server device and the server device may transmit the corresponding value to the client device whenever the server device is usable.

When such a structure of the GATT is described through FIG. 17, one profile is constituted by multiple services and each service is constituted by multiple characteristics.

One characteristic includes one value and n descriptors and each descriptor describes the value of the characteristic.

In the present invention, the information on the wireless communication interface may be stored in the device in the GATT structure and the information on the GATT structure, which is stored may be read and received from the counter device.

FIGS. 19 and 20 are diagrams illustrating one example of wireless communication interface information of the GATT structure proposed by this specification.

Referring to FIGS. 19 and 20, two types of the GATT for the information on the wireless communication interface included in each device may be described.

First, as illustrated in FIG. 19, the information on the wireless communication interface included in the device may be subordinate to a wireless communication interface service in a specific profile.

Second, as illustrated in FIG. 20, a separate wireless communication interface profile may be operated independently from another profile. In this case, the respective wireless communication interface services are defined in the wireless communication interface profile and in the respective wireless communication interface services, the information on the wireless communication interface are defined as the characteristics.

In the present invention, the information on the wireless communication interface of another device may be read through the wireless communication interface information in the GATT structure illustrated in FIGS. 19 and 20 and the connection procedure of the wireless communication interface may be performed based on the read wireless communication interface information.

FIGS. 21 and 22 are diagrams illustrating the method for providing the information of the wireless communication interface through a Bluetooth LE connection process and one example for a data format, which are proposed by this specification.

Referring to FIGS. 21 and 22, two devices may request and provide information of a wireless communication interface other than BLE through an advertising process without performing BLE paring.

In detail, the first device 200 in the scanning state and the second device 300 in the advertising state perform discovery and capability information exchange procedures in order to discover the counter device and exchange the information of the wireless communication interface.

Discovery and Capability Information Exchange Procedures

The second device 300 in the advertising state may transmit an advertising message to the first device 200 through an advertising channel in order to perform the BLE connection procedure (S2110).

The advertisement message is used to notify the second device 300 to neighboring devices having the BLE function, and information of a possible wireless communication interface may be included.

The information of the wireless communication interface included in the advertising message may include a Bit_Mask type described in FIG. 7 or the interface summary information of the data stream described in FIGS. 9 and 10.

FIG. 22(a) illustrates an example of a packet data unit of the advertising message and the information of the wireless communication interface of the second device 300 may be included in a Bit Mask type.

The AdvA field includes a value indicating which type of PDU the PDU of the advertising message is and in the exemplary embodiment, the PDU of the advertisement message may be the following type of PDU.

ADV_IND
ADV_NONCONN_IND
ADV_SCAN_IND
EXTENDED_ADV_IND
LONG_ADV_NONCONN_IND

The EXTENDED_ADV_IND and the LONG_ADV_NONCONN_IND are the ADV_IND and ADV_NONCONN_IND types of which the data length is extended.

The AdvData field includes the information of the wireless communication interface and includes a Type field indicating an information type and a Bitmask field including an information value corresponding to the Type.

The Type field may include one of Supported Tech, Status, or Availability information. The Supported Tech field may include information on a supportable wireless communication interface, the Status field may include operational status information on the supportable wireless communication interface, and the Availability field may include information regarding whether the supportable wireless communication interface is usable.

The first device 200, which verifies what the wireless communication interface supportable by the second device 300 is, through the advertisement message, requests the information on the wireless communication interface to the second device through a scan request when detailed information is required in the verified wireless communication interface or the information of the wireless communication interface (S2120).

The scan request PDU may have a SCAN_REQ type among the types shown in Table 1, or may have a LONG_SCAN_REQ type, which is an extension type of the SCAN_REQ.

The second device 300 may transmit the detailed information of the requested wireless communication interface to the first device 200 through a scan response (S2130).

The first device 200 and the second device 300 that discover the counter device and acquire information required for connecting the wireless communication interface through the discovery and capability information exchange procedures may form a link through the connection procedure of the corresponding wireless communication interface (S2140).

FIG. 22(b) illustrates an example of a packet data unit (PDU) of the scan response message and it can be seen that the detailed information on the wireless communication interface of the second device 300 is included in the PDU of the scan response message.

The PDU of the scan response message includes an AdvA field and a ScanRspData field.

The AdvA field indicates a type of the scan response PDU, and the AdvA field may have a SCAN_RSP type among the types shown in Table 1, or have a LONG_SCAN_RSP type that is an extension type of the SCAN_RSP type.

The ScanRspData field includes a Type field indicating a type of information of the wireless communication interface requested by the first device 200 and a Data field including detailed information on the information type.

For example, through such a method, the handover may be performed by transmitting information for hand-over from the Bluetooth LE to the Bluetooth BR/EDR or from the Bluetooth BR/EDR to the Bluetooth LE.

Table 6 given below shows one example a mode, a procedure, a message, and a parameter which are proposed when the handover is performed between the Bluetooth BR/EDR and the Bluetooth LE and Table 7 shows one example of information which may be exchanged through the capability information exchange procedure when the handover is performed between the Bluetooth BR/EDR and the Bluetooth LE.

TABLE 6

| Name | Category | Description |
| --- | --- | --- |
| Capability information exchange | Procedure | Procedure for exchanging setting information parameters required for connection of BR/EDR<br>Procedure for exchanging setting information parameters required for connection of BLE |
| Capability information Parameter | Parameter | Parameters exchanged in capability information exchange procedure Information on type of interface of device and usable service |
| Handover information exchange | Procedure | Interface 전환 시 전환하는 Interface를 Enable 시키고 연결과정을 수행하도록 하는 절차 |
| Handover information Parameter | Parameter | Parameters required for switching interface |
| BR/EDR Handover Standby | State | Intermediate state for converting BR/EDR from standby or off state to connection state |
| BLE Handover Standby | State | Intermediate state for converting BLE from standby or off state to connection state |
| Handover Request (Type: BR/EDR) | Message | Message to enable BR/EDR and thereafter, switch the BR/EDR to BR/EDR Handover Standby state and request setting BR/EDR Connection when BR/EDR is in disable state |
| Handover Response (Type: BR/EDR) | Message | Response message to BR/EDR Handover Request |
| Handover Request (Type: BLE) | Message | Message to enable BR/EDR and thereafter, switch the BR/EDR to BR/EDR Handover Standby state and request setting BLE Connection when BLE is in disable state |
| Handover Response (Type: BLE) | Message | Response message to BLE Handover Request |
| Channel Estimation Algorithm based on Channel map | Algorithm | Algorithm to change channel map generated by BR/EDR according to BLE or Algorithm to change channel map generated by BLE according to BR/EDR |
| Channel map Parameter | Parameter | Parameters required for generating channel map |

TABLE 7

| Name | Category | Description |
| --- | --- | --- |
| Device name | Parameter | Name of device |
| Service ID | Parameter | UUID for services provided by device |
| Device type | Parameter | Indicates to which device type device belongs (ex: Print, Headset, TV, . . .) |

TABLE 7-continued

| Name | Category | Description |
|---|---|---|
| Connection status | Parameter | Information indicating which other device device is connected with |
| Service Range | Parameter | Distance value with which each interface of device may provide service (ex-BR/EDR 30 m) |
| Interface Power | Parameter | Power (ex-BR/EDR 4 dBm) of each interface of device |
| Service Name | Parameter | Name of service |
| Icon ID | Parameter | ID value for distinguishing Icon for device type or ID value for distinguishing Icon for type of service |
| Version information | Parameter | Version of language configuring human-readable text |

FIG. 23 is a flowchart illustrating still yet another example of the method for providing the information of the wireless communication interface through the Bluetooth LE connection process, which is proposed by this specification.

Referring to FIG. 23, a Bluetooth BR/EDR connection procedure may be performed by exchanging information on Bluetooth BR/EDR through the BLE connection procedure described in FIG. 21.

Since steps S2310 to S2330 in FIG. 23 are the same as steps S2110 to S2130 of FIG. 21, a description thereof will be omitted.

The first device 200 which acquires the information on the Bluetooth BR/EDR from the second device 300 through the scan response message exchanges connection with the second device 300 and a service start commend in order to perform the Bluetooth BR/EDR connection procedure (S2340).

Thereafter, the first device 200 performs a paging procedure to connect the Bluetooth BR/EDR.

In the paging procedure, the first device 200 enters a BR/EDR paging state and the second device 300 enters a paging scan state.

The first device 200 transmits an ID packet to the second device 300 in the paging state (S2350).

When the second device 300 receives the ID packet transmitted by the first device, the first device 200 enters a BR/EDR master response state in the BR/EDR paging state and the second device 300 enters a BR/EDR slave state in the BR/EDR paging state.

Thereafter, the first device 200 transmits a second ID packet in a channel transmitting the ID packet (S2360).

The second device 300 receiving the second ID packet transmits a frequency hopping synchronization (FHS) packet to the first device 200 for frequency synchronization (S2370).

When the paging procedure is completed, the first device 200 and the second device 300 are switched to the BR/EDR connection state.

Thereafter, the second device 300 is switched to a hopping pattern of the first device 200, and in order to verify this, the first device 200 transmits a Poll packet to the second device 300 (S2380).

The second device receiving the Poll packet transmits a data packet to the first device 200 in response to the Poll packet and terminates the Bluetooth BR/EDR connection procedure.

In this way, the first device 200 and the second device 300 may perform the Bluetooth BR/EDR connection procedure and may search for a counter device through the BLE without performing a separate query process.

FIG. 24 is a flowchart illustrating one example of a method for providing information of a wireless communication interface through Bluetooth LE, which is proposed by this specification.

Referring to FIG. 24, a connection may be formed by exchanging information on the wireless communication interface other than the BLE through BLE connection between devices.

Specifically, the first device 200 and the second device 300 perform the BLE connection (alternatively, pairing) procedure described above to form a BLE connection (S2410).

The first device 200 forming the BLE connection operates as a master device and the second device 300 operates as a slave device.

The roles of the master device and the slave device may be changed according to a situation.

When the first device 200 and the second device 300 which form the BLE connection intend to connect a different wireless communication interface from the BLE, the first device 200 and the second device 300 may exchange information on the wireless communication interface through the BLE (S2420).

At this time, the first device 200 and the second device 300 may exchange the information of the wireless communication interface using the method described in FIGS. 9 to 15 such as a GATT profile.

Thereafter, the first device 200 and the second device 300 exchange a start command (S2430), and perform the connection procedure of the wireless communication interface based on the exchanged information.

FIG. 25 is a flowchart illustrating another example of the method for providing the information of the wireless communication interface through the Bluetooth LE, which is proposed by this specification.

Referring to FIG. 25, a Bluetooth BR/EDR connection procedure may be performed by exchanging information on Bluetooth BR/EDR through the BLE described in FIG. 21.

In detail, before the BLE connection is formed, the first device 200 exists in an initiating state and the second device 300 exists in an advertising state.

In the advertising state, the second device 300 transmits an advertising message to the neighboring devices so as to notify the second device 300 (S2510).

The first device 200 receiving the advertising message transmits a connection request message to the second device 300 to form the BLE connection with the second device 300 (S2520).

Thereafter, the first device 200 and the second device 300 enter a BLE connection state and may transmit and receive data.

When the first device 200 and the second device 300 which form the BLE connection intend to connect a different wireless communication interface from the BLE, the first device 200 and the second device 300 may exchange information on the wireless communication interface through the BLE (S2530).

At this time, the first device 200 and the second device 300 may exchange the information of the wireless communication interface using the method described in FIGS. 9 to 15. The first device 200 and the second device 300 which exchange the information on the wireless communication interface exchange a start command for the Bluetooth BR/EDR connection (S2540).

Thereafter, the first device 200 performs a paging procedure to connect the Bluetooth BR/EDR.

In the paging procedure, the first device 200 enters a BR/EDR paging state and the second device 300 enters a paging scan state.

Hereinafter, since steps S2550 to S2590 are the same as steps S2350 to S2390 of FIG. 23, a description thereof will be omitted.

FIG. 26 is a flowchart illustrating one example of a method for providing information of a wireless communication interface through a Bluetooth LE connection procedure and Bluetooth LE, which is proposed by this specification.

Referring to FIG. 26, after two devices exchange information on a simple wireless communication interface through an advertising procedure for BLE pairing, when detailed information on the wireless communication interface is required, after BLE pairing, the detailed information on the wireless communication interface may be exchanged.

Specifically, the first device 200 and the second device 300 are not BLE-connected to each other without performing the BLE pairing procedure, and the first device 200 exists in a scanning state and the second device 300 exists in an advertising state.

The second device 300 can exchange information on a wireless communication interface of the second device 300 to the first device 200 through the PDU of the advertising message as described in FIG. 23 (S2610).

The first device 200 and the second device 300 which exchange the information on the wireless communication interface perform the BLE pairing procedure to form a BLE link (S2620).

Thereafter, if the detailed information on the wireless communication interface is required, the first device 200 and the second device 300 may exchange the detailed information on the wireless communication interface through the BLE link by the method described in FIGS. 14 to 20 (S2630).

After the first device 200 and the second device 300 exchanging the detailed information on the wireless communication interface exchange the start command (S2640), the connection procedure of the wireless communication interface may be performed based on the information on the wireless communication interface.

The method described in FIG. 26 is a combination form of the methods in FIGS. 21 and 24 and has an effect of providing efficiency and immediacy of the BLE connection procedure and information exchange in a higher layer through the BLE link.

FIG. 27 is a flowchart illustrating another example of the method for providing the information of the wireless communication interface through the Bluetooth LE connection procedure and the Bluetooth LE, which is proposed by this specification.

Referring to FIG. 27, a Bluetooth BR/EDR connection procedure may be performed by exchanging information on Bluetooth BR/EDR through the BLE described in FIG. 26.

In detail, before the BLE connection is formed, the first device 200 exists in an initiating state and the second device 300 exists in an advertising state.

When the second device 300 intends to form the wireless communication interface connection other than the BLE in the advertising state, the second device 300 may exchange information on the wireless communication interface to the first device (S2700).

The information of the wireless communication interface may include a Bit_Mask type described in FIG. 10 or the interface summary information of the data stream described in FIGS. 14 and 15.

The first device 200 exchanging the information of the wireless communication interface enters an initiating state.

The second device 300 transmits an advertisement message to the first device 200 to perform the BLE connection procedure (S2710).

The first device 200 that recognizes the second device 300 through the advertising message transmits a connection request message for BLE connection to the second device 300 (S2720), and the first device 200 and the second device enter a connection state.

Thereafter, the first device 200 and the second device 300 exchange detailed information on the wireless communication interface using the methods described in FIGS. 9 to 15 through the BLE (S2730) and exchange a start command to perform the connection procedure (S2740).

Thereafter, the first device 200 performs a paging procedure to connect the Bluetooth BR/EDR.

In the paging procedure, the first device 200 enters a BR/EDR paging state and the second device 300 enters a paging scan state.

Hereinafter, since steps S2750 to S2790 are the same as steps S2350 to S2390 of FIG. 23, a description thereof will be omitted.

FIG. 28 is a flowchart illustrating yet another example of the method for providing the information of the wireless communication interface through the Bluetooth LE connection process, which is proposed by this specification.

Referring to FIG. 28, when the wireless communication interface other than the BLE is activated, the device may acquire the information on the wireless communication interface supportable by a counter device through the BLE and perform the connection procedure of the wireless communication interface.

Specifically, the first device 200 and the second device 300 are in a state in which the BLE connection is not established.

In order to recognize other neighboring devices capable of performing BLE communication, the first device 200 enters a scanning state and the second device 300 enters an advertising state.

In this case, the wireless communication interface between the first device 200 and the second device 300 exists in an activated state.

The first device 200 in the scanning state and the second device 300 in the advertising state may exchange information on the supportable wireless communication interface in a state in which the BLE connection is not established (S2800).

The second device 300 receiving the information of the wireless communication supportable by the first device 200 transmits an advertising message to the first device (S2810).

The advertisement message may be a message for transmitting a scan request message of the first device 200 and may be a message for handover.

If the advertising PDU is a PDU for transmitting the scan request PDU, the advertising PDU may have the same format as the data format of the advertising PDU described in FIGS. 16 and 17.

However, if the advertising PDU is a PDU for handover, the type of the advertising PDU has a separate type and has one of reserved values shown in Table 1.

In addition, when the advertising PDU is a PDU for handover, the second device 300 may acquire information that a handover procedure will be performed through information included in the advertising PDU.

The first device 200 receiving the advertising PDU transmits a scan request PDU to the second device 300 in order to request detailed information on the wireless communication interface supported by the second device (S2820).

The PDU of the scan request message has the type described in FIGS. 16 and 17.

The second device 300 receiving the scan request message transmits the detailed information of the requested wireless communication interface to the first device 200 through the scan response PDU (S2830).

Thereafter, the first device 200 and the second device 300 perform the connection procedure based on the information on the wireless communication interface, and the first device 200 and the second device 300 are connected to each other through the wireless communication interface.

FIGS. 29 and 30 are diagrams illustrating another example of the data format, which is proposed by this specification.

Referring to FIGS. 29 and 30, other two embodiments of the PDU of the advertising message used in this specification may be described. The AdvA field included in each embodiment may be the same as the AdvA field shown in FIGS. 21 and 22 described above or the AdvA field described in FIG. 28.

The AdvData field of the PDU of the advertising message in FIGS. 29 and 30 may include a Service Data field, an SDO ID/SIG ID field, and a Length field.

The SDO ID/SIG ID field indicates a type of the wireless communication interface, and the Length field indicates the overall length of the PDU field or the Common Header field and the SDO Specific Contents field.

Table 8 below illustrates an example of a type of wireless communication interface that may be included in the SDO ID/SIG ID.

TABLE 8

| SDO/SIG ID | Description |
| --- | --- |
| 1 | Wi-Fi |
| 2 | Wi-Fi Direct |
| 3 | WFDS Print |
| 4 | WFDS Display |
| 5 | Wi-Fi Display |
| 6 | NFC |
| 7 | Classic Bluetooth |
| 8 | WiGig |
| 9 | Zigbee |
| 10 | Future Interface |

In addition, the AdvData field of the advertising message illustrated in FIGS. 29(a) and 30(b) may further include a PDU field.

The PDU field is a field including simple information of the wireless communication interface and includes other information depending on the type of the wireless communication interface.

If the wireless communication interface is a Bluetooth BR/EDR, the PDU field includes a BR/EDR header field and an Entire Contents field.

The BR/EDR header field indicates which message the detailed information on the wireless communication interface is included.

Table 9 below illustrates an example of the BR/EDR header.

TABLE 9

| $7^{th}$ bit | $6^{th}$ bit | $5^{th}$ bit | $4^{th}$ bit | $3^{rd}$ bit | $2^{nd}$ bit | $1^{st}$ bit |
| --- | --- | --- | --- | --- | --- | --- |
| MD1 | MD0 | | | TBD | | |

Table 10 below illustrates an example of a location of the detailed information on the wireless communication interface according to the sixth or seventh bit.

TABLE 10

| Sixth bit value | Seventh bit value | Location of detailed information |
| --- | --- | --- |
| 0 | 0 | No More Data |
| 0 | 1 | More Data in Scan Response |
| 1 | 0 | More Data in GATT information |
| 1 | 1 | More Data in Scan response and GATT information |

The advertising PDU in FIGS. 29(b) and 30(b) further includes a Common Header field and an SDO Specific Content field.

The Common Header field has the same format as the BR/EDR Header field, and the SDO Specific Content field may include information required for obtaining specific information on the wireless communication interface.

For example, when the wireless communication interface is the Bluetooth BR/EDR, the SDO Specific Content may include frequency hopping synchronization (FHS) information.

The described advertising PDU may be used in the embodiment of this specification in overall.

FIG. 31 is a flowchart illustrating yet another example of the method for providing the information of the wireless communication interface through the Bluetooth LE, which is proposed by this specification.

Referring to FIG. 31, while the brief wireless communication interface is deactivated, brief information of the wireless communication interface is exchanged through the Bluetooth LE connection step and the detailed information on the wireless communication interface may be exchanged through the data transmission method of the higher layer.

Specifically, the first device 200 and the second device 300 are in a state in which the BLE connection is not formed.

In order to recognize other neighboring devices capable of performing BLE communication, the first device 200 enters a scanning state and the second device 300 enters an advertising state.

In this case, the wireless communication interface between the first device 200 and the second device 300 exists in a deactivated state.

The first device 200 in the scanning state and the second device 300 in the advertising state may exchange information on the supportable wireless communication interface in a state in which the BLE connection is not established (S3110).

The information on the wireless communication interface may be exchanged by various methods described above.

Thereafter, the first device 200 and the second device 300 enter a BLE connection state through the BLE connection procedure.

In the BLE connection state, the first device 200 transmits a GATT Read request to the second device 300 to acquire the detailed information on the wireless communication interface stored in the GATT data base (S3120).

The second device 300 may transmit the information requested from the first device 200 to the first device 200 through the GATT Read response (S3130).

The first device 200 receiving the GATT Read response including the detailed information on the wireless communication interface transmits a GATT Write request to the second device 300 to exchange Anchor Point information or Delay Value information (S3140), and receives a GATT Write response in response to the GATT Write request (S3150).

In this case, the Anchor Point information and the Delay Value information may be exchanged by three methods.

First, the first device 200 transmits its Anchor Point information and/or Delay Value information to the second device 300 to be included in the GATT Write request, and the second device 300 transmits its Anchor Point information and/or Delay Value information to the first device 200 to be included in the GATT Write response to share the Anchor Point information and/or Delay Value information.

Second, the first device 200 transmits its Anchor Point information and/or Delay Value information to the second device 300 to be included in the GATT Write request, and the second device 300 may set the Anchor Point and/or Delay Value values according to the transmitted information.

Third, the second device 300 transmits its Anchor Point information and/or Delay Value information to the first device 200 to be included in the GATT Write response, and the first device 200 may set the Anchor Point and/or Delay Value values according to the transmitted information.

The Anchor Point is information regarding when the connection procedure of the wireless communication interface starts, and the Delay Value is information regarding how soon the connection procedure of the wireless communication interface starts after the transmission or reception of the GATT Write response.

As one of the three methods, the first device 200 and the second device 300 sharing the Anchor Point or Delay Value are activated to connect the deactivated wireless communication interfaces.

Thereafter, the first device 200 and the second device 300 perform the connection procedure of the wireless communication interface after the time set as the Anchor Point or a delay time from the reception/transmission of the GATT Write response elapses (S3160), the connection state of the wireless communication interface is established.

FIG. 32 is a diagram illustrating one example of a user interface (UI), which is proposed by this specification.

As shown in FIG. 32(a), devices such as a TV 300-1, a headset 300-2, a band 300-3, a projector 300-4, and the like include various wireless interfaces.

For example, the TV 300-1 may include a wireless communication interface for Bluetooth BR/EDR, Bluetooth LE, Wi-Fi, or Wi-Fi Direct and the Headset 300-2 may include a wireless communication interface for Bluetooth BR/EDR or Bluetooth LE.

Such wireless communication interfaces connect the devices through the various embodiments described above so that wireless communication between the first device 200 and the second device 300 is possible.

In this case, when the neighboring devices are searched using the BLE included in the first device 200, the neighboring devices use the BLE to inform to the first device 200 which wireless communication interface is included.

FIG. 32(b) illustrates that neighboring devices searched by the first device 200 and types of wireless communication interfaces included in the searched devices are displayed on the first device 200.

When the user selects the wireless communication device and the interface displayed on the first device 200, the connection procedure of the selected wireless communication interface is performed, and the first device and the selected device are connected to each other through the selected wireless communication interface.

Table 11 below is a table showing an example of a command used in the embodiment of the present invention.

TABLE 11

| Name | Description |
| --- | --- |
| Power On | Command to turn on interface when an interface to be used by the user is in an off state |
| Power Off | Command to turn off interface when a service to be used by the user is completed |
| Information Update | Command to update information on interface stored in BLE when the information of the interface is changed. |
| Time out | Stop corresponding operation when handover procedure is not completed within predetermined time |
| Direct connection | Perfume direct connection to another interface without delay |
| Handover Start | Command to perform handover |
| Handover End | Command to stop service of handed-over interface |
| Reason Request | Command to request reason of failure factor in handover failure |
| Authority setting | Command to set control authrotiy of device to be connected |
| Force Disconnection | Command to disconnect corresponding connection when connected device is connected to other devices |
| Security setting | Command to set security strength for each interface |

FIGS. 33a and 33c are flowcharts illustrating a method for exchanging information required for the Bluetooth BR/EDR connection through the Bluetooth LE proposed by this specification.

Referring to FIG. 33a, the Bluetooth LE performs the handover information exchange procedure in the non-connected state to perform the Bluetooth BR/EDR connection.

In detail, the first device 200 in the scanning state and the second device 300 in the advertising state may acquire the information required for connection of the Bluetooth BR/EDR through the handover information exchange procedure in the non-connected state of the Bluetooth LE (S3312).

Thereafter, the first device 200 and the second device 300 perform the procedure for connecting the Bluetooth BR/EDR (S3314). In this case, a part of the connection procedure may be omitted by using the information exchanged through the handover information exchange procedure.

The first device 200 and the second device 300 may perform the Bluetooth BR/EDR connection.

FIG. 33b illustrates a scheme that exchanges the handover information in the connection state of the Bluetooth LE unlike FIG. 33a.

In detail, the first device 200 in the scanning state and the second device 300 in the advertising state are in the Bluetooth LE connection state through the Bluetooth LE connection procedure (S3322).

Thereafter, the first device 200 and the second device 300 perform the handover information exchange procedure in order to exchange the information required for the handover of the Bluetooth BR/EDR through the Bluetooth LE link (S3324).

That first device 200 and/or the second device 300 that acquire the information required for the Bluetooth BR/EDR connection through the handover information exchange procedure are in the Bluetooth BR/EDR connection state through the BR/EDR connection procedure.

In this case, a part of the connection procedure may be omitted by using the information exchanged through the handover information exchange procedure.

FIG. 33c(a) illustrates a detailed process of the handover information exchange procedure described in FIGS. 33a and 33b.

The first device 200 transmits a handover request message to the second device 300 in order to exchange the handover information with the second device 300 (S3332).

The handover request message may have a format illustrated in FIG. 33c(b). The interface type field includes type information of the interface to be handed over and the handover information includes information for connecting the interface and may include information of Table 12 given below.

The handover request message may include the information for performing the handover and the second device 300 transmits a handover response message to the first device 200 in response to the handover request message (S3334).

The handover response message may include the information for the handover and may be just the response to the handover request message.

After the handover information exchange procedure, the corresponding interface is enabled to perform the connection procedure according to the information included in the hand over request message.

In this case, the connection procedure of the corresponding interface may be initially performed or a part of the connection procedure may be omitted based on the information which is exchanged in the capability information exchange procedure and the handover information exchange procedure.

Table 12 given below shows one example of the information exchanged through the handover information exchange procedure.

TABLE 12

| Name | Category | Description |
| --- | --- | --- |
| Class of Device | Parameter | Indicates to which device type device belongs (ex: Print, Headset, TV, . . .) |
| Clock Information | Parameter | Information on native clock |
| Link Address | Parameter | ID value of link |
| Device Address | Parameter | MAC address of device |
| Scan window interval | Parameter | Information on scan window of device |
| Number of connections | Parameter | The number of currently connected devices |
| Channel map Parameter | Parameter | Parameters required for generating channel map |
| Connection status | Parameter | Information indicating which other device device is connected with |
| Active Period | Parameter | Time value when interface is in active state when interface operates alternately in active state and in sleep state |
| Sleep Period | Parameter | Time value when interface is in sleep state when interface operates alternately in active state and in sleep state |

TABLE 12-continued

| Name | Category | Description |
| --- | --- | --- |
| Role information | Parameter | Selecting whether device becomes slave after performing page scan or whether device becomes master after performing paging |
| Connection Address | Parameter | Address for managing BLE connection (e.g., AA) |
| CRC Parameter | Parameter | Value (e.g., CRCInit) for calculating BLE CRC |
| WinidowSize | Parameter | Duration information of data transmission/reception section. Value (e.g., WinSize) for setting BLE transmitWindowSize value |
| Windowoffset | Parameter | Defining start point of transmission window. Value (e.g., WinOffset) for setting BLE transmitWindowOffset value |
| Connection Interval | Parameter | Information on interval of connection event. Value (e.g., Interval) for setting BLE connInterval |
| Connection Latency | Parameter | The number of connection events in data is not exchanged. Value (e.g., Latency) for setting BLE connslavelatency |
| Timeout | Parameter | Information for sensing disconnection state. Value (e.g., Timeout) for setting BLE connSupervisionTimeout |
| Channel map parameter | Parameter | Value (e.g. ChM) for setting BLE Channel map |
| Hop | Parameter | Value used for selecting data exchange channel. Value (e.g., Hop) for configuring BLE hopIncrement |
| Clock Accuracy | Parameter | Information for adjusting clock for each device Value (e.g., SCA) for configuring BLE masterSCA |

The information of Table 12 may be used even in the capability information exchange procedure in addition to the handover information exchange procedure.

The first device 200 and the second device 300 may acquire the information for the Bluetooth LE or Bluetooth BR/EDR connection through the method described in FIGS. 33a to 33c and thus perform the Bluetooth EL or Bluetooth BR/EDR connection.

FIGS. 34a and 36b are diagrams illustrating one example of status changes of the Bluetooth LE and the Bluetooth BR/EDR, which is proposed by this specification.

Referring to FIGS. 34a and 34b, the Bluetooth LE or the Bluetooth BR/EDR may be connected without a separate intermediate state through the information acquired in the connection state of the Bluetooth BR/EDR or LE.

In detail, a separate state for entering the connections state from the non-connected state does not exist in the case of the existing Bluetooth LE.

Even in the case of the Bluetooth BR/EDR, the connection state may be entered from the standby state which is one of the non-connected states, but in this case, a separate connection establishment state or advertising state needs to be passed for broadcast information.

In this case, when information for connecting another interface is exchanged while the Bluetooth LE or the Bluetooth BR/EDR is already connected, there is a problem in that an unnecessary procedure is performed.

In order to address such a problem, a method that may immediately enter the connection state by providing a separate state is proposed.

In detail, in the case of FIG. 34a, if the information for the handover is acquired through the Bluetooth LE connection, the device enters a BR/EDR handover standby state for the Bluetooth BR/EDR connection.

The device may enter the connection state from the BR/EDR handover standby state without passing a separate intermediate state, for example, a connection setting state.

In the case of FIG. 34b, if the device acquires the information for the handover through the Bluetooth BR/EDR connection, the device enters a BLE handover standby state for the Bluetooth LE connection.

The device may enter the connection state from the BLE handover standby state without passing a separate intermediate state, for example, the advertising state.

Through the methods of FIGS. 34a and 34b, the unnecessary procedure is not performed when connecting the interface in the non-connected state by using the information acquired through the interface which is already connected to efficiently perform the handover.

FIG. 35 is a flowchart illustrating one example of a method for handover from Bluetooth LE to Bluetooth BR/EDR, which is proposed by this specification.

Referring to FIG. 35, the information for connecting the Bluetooth BR/EDR is acquired through the Bluetooth LE connection and the Bluetooth BR/EDR may be connected by using the acquired information.

In detail, FIG. 35(a) illustrates a flow of performing the Bluetooth BR/ED connection through the Bluetooth LE connection and the first device 200 and the second device 300 exist in the non-connected state in both the Bluetooth LE and the Bluetooth BR/EDR.

The first device 200 and the second device 300 may discover the counter device through the BLE discovery procedure (S3510).

The first device 200 and the second device 300 that discover the counter device perform the BLE connection procedure for the BLE connection and become in the BLE connection state (S3520).

Thereafter, the first device 200 transmits the handover request message to the second device 300 for the handover to the Bluetooth BR/EDR through the Bluetooth LE link (S3530).

The second device 300 that receives the handover request message transmits the handover response message to the first device 200 as the response to the handover request message (S3530).

In this case, the handover request message and/or the handover response message may include the information for the Bluetooth BR/EDR connection described in Table 8.

Both devices that exchange the handover request message and the handover response message may be in the BLE connection state illustrated in FIG. 35(b) and in the BR/EDR handover standby state illustrated in FIG. 34a.

Thereafter, the first device 200 and the second device 300 may immediately enter the Bluetooth BR/EDR connection state as described in FIG. 34a and becomes in a communicatable state.

Through the embodiment, the BLE connection state and the BR/EDR handover standby state are simultaneously maintained and since the information for the Bluetooth BR/EDR connection is exchanged through the handover request message and the handover response message, it is possible to rapidly perform the Bluetooth BR/EDR connection without the unnecessary procedure.

FIG. 36 is a flowchart schematically illustrating one example of a method for handover from Bluetooth LE to Bluetooth BR/EDR, which is proposed by this specification.

FIG. 36 schematically illustrates a process of performing the Bluetooth connection through the Bluetooth LE connection described in FIG. 35 and it can be seen that the scan section is reduced as compared with the process of FIG. 7.

Since the process in which both devices in the non-connected state search the counter device for the Bluetooth BR/EDR connection may not be performed because both devices are already connected to each other through the Bluetooth LE, the scan section is reduced.

Further, since the information for the Bluetooth BR/EDR connection is acquired through the handover request message and the handover response message, the handover may be efficiently performed.

FIG. 37 is a diagram illustrating one example of a method for sharing a channel map between wireless communication interfaces, which is proposed by this specification.

When two devices perform handover between the wireless communication interfaces, it is inefficient to form a new channel map after handover separately from a channel map which has been used in the past.

Accordingly, a channel map may be efficiently generated by determining whether to form a channel map after hand over or form a new channel map based on the channel map before handover by setting a separate channel map parameter.

The channel map parameter indicates whether to configure a channel map after handover or configure a new channel map based on the channel map before handover.

For example, as shown in FIG. 37, in the case of (a) handover from the BLE to the Bluetooth BR/EDR, if the channel map parameter is a true value, the Bluetooth BR/EDR channel map may be configured based on the channel map which has been used in the existing BLE.

However, if the channel map parameter is a false value (b), a new channel map may be configured and used without using the channel map which has been used in the existing BLE.

According to this method, since the channel map before handover is used, time and power consumption for generating the channel map are reduced; and the channel map may be efficiently generated.

FIG. 38 is a flowchart illustrating one example of a method for sharing a channel map between wireless communication interfaces, which is proposed by this specification.

Referring to FIG. 38, when two devices perform handover of the wireless communication interface, whether to form a channel map after handover based on the existing channel map may be determined.

In this case, if the first device 200 forms a channel map based on the existing channel map and the second device 300 forms a new channel map, communication between the first device 200 and the second device 300 may not be performed smoothly.

Therefore, in order to solve such a problem, the first device 200 and the second device 300 exchange the channel map parameter information described in FIG. 37 to determine formation of a new channel map.

Specifically, the first device 200 and the second device 300 form the BLE connection (S3810). The first device 200 and the second device 300 forming the BLE connection may form a channel map for BLE communication.

Thereafter, the first device 200 and the second device 300 perform a handover procedure to the Bluetooth BR/EDR through one of the embodiments described above (S3820) to form a Bluetooth BR/EDR connection (S3830).

In this case, the first device 200 and the second device 300 exchange the channel map parameter value through the handover procedure.

When the value of the channel map parameter is set to True, the first device 200 and the second device 300 configure a channel map based on the channel map before handover, and when the value of the channel map parameter is set to False, the first device 200 and the second device 300 configure a new channel map to perform the Bluetooth BR/EDR communication.

Such a method has the effect of solving the problem of the channel map compatibility caused by varying a method of forming the channel map for each device.

FIG. 39 is a diagram comparing a channel for estimating a channel map between Bluetooth low energy (LE) and Bluetooth BR/EDR.

Referring to FIG. 39, as illustrated in FIG. 10, the Bluetooth low energy (LE) and the Bluetooth BR/EDR use ISM band 2,400 MHz to 2483.5 MHz spectrum and have a similar channel classification method.

Accordingly, a channel map of the Bluetooth BR/EDR may be configured through a channel estimation algorithm based on the channel map configured in the Bluetooth LE. Further, on the other hand, the Bluetooth LE may be configured through the channel estimation algorithm based on the channel map of the Bluetooth BR/EDR.

An unused channel of the Bluetooth LE may be estimated as an unused channel even in the Bluetooth BR/EDR through the channel map configuration by the channel estimation algorithm and thus the channel map may be rapidly and efficiently configured.

FIGS. 40A and 40B are diagrams illustrating an example of a channel map estimation method between Bluetooth LE and Bluetooth BR/EDR, which is proposed in this specification.

Referring to FIG. 40A, the channel estimation algorithm is configured by an algorithm that estimates the Bluetooth BR/EDR channel state using the channel information acquired by the Bluetooth LE and an algorithm that estimates the Bluetooth LE channel state using the channel information acquired from the Bluetooth BR/EDR.

In the embodiment, C and CL are parameters meaning the channel state. The parameters C and CL have a value of '0' or '1', unused may be defined as 1 and used may be defined as 0. That is, if the channel state is not good, the channel state is represented by 1.

In the case of the Bluetooth LE, $CL_1$ defines a 2402 MHz channel, and $CL_2$ defines a 2404 MHz channel, and the parameter CL is defined up to 2480 MHz by the method. CL may be defined up to $CL_{40}$.

In the case of the Bluetooth BR/EDR, $C_1$ defines a 2401 MHz channel, and $C_2$ defines a 2402 MHz channel, and the parameter C may be defined by the method, and the parameter C may be defined up to $C_{79}$.

In addition, when the channel estimated by the channel estimation algorithm is the Bluetooth LE, a parameter is defined as ECL and in the case of the Bluetooth BR/EDR, the parameter is defined as EC.

The channel of the Bluetooth BR/EDR may be estimated by Equation 1 below.

$$EC_n \begin{cases} S \times CL_{n/2+1} & \text{if } n \equiv 0 \pmod{2} \\ CL_{n+1/2} & \text{if } n \equiv 1 \pmod{2} \end{cases} \quad \text{[Equation 1]}$$

In Equation 1, even-numbered channels may be estimated through the above equation and odd-numbered channels may be estimated through the following equation.

In Equation 1, S represents a scale factor and may have a value from 0 to 1.

The state value of the channel estimated through the channel estimation may have a value of '1' or '0', and the channel state of the channel may be estimated through the channel state estimation to configure a channel map of the Bluetooth BR/EDR.

The channel of the Bluetooth LE may be estimated by Equation 2 below.

$$ECL_n = C_{2n-1} + S(C_{2n} + C_{2(n-1)})$$

$$C_0 = 0, C_{80} = 0 \quad \text{[Equation 2]}$$

In Equation 1, S represents a scale factor and may have a value from 0 to 1.

The state value of the channel estimated through the channel estimation may have a value of '1' or '0', and the channel state of the channel may be estimated through the channel state estimation to configure a channel map of the Bluetooth LE.

The channel map after the handover may be configured rapidly and efficiently through the channel map of an interface that has been connected through the embodiment.

FIG. 40B illustrates another example of a method for changing the channel between the Bluetooth BR/EDR and the Bluetooth LE, which is proposed in this specification.

In FIG. 40A(a), as a method of changing a channel from the Bluetooth LE to the Bluetooth BR/EDR, a channel state of the Bluetooth BR/EDR may be estimated according to the channel state of the Bluetooth LE. For example, when RF channel index #4 of the Bluetooth LE is unused, RF channel indexes 7, 8 and 9 of the Bluetooth BR/EDR may be unused.

In FIG. 40B(b), as a method of changing a channel from the Bluetooth BR/EDR to the Bluetooth LE, a channel state of the Bluetooth LE may be estimated according to the channel state of the Bluetooth BR/EDR. For example, when RF channel index #5 of the Bluetooth BR/EDR is unused, RF channel indexes 2 and 3 of the Bluetooth LE may be unused.

FIGS. 40C and 40D are diagrams illustrating an example of the channel map estimation result, which is proposed by this specification.

Referring to FIG. 40C, among CL1 to CL40, CL2, CL3, CL4, and CL39 have values of '1' due to interference and the rest have values of '0'.

A scale factor S value is set as 0.5.

When EC is calculated through Equation 1, the same value as (a) of FIG. 40D is obtained. The result value of (a) in FIG. 40D is obtained as the same result as (b) of FIG. 40D when only a channel having EC of less than 0.5 is set as Used.

However, the result value of (a) in FIG. 40D is obtained as the same result as (c) of FIG. 40D when only a channel having EC of less than 0.5 is set as Used.

Table 13 below is a table showing the classification of the embodiments described in FIGS. 12 to 44.

TABLE 13

| Procedure | Connection or not | Information exchange means | Whether existing connection procedure is changed at handover | Issue |
|---|---|---|---|---|
| Capability information exchange | Non-connected | Advertising | | Deliver Capability information Parameter using Advertising Advertising packet size may be insufficient |
| | | New Advertising | | Define Advertising packet for Delivering Capability information Parameter Require new message definition |
| | | Scan Response | | Scan Response may be insufficient. Difficult to search multiple devices |
| | | New Scan Response | | Define Advertising packet for Delivering Capability information Parameter Difficult to search multiple devices Require new message definition |
| | Connected | EIR GATT database | | There is inconvenience to perform connection procedure for searching. |
| | Combination | Advertising | | |
| | | New Advertising | | Require new message definition |
| | | Scan Response | | Difficult to search multiple devices |
| | | New Scan Response | | Difficult to search multiple devices |
| Handover information exchange | Non-connected | Advertising | No change | There may be a security problem. Long connection time is required. |
| | | | Partial change | There may be a security problem. |
| | | | Omitted | There may be a security problem. |
| | | New Advertising | No change | There may be a security problem. Require new message definition |
| | | | Partial change | There may be a security problem. Require new message definition |
| | | | Omitted | There may be a security problem. Require new message definition |
| | Connected | GATT database | No change | There is inconvenience to perform handover only in connection state. Long connection time is required. |
| | | | Partial change | There is inconvenience to perform handover only in connection state. |
| | | | Omitted | There is inconvenience to perform handover only in connection state. |

FIG. 41 is a flowchart illustrating one example of a method for handover from Bluetooth LE to Bluetooth BR/EDR, which is proposed by this specification.

Referring to FIG. 41, information required for the connection process of the Bluetooth BR/EDR may be obtained through the Bluetooth LE connection.

Specifically, in a Bluetooth LE disconnection state, the first device 200 exists in a BLE scanning state, and the second device 300 exists in a BLE advertising state.

In the BLE scanning state, the second device 300 transmits an advertising message to the first device 200 (S4110).

The advertising message is a message for a capability information exchange procedure and may include capability information for a Bluetooth BR/EDR connection.

A PDU type of the advertising message may have the following types.

ADV_IND
ADV_NONCONN_IND
ADV_SCAN_IND

The second device 300 transmitting the advertising message may transmit an advertising message for BLE connection to the first device 200 (S4120).

The advertising message may have the following PDU types as the advertising message for BLE connection.

ADV_IND
ADV_DIRECT_IND

The first device 200 receiving the advertising message for the BLE connection transmits a connection request message for requesting the BLE connection to the second device to make a BLE connection (S4130).

Thereafter, when the first device 200 and the second device 300 intend to make a Bluetooth BR/EDR connection, the first device 200 and the second device 300 obtain information for Bluetooth BR/EDR connection to perform handover through a handover information exchange procedure.

In order to perform the handover information exchange procedure, the first device 200 may transmit a handover request message to the second device 300.

The handover request message may include information for the Bluetooth BR/EDR connection described above, and the second device 300 receiving the handover request message may transmit a handover response message to the second device 300 in response thereto (S4150).

The handover request message and/or the handover response message may include information for the Bluetooth BR/EDR connection.

The first device 200 and the second device 300, which obtain information for connection of the Bluetooth BR/EDR through the handover request message and the handover response message, enters the Bluetooth BR/EDR handover standby state described in FIG. 34A.

The Bluetooth BR/EDR handover standby state means a state which may directly enter the Bluetooth BR/EDR connection state as described in FIG. 34A.

The first device 200 and the second device 300 enter a Bluetooth connection state in the Bluetooth BR/EDR handover standby state.

Thereafter, as illustrated in FIG. 6, the second device 300 is switched to a hopping pattern of the first device 200, and in order to verify this, the first device 200 transmits a Poll packet to the second device 300 (S4160). The second device 300 receiving the Poll packet transmits a data packet to the first device 200 in response to the Poll packet (S4170) and terminates the Bluetooth BR/EDR handover procedure.

FIG. 42 is a flowchart illustrating another example of the method for handover to the Bluetooth BR/EDR from the Bluetooth LE, which is proposed by this specification.

Referring to FIG. 42, in the Bluetooth LE connection procedure, the handover may be performed by obtaining capability information of an interface to be handed over through a scan request and a scan response.

Specifically, in a Bluetooth LE disconnection state, the first device and the second device exist in a BLE scanning state and a BLE advertising state in order to perform the Bluetooth LE connection procedure.

The second device 300 transmits an advertising message to the neighboring devices so as to notify the second device 300 (S4210). In this case, the advertising message may have the following PDU types.
ADV_IND
ADV_NONCONN_IND
ADV_SCAN_IND The first device that discovers the second device 300 through the advertising message performs a procedure for Bluetooth LE connection with the second device.

The second device 300 transmits an advertising message to the first device 200 for a Bluetooth BR/EDR capability information exchange (S4220). The advertising message may be an advertising message for the scanning procedure and have the following PDU types.
ADV_IND
ADV_SCAN_IND The first device 200 receiving the advertising message for the scanning procedure transmits a scan request message to the second device 300 (S4230). In this case, the first device 200 may request capability information in Table 8 to the second device 300 through the scan request message to perform the handover to the Bluetooth BR/EDR.

The second device 300 receiving the scan request message transmits the requested capability information to the first device 200 through a scan response message (S4240).

Thereafter, the second device 300 may transmit an advertising message to the first device 200 for the BLE connection procedure (S4250). In this case, the advertising message may have the following PDU types.
ADV_IND
ADV_DIRECT_IND The first device 200 receiving the advertising message transmits a connection request message to the second device 300 for the BLE connection (4260), and the first device 200 and the second device 300 become a BLE connection state.

When the first device 200 communicating with the second device 300 in the BLE connection state intends to perform a handover to the Bluetooth BR/EDR, the first device 200 transmits a BR/EDR handover request message to the second device 300 to perform the handover procedure (S4270).

The handover request message may include handover information in Table 8. The second device 300 transmits a handover response message to the first device 200 in response to the handover request message (S4280).

Thereafter, the first device 200 and the second device 300, which obtain information for connection of the Bluetooth BR/EDR through the handover request message and the handover response message, enters the Bluetooth BR/EDR handover standby state described in FIG. 34A.

The Bluetooth BR/EDR handover standby state means a state which may directly enter the Bluetooth BR/EDR connection state as described in FIG. 34A.

The first device 200 and the second device 300 enter a BLE connection state in the Bluetooth BR/EDR handover standby state.

FIG. 43 is a flowchart illustrating another example of the method for handover to the Bluetooth BR/EDR from the Bluetooth LE, which is proposed by this specification.

Referring to FIG. 43, if the size of the scan response message is insufficient to transmit information in FIG. 42, the information may be transmitted through another type of message.

Specifically, in a Bluetooth LE disconnection state, the first device and the second device exist in a BLE scanning state and a BLE advertising state in order to perform the Bluetooth LE connection procedure.

The second device 300 transmits an advertising message to the neighboring devices so as to notify the second device 300 (S4310). In this case, the advertising message may have the following PDU types.
ADV_IND
ADV_NONCONN_IND
ADV_SCAN_IND The first device that discovers the second device 300 through the advertising message performs a procedure for Bluetooth LE connection with the second device.

The second device 300 transmits an advertising message to the first device 200 for a Bluetooth BR/EDR capability information exchange (S4320). The advertising message may be an advertising message for the scanning procedure and have the following PDU types.
ADV_IND
ADV_SCAN_IND The first device 200 receiving the advertisement message for the scanning procedure may request capability information of the Bluetooth BR/EDR in Table 8. When the capability information is as large as not be transmitted through the scan response message in FIG. 42, the first device 200 requests the capability information to the second device 300 through the different capability information exchange request message from the scan request message (S4330).

The second device 300 receiving the capability information exchange request message may transmit the capability information to the first device 200 through the capability information exchange response message including more data than the scan response message (S4340).

The PDU types of the capability information exchange request message and the capability information exchange response message may have Capability Exchange information_REQ and Capability Exchange information_RSP types in Table 10 below and may be defined through a Reserved area.

TABLE 14

| PDU Type  | Packet Name                        |
|-----------|------------------------------------|
| 0000      | ADV_IND                            |
| 0001      | ADV_DIRECT_IND                     |
| 0010      | ADV_NONCONN_IND                    |
| 0011      | SCAN_REQ                           |
| 0100      | SCAN_RSP                           |
| 0101      | CONNECT_REQ                        |
| 0110      | ADV_SCAN_IND                       |
|           | Capability Exchange information_REQ |
|           | Capability Exchange information_RSP |
| 0111-1111 | Reserved                           |

Hereinafter, steps S4370 to S4380 are the same as steps S4270 to S4280 in FIG. 42, and therefore, description thereof will be omitted.

FIGS. 44 and 45 are diagrams illustrating an example of a method and a data structure for handover from Bluetooth BR/EDR to Bluetooth LE, which is proposed in this specification.

Referring to FIG. 44, handover may be performed to the Bluetooth LE by exchanging the capability information through an Extended Inquiry Response message for the Bluetooth BR/EDR connection.

Specifically, the first device 200 and the second device 300 in the Bluetooth BR/EDR disconnection state exist in a standby state, and then for searching the Bluetooth BR/EDR, the first device 200 exists in an inquiry state and the second device 300 becomes an inquiry scan state.

In the inquiry state, the first device 200 transmits an ID packet to perform a Bluetooth BR/EDR discovery procedure (S4410), and in response to the inquiry, the first device 200 receives a frequency hop synchronization (FHS) packet from the second device 300 (S4420).

When the second device 300 intends to transmit additional information to the second device 300, the second device 300 may transmits the additional information to the first device 200 using an enhanced inquiry (EIR) packet (S4430).

In this case, the second device may transmit the capability information for connection of the Bluetooth LE to the first device 200 through the EIR packet.

Referring to FIG. 45, the EIR has a size of 240 bytes and is configured by a plurality of EIR data structures.

The EIR data structure includes a Length field indicating the size of the data and a Data field including the data.

The Data field includes an EIR Data Type field indicating a data type and an EIR Data field including substantial data and the second device 300 may transmit the capability information included in the EIR Data field to the first device 200.

Thereafter, the first device 200 and the second device 300 become a BR/EDR connection state through the Bluetooth BR/EDR connection procedure (S4440).

When the first device 200 communicating with the second device 300 in the BLE connection state intends to perform a handover to the Bluetooth LE, the first device 200 transmits a BR/EDR handover request message to the second device 300 to perform the handover procedure (S4450).

The handover request message may include handover information in Table 8. The second device 300 transmits a handover response message to the first device 200 in response to the handover request message (S4460).

Thereafter, the first device 200 and the second device 300, which obtain information for connection of the Bluetooth BR/EDR through the handover request message and the handover response message, enters the Bluetooth BR/EDR handover standby state described in FIG. 34A.

The Bluetooth BR/EDR handover standby state means a state which may directly enter the Bluetooth BR/EDR connection state as described in FIG. 34B.

The first device 200 and the second device 300 enter a Bluetooth LE connection state in the Bluetooth LE handover standby state.

FIGS. 46 and 47 are diagrams illustrating an example of a method and a data structure for handover to Bluetooth BR/EDR from Bluetooth LE, which is proposed in this specification.

Referring to FIGS. 46 and 47, in the Bluetooth LE connection state, the capability information may be exchanged through a Bluetooth control message.

Specifically, the first device 200 and the second device 300 may perform a capability information exchange procedure to exchange Bluetooth BR/EDR connection information in a Bluetooth LE connection state.

In this case, the first device 200 may transmit a capability information request message to the second device 200 in order to request the capability information in Table 8.

The capability information request message is transmitted in a physical channel and may include an LL control PDU for link layer (LL) connection control among data channel PDUs.

The payload of the LL control PDU includes an Opcode field indicating a type of LL control PDU and a Ctr Data field including control data, as illustrated in FIG. 47A.

The PDU types of the LL capability information exchange request message and the LL capability information exchange response message may have PDU types of LL_Capability information exchange_REQ and LL_Capability information exchange_RSP in FIG. 47B and may be defined through a reserved area.

When the first device 200 communicating with the second device 300 in the BLE connection state intends to perform a handover to the Bluetooth BR/EDR, the first device 200 transmits a BR/EDR handover request message to the second device 300 to perform the handover procedure (S4630).

The handover request message may include handover information in Table 8. The second device 300 transmits a BR/EDR handover response message to the first device 200 in response to the BR/EDR handover request message (S4640).

Thereafter, the first device 200 and the second device 300, which obtain information for connection of the Bluetooth BR/EDR through the handover request message and the handover response message, enters the Bluetooth BR/EDR handover standby state described in FIG. 34A.

The Bluetooth BR/EDR handover standby state means a state which may directly enter the Bluetooth BR/EDR connection state as described in FIG. 34A.

The first device 200 and the second device 300 enter a BLE connection state in the Bluetooth BR/EDR handover standby state.

FIG. 48 is a flowchart showing another example of a method of handover from Bluetooth LE to Bluetooth BR/EDR proposed in the present specification.

Referring to FIG. 48, the first device 200 and the second device 300 may perform handover by acquiring interface information through a GATT of the Bluetooth LE in the BLE connection state.

Specifically, the capability information in Table 5 is stored in a GATT format described above in the second device 300. The first device 200 may transmit a GATT read request message to the second device 300, in order to read the capability information for the Bluetooth BR/EDR connection stored in the second device 300 in the Bluetooth LE connection state (S4810).

The second device 300 receiving the GATT read request message transmits the capability information requested by the first device 200 to the first device 200 through a GATT Read response message (S4820).

The GATT read request and GATT read response messages may be freely used among ATT messages which are protocols used by the GATT.

Hereinafter, since steps S4830 to S4840 are the same as steps S4630 to S4640 in FIG. 46, the description thereof will be omitted.

FIG. 49 is a flowchart illustrating another example of the method for handover to the Bluetooth BR/EDR from the Bluetooth LE, which is proposed by this specification.

Referring to FIG. 49, the Bluetooth BR/EDR connection is performed by exchanging information for Bluetooth BR/EDR connection in a state where Bluetooth LE connection is not established.

Specifically, the first device 200 and the second device 300 exist in a BLE scanning state and a BLE advertising state in order to perform a Bluetooth LE connection procedure.

In this case, the second device 300 transmits a handover message to the first device 200. The handover message is one example of a message defined for searching, connecting, and servicing Bluetooth BR/EDR interface information.

The handover message includes capability information in Table 5 for the Bluetooth BR/EDR connection.

The first device 200 receiving the handover message transmits a BR/EDR handover request message to the second device 300 to perform a handover procedure (S4920).

The handover request message may include handover information in Table 8. The second device 300 transmits a BR/EDR handover response message to the first device 200 in response to the BR/EDR handover request message (S4930).

The handover message, the handover request message, and the handover response message are transmitted in an advertising physical channel and include advertising channel PDUs.

Table 15 below illustrates an example of the PDU types of the handover message, the handover request message and the handover response message.

TABLE 15

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
|  | ADV_BR/EDR Handover |
|  | BR/EDR Handover Request |
|  | BR/EDR Handover Response |
| 0111-1111 | Reserved |

The handover message may have a PDU type of ADV_BR/EDR Handover, the handover request message may be a PDU type of BR/EDR Handover Request, and the handover response message may have a PDU type of BR/EDR Handover Response, and each PDU type may be defined by the Reserved area in Table 11.

Thereafter, the first device 200 and the second device 300, which acquire information for performing handover to the Bluetooth BR/EDR through the handover request message and the handover response message, enters the Bluetooth BR/EDR handover standby state described in FIG. 34A.

The Bluetooth BR/EDR handover standby state means a state which may directly enter the Bluetooth BR/EDR connection state as described in FIG. 34A.

The first device 200 and the second device 300 enter a BLE connection state in the Bluetooth BR/EDR handover standby state.

FIG. 50 is a flowchart illustrating another example of the method for handover to the Bluetooth BR/EDR from the Bluetooth LE, which is proposed by this specification.

Referring to FIG. 50, two devices may perform handover by exchanging information for handover in a state where a Bluetooth LE connection is not established.

Specifically, the first device 200 and the second device 300 exist in a Bluetooth LE scanning state and a BLE advertising state in a Bluetooth LE disconnection state.

The second device 300 transmits a handover message to the first device 200 to perform a Bluetooth BR/EDR capability information exchange procedure (S5010).

The handover message has the same PDU type as the handover message illustrated in FIG. 49 and is an advertising message that permits the first device 200 to transmit the BR/EDR handover request message.

The first device 200 receiving the handover message transmits a capability information request message to the second device 300 in order to request capability information for Bluetooth BR/EDR connection (S5020).

The second device 300 transmits a capability information response message including the requested information to the first device 200 in response to the capability information request message (S5030).

Thereafter, the second device 300 may transmit a handover message to the first device to permit handover request message transmission (S5040).

Thereafter, since steps S5050 to S5060 are the same as steps S4920 to S4930 in FIG. 49, the description thereof will be omitted.

FIGS. 51A and 51B are diagrams illustrating an example of a method and a data format for estimating a channel map at the time of handover from Bluetooth LE to Bluetooth BR/EDR, which is proposed in this specification.

Referring to FIG. 51A, two devices may perform the Bluetooth BR/EDR connection by exchanging information for Bluetooth BR/EDR connection in the Bluetooth LE connection state.

Specifically, in a Bluetooth LE disconnection state, the first device 200 exists in a Bluetooth BLE scanning state, and the second device 300 exists in a BLE advertising state.

Thereafter, the capability information in FIG. 5 may be exchanged through the capability information exchange procedure described above (S5110). The second device 300 exchanging the capability information may transmit an advertising message to the first device 200 to permit the Bluetooth LE connection request message (S5120).

The advertising message may have the following PDU types.

ADV_IND

ADV_DIRECT_IND

The first device 200 receiving the advertising message transmits a connection request message to the second device 300 for the Bluetooth LE connection (S5130), and the first device 200 and the second device 300 enter a Bluetooth LE connection state.

When the first device 200 communicating with the second device 300 in the BLE connection state intends to perform a handover to the Bluetooth BR/EDR, the first device 200 transmits a BR/EDR handover request message to the second device 300 to perform the handover procedure (S5140).

The handover request message may include handover information in Table 8. The second device 300 transmits a handover response message to the first device 200 in response to the handover request message (S5150).

The handover request message and the handover response message are transmitted in a physical channel and may include LL control PDUs for link layer (LL) connection control among data channel PDUs.

A payload of the LL control PDU includes an Opcode field indicating a type of LL control PDU and a Ctr Data field including control data, as illustrated in FIG. 51B(a).

FIG. 51B(b) illustrates a type of control PDU included in the Opcode.

The handover request message may have a PDU type of LL_BR/EDR Handover_REQ, the handover response message may have a PDU type of LL_BR/EDR Handover_RSP, and the PDU types may be defined through the reserved area.

Thereafter, the first device 200 and the second device 300 may perform the channel map parameter exchange and the channel estimation algorithm described in FIGS. 37 to 40B (S5270).

The first device 200 and the second device 300, which configure the channel map through the channel map parameter exchange and the channel estimation algorithm, enter the Bluetooth BR/EDR handover standby state described in FIG. 34A.

The Bluetooth BR/EDR handover standby state means a state which may directly enter the Bluetooth BR/EDR connection state as described in FIG. 34A.

The first device 200 and the second device 300 enter a BLE connection state in the Bluetooth BR/EDR handover standby state.

FIG. 52 is a flowchart illustrating another example of the method for estimating a channel map at the time of handover to the Bluetooth BR/EDR from the Bluetooth LE, which is proposed by this specification.

Referring to FIG. 52, the two devices may perform handover by exchanging information stored in a GATT format in the BLE connection state.

Since steps S5210 to S230 are the same as steps S5110 to S5130 in FIG. 51A, the description thereof will be omitted.

When the first device 200 communicating with the second device 300 in the BLE connection state intends to perform a handover to the Bluetooth BR/EDR, the first device 200 transmits a GATT write request message to the second device 300 to perform the handover procedure (S5240).

The GATT write request message includes the handover information in FIG. 8 and the first device 200 may instruct the handover to the second device through the GATT write request message.

The second device 300 receiving the GATT write request message transmits a GATT write response message to the first device 200 in response to the GATT write request message (S5250).

The GATT write response message may include handover information in Table 8.

The GATT write request and GATT write response messages may be freely used among ATT messages which are protocols used by the GATT.

Thereafter, since step S5260 is the same as step S5160 in FIG. 51A, the description thereof will be omitted.

Thereafter, the first device 200 and the second device 300, which obtain information for connection of the Bluetooth BR/EDR through the handover request message and the handover response message, enters the Bluetooth BR/EDR handover standby state described in FIG. 34A.

The Bluetooth BR/EDR handover standby state means a state which may directly enter the Bluetooth BR/EDR connection state as described in FIG. 34B.

The first device 200 and the second device 300 enter a Bluetooth LE connection state in the Bluetooth LE handover standby state.

In this case, the first device 200 may transmit a capability information request message to the second device 200 in order to request the capability information in Table 8.

The capability information request message is transmitted in a physical channel and may include an LL control PDU for link layer (LL) connection control among data channel PDUs.

The payload of the LL control PDU includes an Opcode field indicating a type of LL control PDU and a Ctr Data field including control data, as illustrated in FIG. 47A.

The PDU types of the LL capability information exchange request message and the LL capability information exchange response message may have PDU types of LL_Capability information exchange_REQ and LL_Capability information exchange_RSP in FIG. 47B and may be defined through a reserved area.

When the first device 200 communicating with the second device 300 in the BLE connection state intends to perform a handover to the Bluetooth BR/EDR, the first device 200 transmits a BR/EDR handover request message to the second device 300 to perform the handover procedure (S4630).

The handover request message may include handover information in Table 8. The second device 300 transmits a BR/EDR handover response message to the first device 200 in response to the BR/EDR handover request message (S4640).

Thereafter, the first device 200 and the second device 300, which obtain information for connection of the Bluetooth BR/EDR through the handover request message and the handover response message, enters the Bluetooth BR/EDR handover standby state described in FIG. 34A.

The Bluetooth BR/EDR handover standby state means a state which may directly enter the Bluetooth BR/EDR connection state as described in FIG. 34A.

The first device 200 and the second device 300 enter a BLE connection state in the Bluetooth BR/EDR handover standby state.

Thereafter, the first device 200 and the second device 300, which acquire information for connection of the Bluetooth BR/EDR through the handover request message and the handover response message, enter the Bluetooth BR/EDR handover standby state described in FIG. 34B.

The Bluetooth BR/EDR handover standby state means a state which may directly enter the Bluetooth BR/EDR connection state as described in FIG. 34A.

The first device 200 and the second device 300 enter a BLE connection state in the Bluetooth BR/EDR handover standby state.

FIG. 53 shows an example of a method proposed by the present invention for notifying a serviceable range among wireless communication interfaces.

The first device 200 may search neighboring devices through the BLE and perform a handover to other wireless communication interfaces rather than the BLE with the searched second device 300.

In this case, as illustrated in FIG. 30A, when a service area of the wireless communication interface to be handed-over is larger than a BLE service area, there is no problem in providing a service after handover.

However, as illustrated in FIG. 30B, when the service area of the wireless communication interface to be handed-over is smaller than the BLE service area, there is a problem that the service after handover can not be provided.

Accordingly, in order to solve the problem, when searching for neighboring devices and wireless communication interfaces of the neighboring devices through the BLE, a service range of the wireless communication interface may be announced.

That is, when searching for neighboring devices and information on the wireless communication interfaces of the neighboring devices through the BLE, a parameter indicating information regarding a serviceable range of the wireless communication interface may be transmitted.

The service region of the wireless communication interface is determined through the parameter to perform the handover only in the serviceable case, thereby solving the problem that the service may not be provided after the handover.

If the value of the parameter may not be accurately calculated, the serviceable area may be estimated through information such as transmission power of the wireless communication interface other than the BLE.

FIG. 54 is a flowchart showing an example of exchanging frequency hopping synchronization (FHS) information of the Bluetooth BR/EDR proposed in the present specification through the Bluetooth LE. Referring to FIG. 55, the first device 200 and the second device 300 form a BLE connection through a BLE connection procedure (S5410).

The first device 200 and the second device 300 forming the BLE connection exchange frequency hopping synchronization (FHS) information (S5420) and store the exchanged FHS information in a GATT data base.

Thereafter, the first device 200 and the second device 300 perform a handover procedure to the Bluetooth BR/EDR from the BLE based on the FHS information stored in the GATT data base (S5430) to become a Bluetooth BR/EDR connection state (S5440).

By such a method, the first device 200 and the second device 300 may exchange information required for connection without exchanging the FHS information in a situation where a Bluetooth BR/EDR connection is not established to immediately perform the handover.

The aforementioned present invention is not limited to the aforementioned embodiments and the accompanying drawings, and it will be obvious to those skilled in the technical field to which the present invention pertains that various substitutions, modifications, and changes may be made within the scope without departing from the technical spirit of the present invention.

The invention claimed is:

1. A method for connecting Bluetooth basic rate (BR)/enhanced data rate (EDR) by using Bluetooth low energy (LE) in a wireless communication system, the method performed by a first device and comprising:
receiving, from a second device, an advertising message associated with a Bluetooth BR/EDR connection,
wherein the advertising message includes available information of the Bluetooth BR/EDR, location information of detailed information and state information;
transmitting, to the second device, a connection request message for establishing a low energy (LE) connection;
establishing the LE connection with the second device;
transmitting, to the second device, a read request message requesting reading of handover information for connection of the Bluetooth BR/EDR, using the LE connection;
receiving, from the second device, a read response message including the handover information of the second device,
wherein the handover information includes address information, service information indicating supported Bluetooth BR-EDR service and device type information;
activating a BR/EDR of the first device and a BR/EDR of the second device; and
establishing the Bluetooth BR/EDR connection with the second device based on the handover information.

2. The method of claim 1, further comprising:
transmitting a request message for requesting detailed information associated with the Bluetooth BR/EDR connection to the second device based on the advertising message; and
receiving a response message including the detailed information from the second device in response to the request message,
wherein the location information indicates one of a scan response message, a Generic Attribute Profile (GATT) data base, or a scan response message and the GATT data base.

3. The method of claim 2, wherein the detailed information includes at least one of frequency information, channel map switching information, transmission power information, or connection state information.

4. The method of claim 3, wherein when the channel map switching information has a value of 'True', a Bluetooth BR/EDR channel map is generated based on a channel map of the Bluetooth LE.

5. The method of claim 4, further comprising generating the Bluetooth BR/EDR channel map through a channel estimation algorithm.

6. The method of claim 1, further comprising:
entering a BR/EDR handover standby state for the Bluetooth BR/EDR connection before establishing the Bluetooth BR/EDR connection,
wherein the BR/EDR handover standby state is a state entering directly a BR/EDR connection state without performing a BR/EDR connection procedure.

7. The method of claim 2, further comprising:
transmitting a write request message requesting writing of an operation code instructing the BR/EDR connection based on the handover information; and
receiving a write response message in response to the write request message.

8. A first device for connecting Bluetooth basic rate (BR)/enhanced data rate (EDR) by using Bluetooth low energy (LE) in a wireless communication system, the first device comprising:
a transceiver; and
a controller functionally connected with the transceiver, wherein the controller is configured to:
control the transceiver to receive an advertising message associated with a Bluetooth BR/EDR connection from a second device,
wherein the advertising message includes available information of the Bluetooth BR/EDR, location information of detailed information and state information,
control the transceiver to transmit a connection request message for establishing a low energy (LE) connection to the second device,
establish the LE connection with the second device,
control the transceiver to transmit a read request message requesting reading of handover information for connection of the Bluetooth BR/EDR, using the LE connection to the second device,
control the transceiver to receive a read response message including the handover information of the second device from the second device,
wherein the handover information includes address information, service information indicating supported Bluetooth BR-EDR service and device type information,
activate a BR/EDR of the first device and a BR/EDR of the second, and
establish the Bluetooth BR/EDR connection with the second device based on the handover information.

9. The first device of claim 8, wherein the controller is further configured to:
control the transceiver to transmit a request message for requesting detailed information associated with the Bluetooth BR/EDR connection to the second device based on the advertising message, and
control the transceiver to receive a response message including the detailed information from the second device in response to the request message,
wherein the location information indicates one of a scan response message, a Generic Attribute Profile (GATT) data base, or a scan response message and the GATT data base.

10. The first device of claim 9, wherein the detailed information includes at least one of frequency information, channel map switching information, transmission power information, or connection state information.

11. The first device of claim 10, wherein when the channel map switching information has a value of 'True', a Bluetooth BR/EDR channel map is generated based on a channel map of the Bluetooth LE.

* * * * *